Feb. 16, 1926.

H. W. MacDOUGALL 1,573,413

AUTOMATIC TESTING SYSTEM TO TEST AUTOMATIC SWITCHES

Filed Nov. 19, 1923   9 Sheets-Sheet 1

Inventor:
Harry W. MacDougall.
by E.W. Adam
Att'y.

Feb. 16, 1926.

H. W. MacDOUGALL 1,573,413

AUTOMATIC TESTING SYSTEM TO TEST AUTOMATIC SWITCHES

Filed Nov. 19, 1923 9 Sheets-Sheet 3

Inventor:
Harry W. MacDougall
by [signature] Att'y.

Feb. 16, 1926.

H. W. MacDOUGALL 1,573,413

AUTOMATIC TESTING SYSTEM TO TEST AUTOMATIC SWITCHES

Filed Nov. 19, 1923    9 Sheets-Sheet 5

Fig. 5.

Inventor:
Harry W. MacDougall.
by E. W. Adam
Att'y

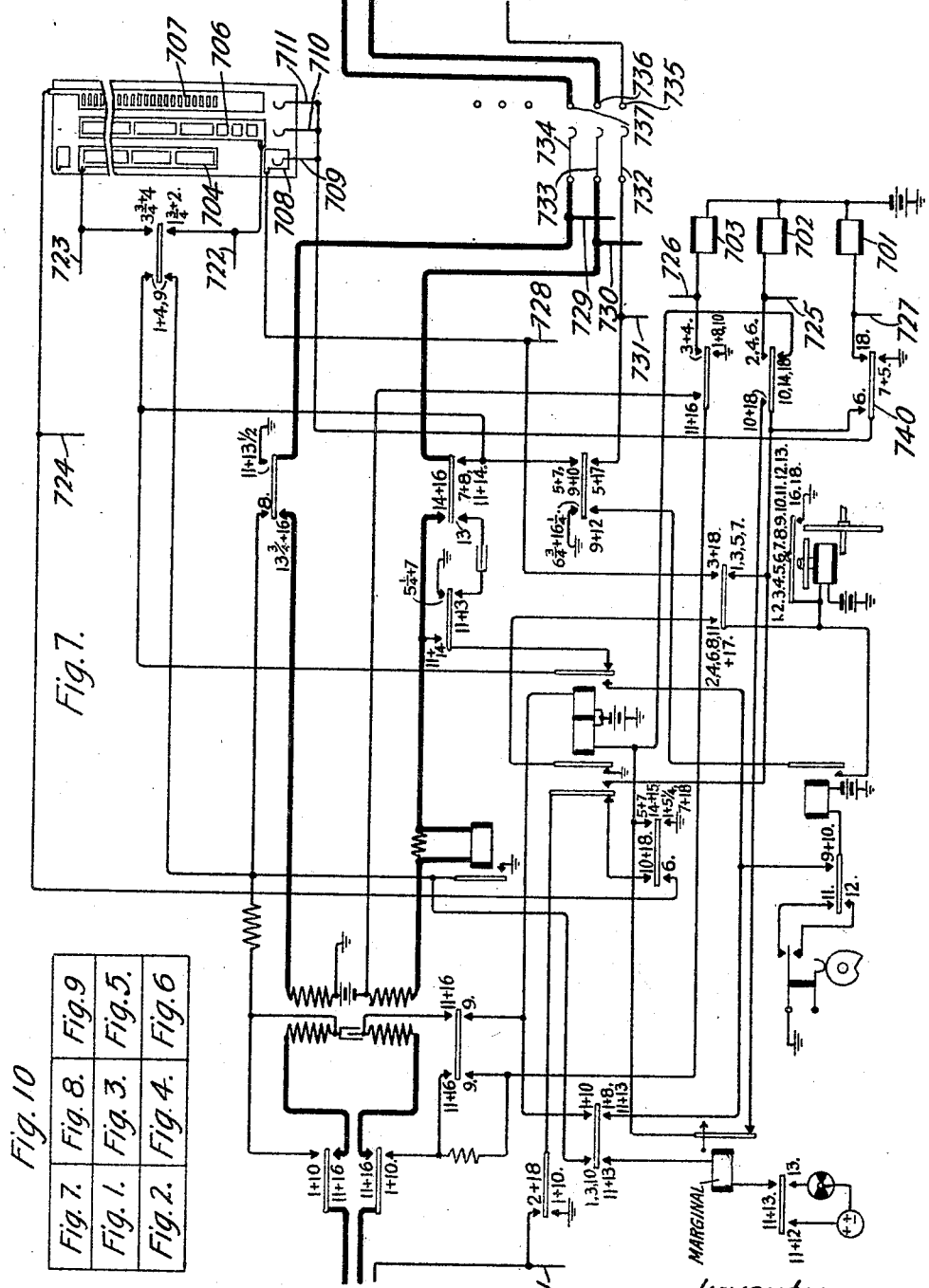

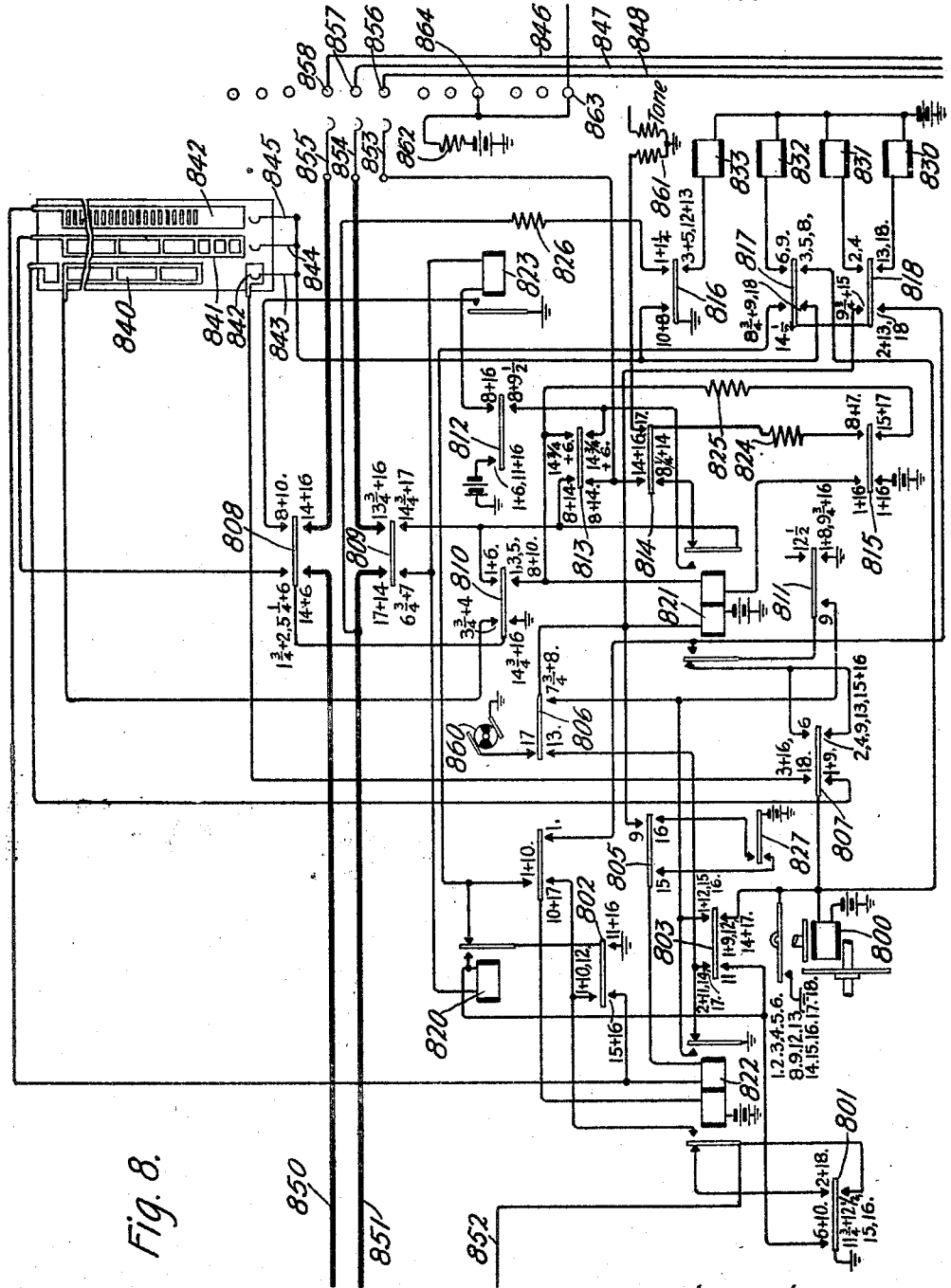

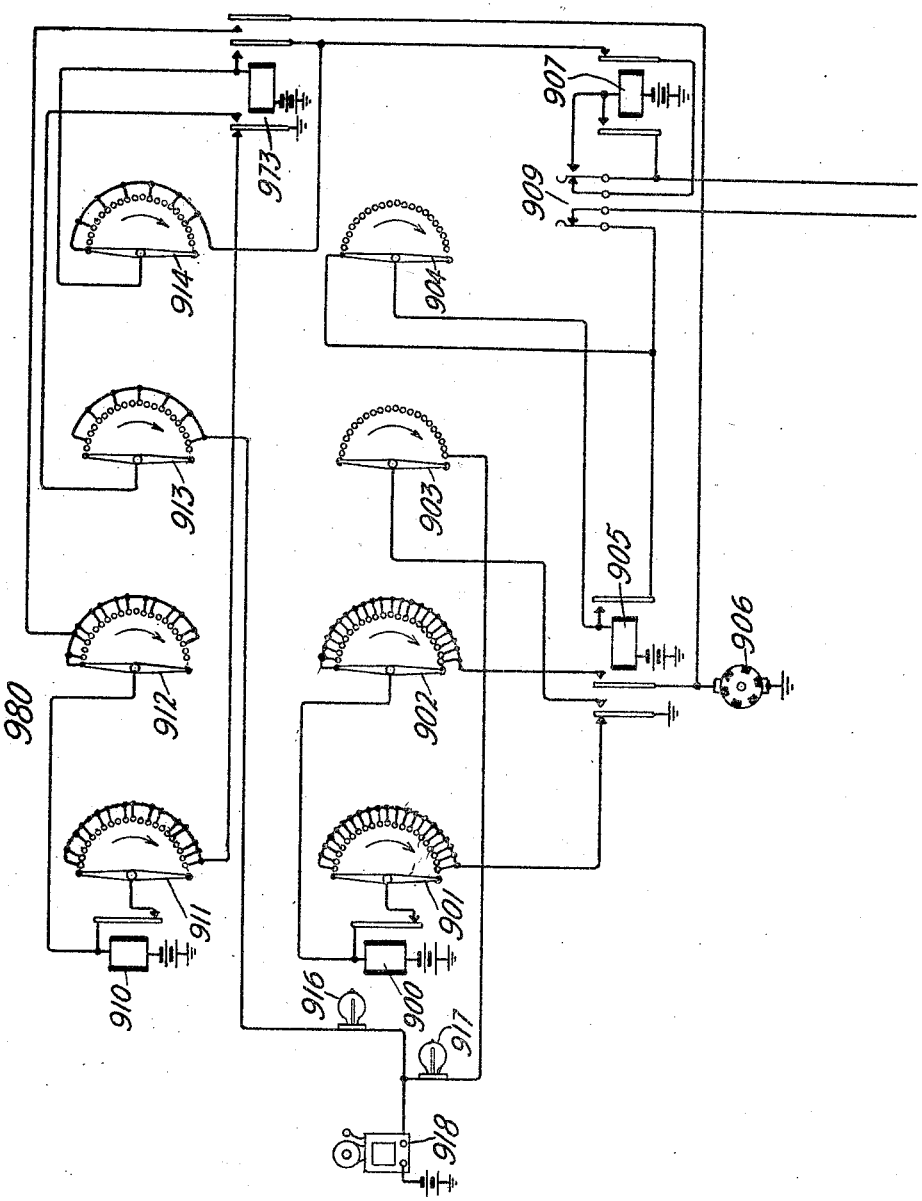

Patented Feb. 16, 1926.

1,573,413

UNITED STATES PATENT OFFICE.

HARRY W. MacDOUGALL, OF EAST ORANGE, NEW JERSEY, ASSIGNOR TO WESTERN ELECTRIC COMPANY, INCORPORATED, OF NEW YORK, N. Y., A CORPORATION OF NEW YORK.

AUTOMATIC TESTING SYSTEM TO TEST AUTOMATIC SWITCHES.

Application filed November 19, 1923. Serial No. 675,525.

*To all whom it may concern:*

Be it known that I, HARRY W. MAC-DOUGALL, a citizen of the United States, residing at East Orange, in the county of Essex and State of New Jersey, have invented certain new and useful Improvements in Automatic Testing Systems to Test Automatic Switches, of which the following is a full, clear, concise, and exact description.

This invention relates to a telephone exchange system, and more particularly to a testing system for use in a machine switching system for testing selector switch units.

It is an object of this invention to provide an improved testing system.

The switching units of an automatically operated telephone exchange are made up of control apparatus, relays and auxiliary circuits to control their automatic progression, and further control other switching units and the line apparatus. A large number of such switching units are required in a system of this kind, any of which may be arbitrarily selected when idle to complete a service connection. Thus, it is apparent that a switching unit giving inefficient service is not immediately noticed. Since the apparatus of a switching unit requires adjustment within limited variation, it is important that these units be regularly tested to determine their ability to render efficient service. In order to reduce the cost of such maintenance, it is desirable to use an automatically progressive testing system requiring a limited amount of manual operation. With this type of testing system, the routine test of the automatic selector switching units of an exchange may be very rapidly accomplished.

A feature of this invention relates to the use of common automatically progressive controlling equipment in combination with automatically progressive testing equipment to successively select switches to be tested and to variably direct the selected switches to progressively changing testing equipment.

A further feature of this invention is in the provision of an automatically progressive register to control the selection of the automatic switches to be tested.

Other features of this invention relate to means to manually direct the testing control device for a plurality of tests of particular automatic switches, means to arrest the progression of the testing system during any one of a plurality of tests of a switch, when an unstandard condition is encountered, means to repeat a plurality of tests of a switch or to repeat any one of said plurality of tests of a switch, and means to operate a compound timing device to limit the time for selecting a switch to be tested, and to limit the time for each of a plurality of tests of an automatic switch.

These and other features of the invention will be apparent from the following description taken in connection with the accompanying drawing.

While the invention has been disclosed as particularly adapted for testing switches of the panel type, it will be apparent, however, from the following description, that the invention has a wider utility and that by slight modification it could be adapted for testing other types of selector switches.

Fig. 1 shows keys to start an automatic routine test of final selector switches and keys to control special tests of particular final selector switches.

Fig. 2 illustrates register switches 50 and 70 connected to terminal strips. A cross connection is shown between the terminal strips and the contacts of the register arcs to illustrate a typical arrangement for an automatic routine test of final selector switches in a machine switching office. The register brushes 52 and 72 and their associated contacts are wired to control the movement of the register switches under control of the keys. The remaining register brushes and associated contacts are wired and cross connected in a manner to control the movement of the testing control circuit so that all final selector switches of the office may be tested.

Fig. 5 illustrates a plurality of testing devices operated in combination with Fig. 6. The position of the sequence switch in Fig. 5 controls the particular testing combination associated with a test line.

Fig. 7 shows an incoming selector switch used in combination with this testing device to associate the switch to be tested with the testing device. The incoming selector switch is used in regular service at all times when not associated with the testing circuit. During its association with the testing circuit it is known as a test selector and the movement of its elevator is controlled by the testing control circuit independent of the incoming selector sequence switch.

Fig. 8 shows a final selector switch and its auxiliary circuits. This is a typical final selector switch of the type to be tested by this testing system.

Fig. 9 illustrates a compound timing device operated in such a manner that switch 970 is progressively positioned to count a predetermined time period for the operation of the testing control circuit. Switch 970 is progressively positioned during the progressive movement of the testing control circuit and until a final selector switch to be tested is seized. Timing switch 980 is operated to time the period during which the final selector is under test.

The time period allotted for the operation of switches 970 or 980 is adjusted in such manner that should the various operations not be completed within a predetermined time, an alarm is sounded to indicate such condition to an attendant.

Fig. 10 is a diagram showing the order in which the sheets of drawings should be arranged.

Fig. 11 illustrates a tabulated diagram showing the location of the final selector switches on the panels and the necessary steps to test such final selector switches. The cross connection of the terminals illustrated in Fig. 2 is made in accordance with this diagram.

*Description of apparatus.*

Figure 1:
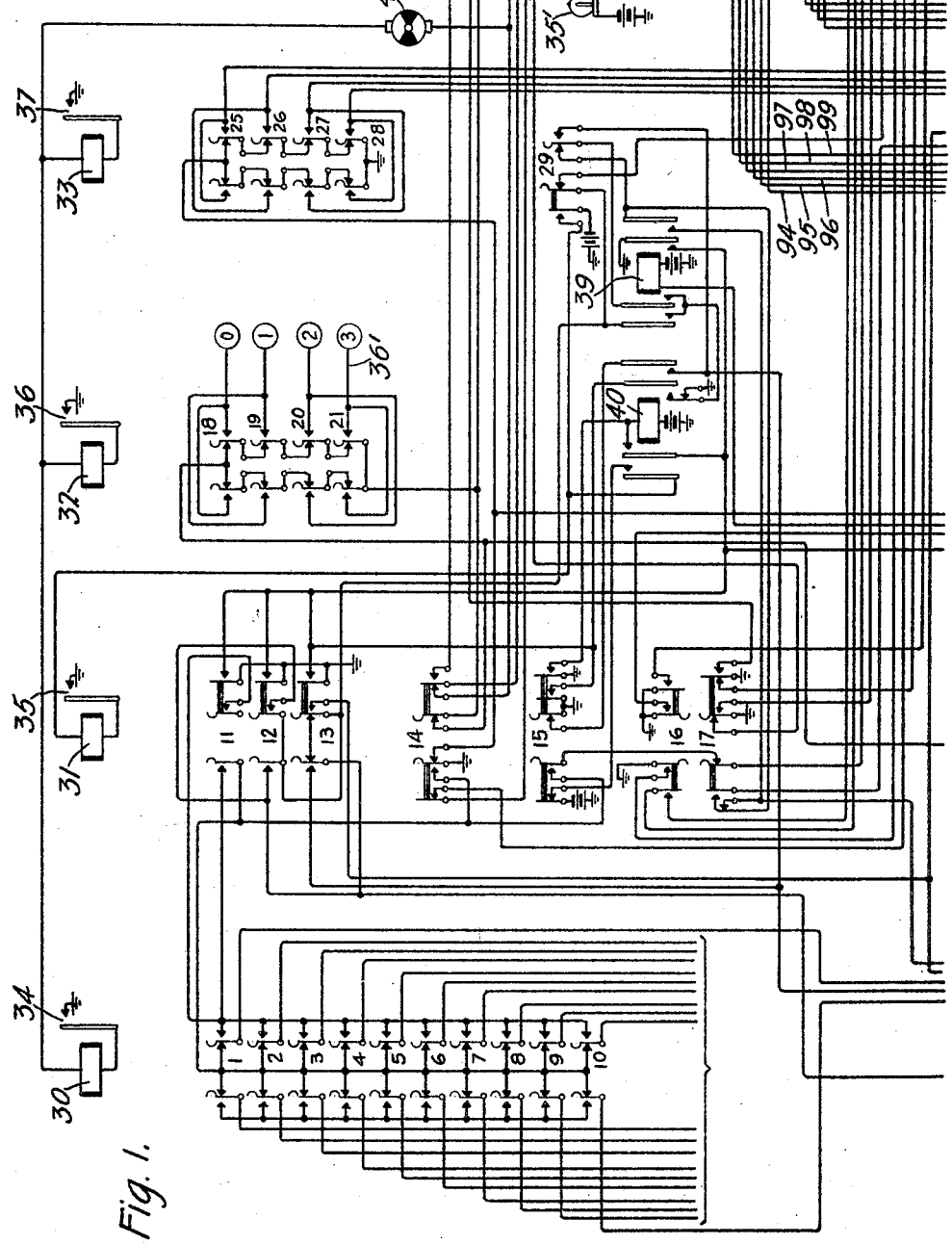

Keys 16 and 17, shown in Fig. 1, are the start keys to initiate an automatic routine test of the final selector switches of an office. Key 15 is for restoring the testing control circuit to normal. Keys 1 to 13 control register switches 50 and 70 for a particular test. Keys 18 to 21 and 25 to 28 further control the action of the testing control circuit during the test of particular automatic switches. Key 14 establishes miscellaneous circuits for particular testing control. Keys 1 to 13, 18 to 21, and 25 to 28, are mechanically locked and electrically released. Keys 14 to 17, inclusive, are the ordinary type of locking key which are manually released. Key 29 is a non-locking key used to advance the register switches 50 and 70 to make a new cycle of routine tests of the final selector switches.

Figure 2:
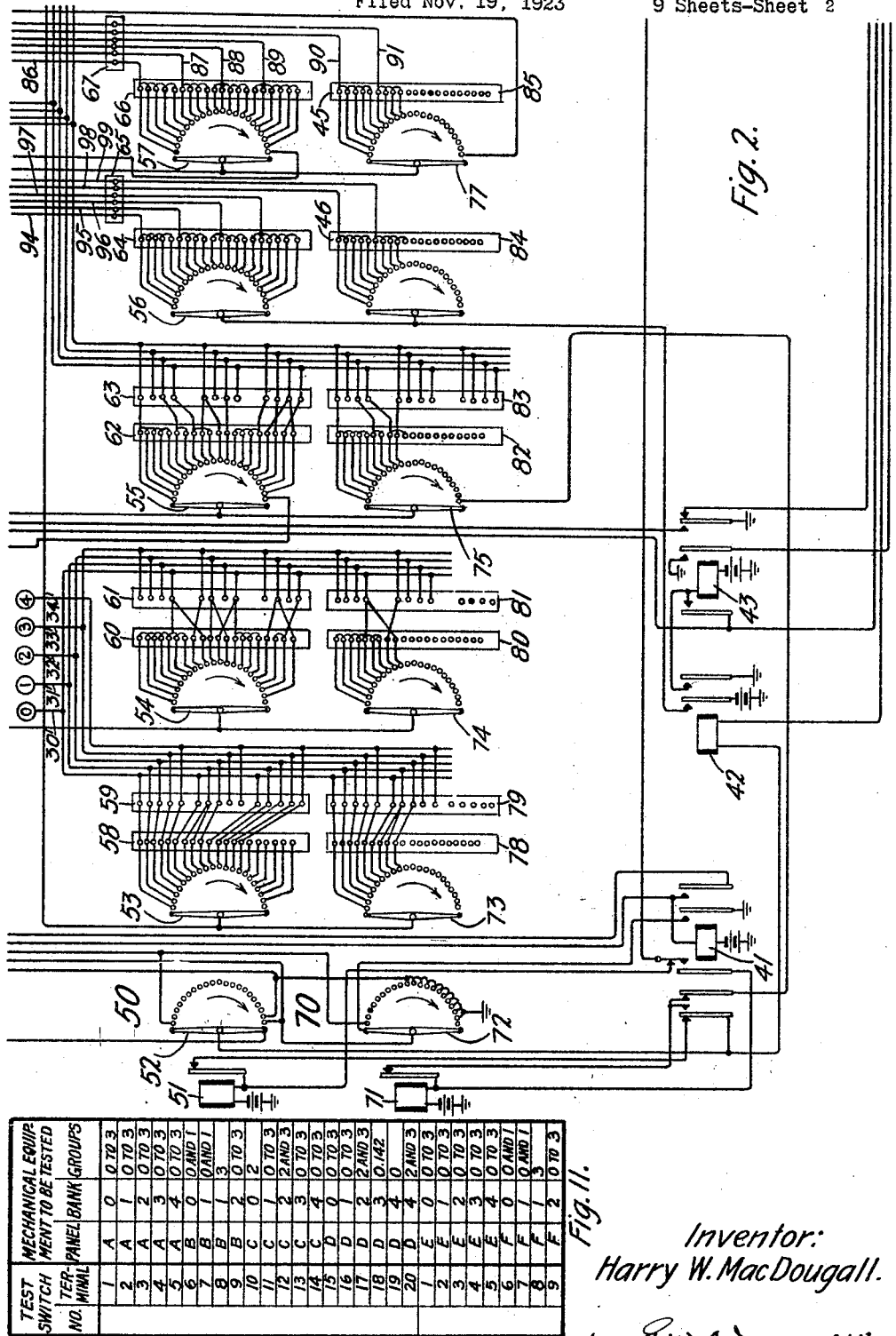
Figure 3:
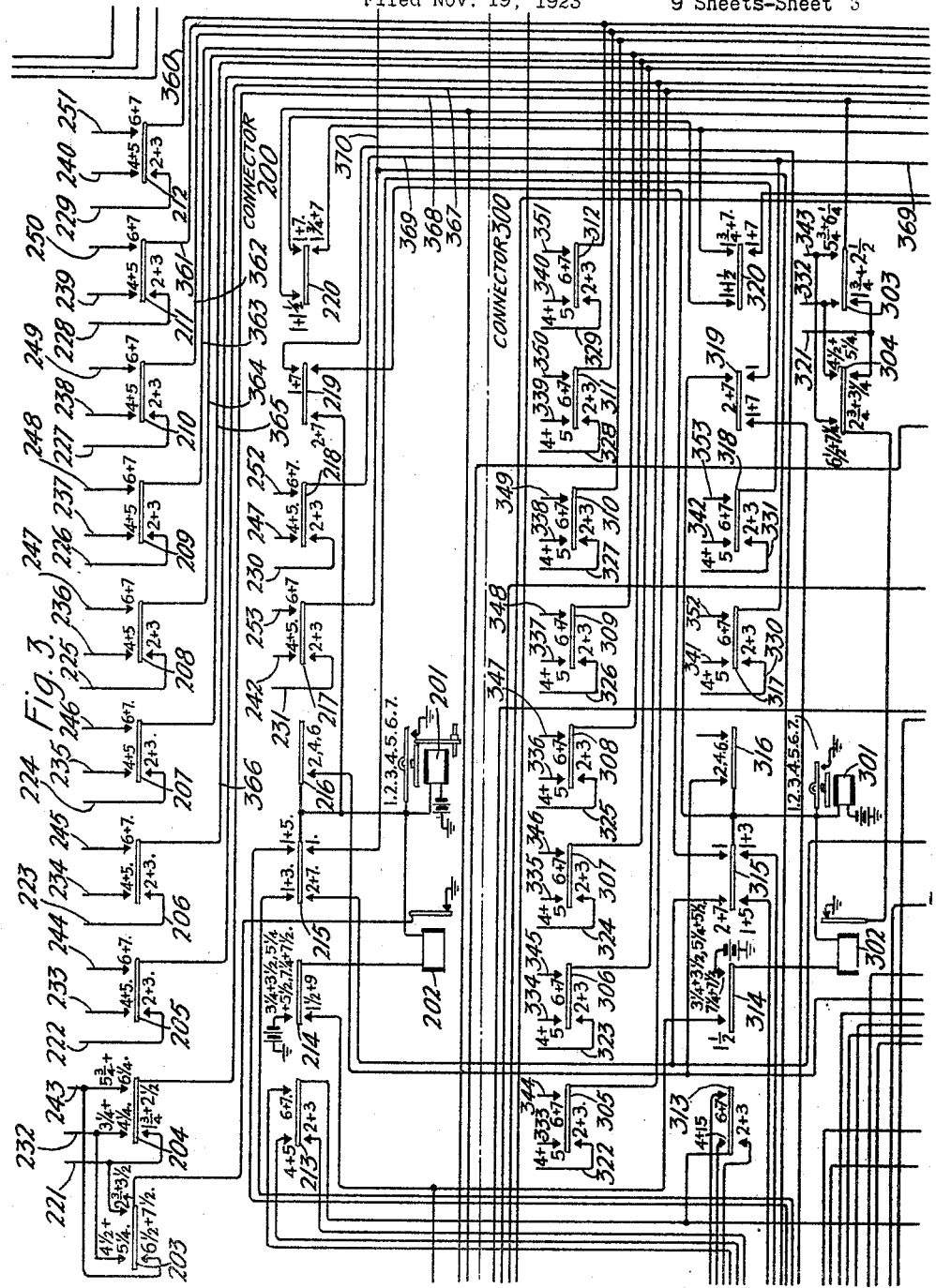
Fig. 3 illustrates connectors 200 and 300. These connectors are of the sequence switch type and are controlled in such manner that particular selector switches are removed from service and associated with the testing control circuit.

Register switches 50 and 70, shown in Fig. 2, the selector control switch 449 shown in Fig. 5, and the switches 970 and 980 of the timing device shown in Fig. 9 are of a well known step-by-step type. The switches shown in Figs. 3, 4, 5 and 6 are of the well known sequence switch type.

The incoming selector switch shown in Fig. 7 and the final selector switch shown in Fig. 8 are of the same character as the one shown and described in detail in Patent No. 1,123,696, issued January 5, 1915, to Edward B. Craft and John N. Reynolds. More specifically these selector switches and their auxiliary circuits are described in detail in Patent No. 1,395,977, issued November 1, 1921, to Franklin A. Stearn and Frederick J. Scudder.

*General description.*

An automatically progressive routine test of the final selector switches and their auxiliary circuits is initiated by the actuation of keys 16 and 17 to control the progression of register switch 50 from its normal position to position 1. In position 1 of register switch 50, various circuits are established through its brushes and contacts to position other switches of the testing control circuit and to associate a test selector switch with the testing control circuit. Taken in order, register brush 53 controls the brush selection of the test selector switch (Fig. 7). Register brush 54 controls the group selection of the test selector switch. Register brush 55 controls the number of final selector switches tested during the time that register switch 50 is resting in position 1. Register brush 56 controls the testing of the test selector to ascertain whether it is characterized as busy or idle. Register brush 57 controls the movement of the connector switch and thus controls the selection of the test selector switch to be used during the test of certain final selector switches.

With register switch 50 in position 1, connector 200 is rotated from its normal position 1 to position 2, thus associating the test selector switch shown in Fig. 7 with the testing control circuit. The test selector switch is then automatically tested by the testing control circuit to ascertain whether it is busy or idle. If it is idle, it is automatically removed from regular service. Upon seizure of the test selector switch, a relay is released in the testing control circuit to rotate the sequence switch shown in Fig. 4 in such manner as to further control connector 200. The connector is thus rotated to position 3 and, in thus rotating, establishes circuits to control further movement of the testing control circuit.

When the sequence switch (Fig. 4) has rotated to position 3, a circuit is established under the control of register brush 55 to position the selector control switch 449. The positioning of the selector control switch is for the purpose of pre-establishing the number of final selector switches to be automatically and progressively tested during the time that register switch 50 is resting in position 1.

The terminals 735, 736 and 737 represent one set of terminals mounted in a horizontal row on the final selector switch frame. There are a large number of like sets of terminals on this frame divided into what are known as panels. The panel of terminals is divided vertically into banks and the banks of terminals are divided vertically into groups. In one type of telephone system, the panel is sub-divided into five banks and the bank is divided into four groups. Above each group is a set of terminals known as overflow terminals. The purpose of the overflow terminals under ordinary service conditions, is to arrest the upward movement of the selector switch elevator that has hunted over a complete group of terminals and found them busy.

The testing control circuit is designed to direct the test selector to the first terminal of a particular group of terminals that are connected to final selector switches. When the test of said first final selector switch is completed, the test selector is advanced to the second final selector switch, stepping forward one set of terminals under the control of the testing control circuit. In this manner, the final selector switches connected to the terminals of one group are tested and the test selector steps from the last set of terminals in the group to the overflow terminal above the group. At this point of operation, certain apparatus in the testing control circuit is operated, including switch 449. The test selector switch is stepped from the overflow terminals to the first terminal of the group above the group that has been tested. Each time that an overflow terminal is encountered, switch 449 steps two terminals. Therefore, if selector control switch 449 is initially arrested in its forward movement in position 1, four groups of final selector switches are tested before switch 449 is again returned to normal. Upon the restoration of switch 449, the test selector is restored to normal and register switch 50 is advanced one position to again direct the test selector to a second series of final selector switches to be tested. Selector control switch 449 is again positioned to control the number of groups of final selector switches tested during the period of time that the register switch 50 is resting in position 2.

Figure 6:
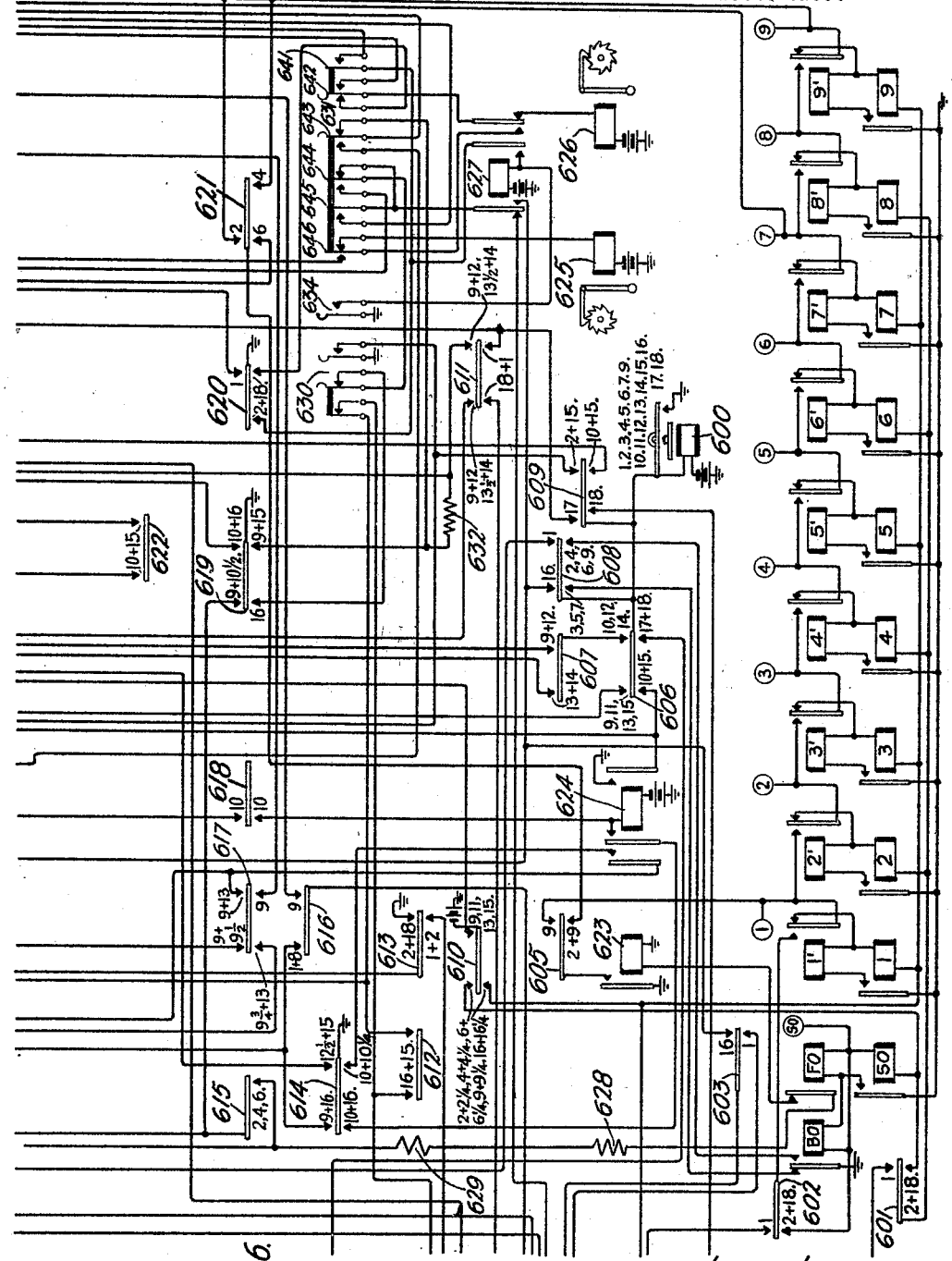
Fig. 6 shows a sender arranged to directively control the final selector switch under test and to control the progressively operable testing apparatus shown in Fig. 5.

When a final selector switch is chosen for test, the testing control circuit first ascertains whether it is busy or idle. If it is busy, the testing control circuit will remain thus connected until it becomes idle. The final selector switch may be connected in service, if so a connection of the testing control device to the final selector switch does not interfere with the service connection. Special provision is also made in the testing control circuit to automatically pass busy final selector switches. A key is operated to add this feature to the automatically progressive test. A key is also provided to be operated and released to step the testing control circuit off of a final selector switch permanently busy. If the final selector switch is idle, the apparatus shown in Figs. 5 and 6 is actuated to direct the final selector switch to test lines.

There are three test lines provided to which the final selector is directed for test. The first and second test lines are made permanently busy. The third test line is connected to the apparatus shown in Figs. 5 and 6, and the condition associated with the third test line is varied in accordance with the desired test of the final selector switch. The sequence switch shown in Fig. 5 is progressively positioned to vary the condition associated with the third test line. A plurality of tests are made upon each final selector switch and its auxiliary circuits. The automatic progression of these tests is in the following order:

1. Direct line idle.

A line extending to a subscriber's station will be known in this description as a direct line as differentiated from a line extending to a private branch exchange. The final selector switch is directed to the third test line. With the sequence switch shown in Fig. 5 resting in position 1, apparatus is operated in Fig. 5 to simulate a subscriber answering a call and replacing the receiver on the switchhook.

2. Direct line busy.

Upon the completion of test No 1, the final selector switch is restored to normal and the sequence switch (Fig. 5) is rotated to position 3 to change the condition associated with the third test line. The final selector switch is again directed to the third test line where a busy direct line is now simulated by the apparatus shown in Figs. 5 and 6. The final selector switch responds to this condition by attempting to send a busy tone and busy flash to the calling subscriber or to an operator. This flash is transmitted over conductor 851 to testing apparatus shown in Figs. 5 and 6. Upon the receipt of a predetermined number of such flashes, the final selector switch is again restored.

3. P. B. X. Line idle (first of group).

Upon the completion of test No. 2, the sequence switch shown in Fig. 5 is advanced to position 5.

For regular service the lines of a private branch exchange are connected to the line terminals in groups so that the final selector, finding the first line of a group to a particular P. B. X. busy, may hunt over the terminals connected to the other lines extending to that P. B. X. to find an idle line. The last or top line of a group of lines extending to a private branch exchange is wired in such manner that the final selector will not hunt further. Should this last line be a busy line, the final selector switch will return a busy tone and busy flash, the same as it would if connected to a direct line busy.

In this test, the final selector switch is directed to the third test line to which a condition is now connected representing a private branch exchange line that is idle.

4. Last P. B. X. line idle.

Upon the completion of test No. 3, the final selector is returned to normal and again directively positioned by the testing circuit, also the sequence switch shown in Fig. 5 is rotated from position 5 to position 7. In this test, it is directed to the first test line from which it hunts over the second test line and is arrested upon the third test line. As previously described, the first and second test lines are permanently wired to represent busy P. B. X. lines to test the hunting ability of the final selector switch. In this test the third test line is associated with apparatus in Fig. 5 to represent an idle P. B. X. line, the last one of a group.

5. Busy P. B. X. (last of group).

Upon completion of test No. 4, the final selector switch is restored to normal and again directed to test line No. 1. Also the sequence switch, shown in Fig. 5, is rotated from position 7 to position 9. The final selector switch now hunts over test lines Nos. 1 and 2 and is arrested when connected to test line No. 3. In this test, the apparatus associated with test line No. 3 represents a busy last line of a P. B. X. group. The final selector sequence switch now rotates to a position where the busy flash and interrupted ground are connected to the tip conductor 851. The flashing ground indicates to the testing circuit that the final selector has properly functioned for this test.

6. Intermediate P. B. X. line idle.

Upon the completion of test No. 5, the final selector switch is restored to normal and again directed to test line No. 1, also the sequence switch shown in Fig. 5 is rotated from position 9 to position 11. The final selector switch now hunts over test lines 1 and 2 and is arrested when connected to test line No. 3. In this test, apparatus is associated with test line No. 3 to represent one of the intermediate private branch exchange lines in a group of such lines.

7. No test.

Upon the completion of test No. 6, the final selector switch is restored to normal and the sequence switch, Fig. 5, is rotated to position 13. This test is made to simulate a service traffic condition brought about by a line maintained busy for a considerable period. The line is reported to a special operator who initiates a no test call to direct a final selector switch to the aforesaid busy line to investigate this condition.

The final selector switch is directed to the third test line. In this test a special means is used to control the final selector switch. The condition associated with test line No. 3 represents a direct line busy. The special means of control causes the final selector switch to be connected to the busy line instead of returning a busy tone and flash.

8. Time measure release.

Upon the completion of test No. 7, the final selector switch is restored to normal and the sequence switch, Fig. 5, is advanced to position 15. The purpose of this test is to determine the condition of the release apparatus when the final selector switch is connected to a called line with the receiver off the switchhook.

Figure 4:
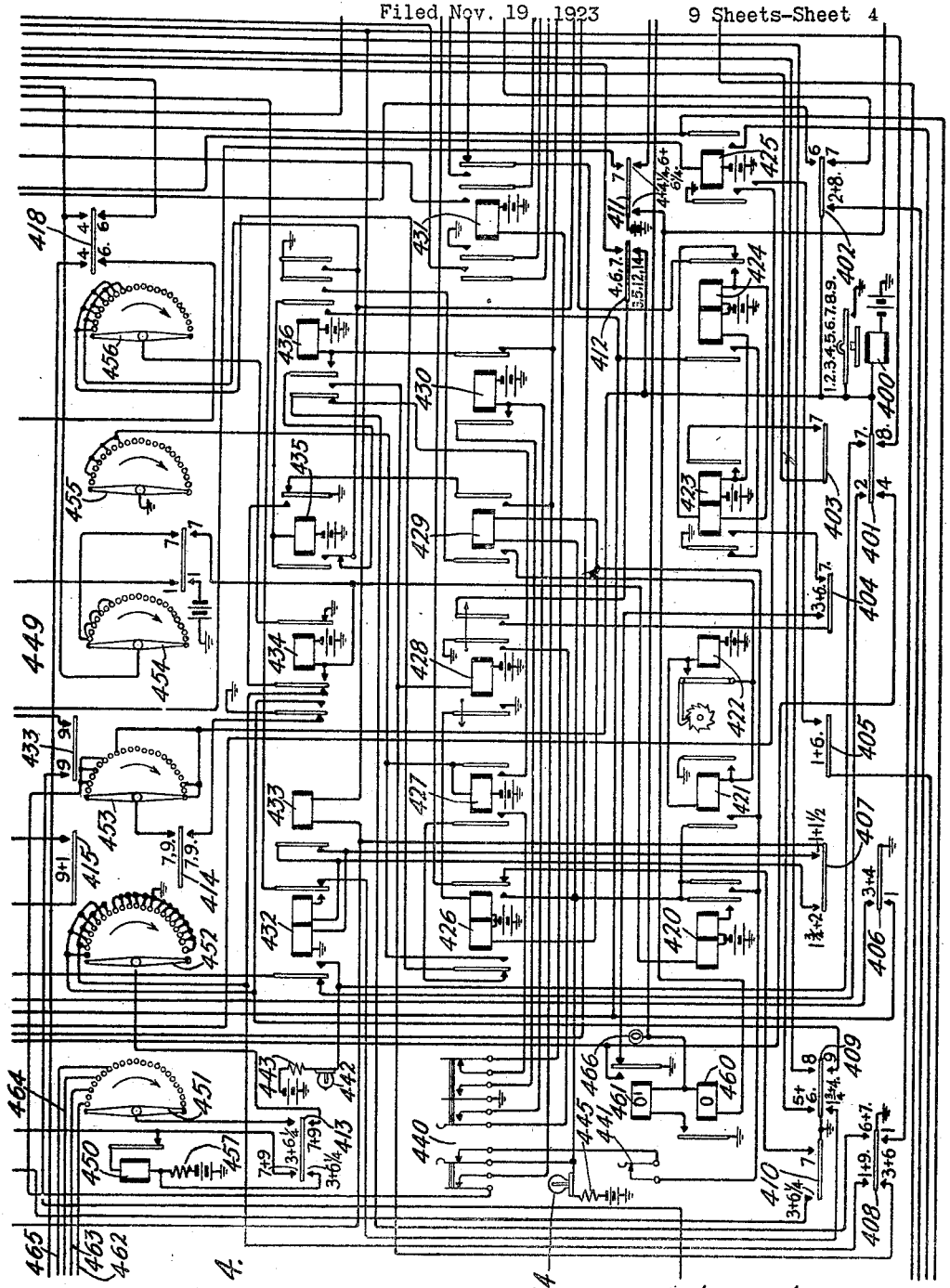
Fig. 4 illustrates apparatus and circuits to control the positioning of the test selector.

Upon the completion of test No. 8, the final selector switch is restored to normal and the sequence switch, Fig. 5, is advanced to a position to control the advance of the testing control circuit, Fig. 4. The actuation of the apparatus of Fig. 4 advances the test selector to a second final selector switch to be tested.

A plurality of test selectors are used to reach all of the final selector switches to be tested. Each test selector is connected to the conductors of connector 200 or 300. Conductors 221 to 231 inclusive are connected to one test selector; conductors 232 to 242, inclusive, are connected to a second test selector; conductors 243 to 253, inclusive, are connected to a third test selector, etc. Two connector switches are shown, there may, however, be any number of like connector switches used to associate a large plurality of test selectors with the test control circuit.

The testing control device may be manually controlled from a group of keys shown in Fig. 1 to directively position a particular test selector upon terminals connected to a particular group of final selector switches. Register switch 50 or 70 may be selectively chosen for rotation to a particular position. Also, either connector 200 or connector 300 may be selectively chosen for rotation to a particular test selector. The register switch and the connector switch not chosen remain in their normal positions of actuation. One of keys 18 to 21 directs the test selector to any one of four groups of final selector switches. The number of groups tested is regulated by the operation of one of keys 25 to 28.

The timing circuit shown in Fig. 9 is actuated when start keys 16 and 17 are operated, either to make an automatically progressive routine test or to make a particular test. A predetermined time interval is allowed for the testing control circuit to advance in a progressive manner to seize a test selector and direct it to the final selector switch to be tested and seize said final selector switch. When this is accomplished, a second timing device is started into operation to count a predetermined time interval of sufficient duration to allow a plurality of progressive tests of the final selector switch and its auxiliary circuits. Upon the operation of the second timing device, the first timing device is restored to normal and upon the completion of the test of the final selector switch the second timing device is restored to normal. During the time that the test selector is being advanced to the next final selector switch to be tested the first timing device is again operated. In this manner all operations of the testing system are covered by a timing device that will sound an alarm at any time that an operation is not completed within a predetermined time interval.

When an unstandard condition has been encountered by the testing device the automatic progression is arrested and the alarm is sounded to attract the attention of the maintenance man to the circuit in trouble. The maintenance man records the unstandard condition and ascertains its origin if possible. The testing device is arranged so that the test may be repeated any number of times if the final selector switch is found in an unstandard condition. When an unstandard condition is encountered that cannot be easily remedied, a record of the unstandard condition is made by the maintenance man and the testing circuit and testing control circuit are manipulated by key 630, shown in Fig. 6, to advance to the next final selector switch in the sequence of test.

Having now described in a general way the apparatus employed in conducting tests and the method in which it is to be used, it is thought that the invention will be better understood by the consideration of the specific manner in which it functions.

*Detail description.*

Let it be assumed that an automatic routine test is to be made of the final selector switches of an office. Start keys 16 and 17 shown in Fig. 1 are actuated. These keys remain locked throughout the automatically progressive routine test of the final selectors. Various circuits are established by the operation of the start keys that are not effective at this time, and will be described upon the actuation of apparatus over circuit paths through the key contacts.

The actuation of start key 17 establishes a circuit to operate start relay 425. This circuit may be traced from grounded battery, through the winding of relay 425, right lower and left upper contacts of sequence switch spring 320, upper contacts of sequence switch spring 220, to ground through the right outer contacts of key 17. Relay 425 in attracting its left armature establishes a circuit to actuate magnet 51 of register 50. This circuit may be traced from grounded battery, through the winding and contacts of register magnet 51, left outer contact and armature of relay 41, brush 52 and its associated normal contact, left and right normal contacts of key 13, left inner normal contacts of key 29, to ground through the left contact and armature of start relay 425. The actuation of register magnet 51 rotates register 50 from its normal position to position 1. The operation of start relay 425 further establishes a circuit through the winding of relay 42. This circuit may be traced from grounded battery, through the winding and contacts of register magnet 51, left outer normal contact and armature of relay 41, winding of relay 42, contact of sequence switch spring 405 to ground through the left contact and armature of relay 425. Relay 42 is prevented from operating until register switch 50 has rotated from its normal position to position 1, by a ground shunt previously traced to actuate register magnet 51. Upon the positioning of register 50 in position 1, this ground shunt is removed to cause the operation of relay 42. Relay 42 is sufficiently high in resistance to prevent register magnet 51 from again operating.

The circuit established through the right inner contact and armature of relay 42 is not effective at this time. An obvious circuit is established through the right outer contact and armature of relay 42 to operate relay 43.

The operation of relay 43 establishes a locking circuit for itself which may be traced from grounded battery, through its winding, left contact and armature to ground through the right inner contacts of key 16. The operation of relay 43 further establishes a circuit to operate relay 39. This circuit may be traced from grounded battery, through the winding of relay 39, to ground through the left outer contact and armature of relay 43. The circuits established by the operation of relay 39 are not effective at this time.

The rotation of register switch 50 from its normal position to position 1 establishes various circuits taken in order as follows:—

The positioning of register brush 57 establishes a circuit to rotate connector 200 from position 1 to position 2. This circuit may be traced from grounded battery, through the winding of sequence switch magnet 201, right lower contact of sequence switch spring 215, lower contacts of sequence switch spring 319, terminal strip 67, cross-connection 86, terminal strip 66, brush 57, and its associated contact, left outer contacts of key 17, right normal contacts of key 29, left inner armature and contact of relay 39 to ground through the left inner normal contacts of relay 40. Connector 200 now in position 2 associates the testing control circuit with the test selector shown in Fig. 7. This association is through conductors 221 to 231 respectively of connector 200 and conductors 721 to 731 respectively of the test selector of Fig. 7. The circuits established over each conductor will be hereinafter described during the directive control of the test selector, Fig. 7.

The rotation of connector 200 into position 2 establishes a circuit through register brush 56 to ascertain the condition of the test selector. The test selector used in conjunction with the testing control circuit is an incoming selector switch ordinarily used to complete service connections, and must be removed from service to be used as an adjunct to the testing control circuit. The circuit established to ascertain the condition of the test selector may be traced from grounded battery, through the right inner armature and contact of relay 42, register brush 56, and its associated contact, terminal strip 64, terminal strip 65, lower contact of sequence switch spring 213, right upper contact of sequence switch spring 407, left winding of relay 432 to ground, operating relay 432. The operation of relay 432 establishes a circuit to rotate the sequence switch shown in Fig. 4. This circuit may be traced from grounded battery, through the winding of sequence switch magnet 400, right upper contact of sequence switch spring 401, left contact and armature of relay 432, to ground through the left inner contacts of key 16. The sequence switch shown in Fig. 4 now rotates from position 1 to position 2, where a double test of the condition of the test selector is made. The test selector may be busy in service. This is characterized by a ground connected to conductor 721, by an associated switch or the auxiliary circuits shown in Fig. 7. The test selector may be idle, characterized by the absence of ground at conductor 721. It, however, may not have restored the switch elevator, to its normal position. A test for both of the above conditions is made simultaneously.

The circuit to test the position of the selector switch elevator may be traced from grounded battery, through the left inner armature and contact of relay 42, register brush 56 and its associated contact, terminal strips 64 and 65 lower contact of sequence switch spring 213, winding of relay 433, conductor 361, lower contact of sequence switch spring 211, conductor 228, conductor 728, commutator segment 708, brush 709, to ground through lower contact of sequence switch spring 740. It is apparent that if the selector switch elevator is not in its normal position, brush 709 is not engaged with commutator segment 708, and thus a circuit is not established to operate relay 433, and the operating circuit for relay 432 is thus maintained through its left winding. This circuit may be traced from ground through the left winding of relay 432, contact and armature of relay 433, left upper contact of sequence switch spring 407 and thence to grounded battery connected to the armature of relay 42 as previously traced.

The test selector may be characterized as busy from a service connection preceding the movement of the elevator switch from its normal position. The circuit for testing this condition may be traced from grounded battery, through the right inner contact and armature of relay 42, register brush 56 and its associated contact, terminal strip 64, terminal strip 65, lower contact of sequence switch spring 213, left upper contact of sequence switch spring 407, right winding, contact and armature of relay 432, conductor 368, lower contact of sequence switch spring 204, conductor 221, conductor 721, to a ground characterizing the test selector as busy. Relay 432 is now maintained in an operated position until the test selector, Fig. 7, becomes idle. During the period of time that relay 432 is maintained in an operated position, a circuit is established to light lamp 442 to indicate that the testing control circuit is associated with a busy test selector. This circuit may be traced from grounded battery, through resistance 443, lamp 442, left contact and armature of relay 432, to ground through the left inner contacts of key 16.

Assuming that the test selector, Fig. 7, is idle and that its elevator is resting in its normal position, relay 433 is operated. Also, since ground is not connected to conductor 721, there is no circuit to maintain relay 432 in an operated position and it therefore releases.

The release of relay 432 establishes a circuit to rotate the sequence switch, Fig. 4, to position 3. This circuit may be traced from grounded battery, through the winding of sequence switch magnet 400, left upper contact of sequence switch spring 401, left normal contact and armature of relay 432, to ground through the left inner contacts of key 16.

In sequence switch position 3, a circuit is established to actuate switch magnet 450 to rotate the test selector control switch 449. This circuit may be traced from grounded battery, through resistance 457, winding and contacts of switch magnet 450, left outer contacts of key 16, to ground through the left upper contact of sequence switch spring 410. The test selector control switch 449 is now rotated under the control of its self-interrupting contact. The method used to arrest the rotation of switch 449, is to shunt the current flow through magnet winding 450 thus reducing the current flow to a non-operate value with relation to magnet 450. This circuit may be traced from ground through the left inner contacts of key 14, register brush 55, and its associate contact in position 1, terminal strip 62, terminal strip 63, conductor 462, brush 451, and its associate contact in position 1, right upper and left lower contacts of sequence switch 423, resistance 457 to grounded battery. The test selector control switch 449 is thus arrested in position 1. Test selector control switch 449 is positioned as described to count the number of subgroups tested in a test group. It is variously positioned according to the number of subgroups to be tested in the test group selected by the position of register switch 50. The progression of switch 449 will be hereinafter described.

A further circuit is established in position 3 of the sequence switch Fig. 4 to operate relay 428. This circuit may be traced from grounded battery, through the winding of relay 428, to ground through the left lower contact of sequence switch spring 408. The operation of relay 428 establishes an obvious circuit through its left contact and armature to operate relay 426. A circuit is also established to rotate the sequence switch from position 3 to position 4. This circuit may be traced from grounded battery, through the winding of magnet 400, right outer armature and contact of relay 428, left upper contact of sequence switch spring 404, to ground through the normal contact and armature of the 0' counting relay 461.

In positions 3 and 4 of the sequence switch Fig. 4, a circuit is established to rotate connector 200 from position 2 to position 3. This circuit may be traced from grounded battery, through the winding of magnet 201, lower contact of sequence switch spring 216, to ground through the upper contact of sequence switch spring 406.

It will be noted that upon the seizure of the test selector, a busy ground is connected from the test control circuit to conductor 721 of Fig. 7. This circuit may be traced from ground through the left lower contact of sequence switch spring 409, right normal contact and armature of relay 432, upon its release as previously described, conductor 368, lower contact of sequence switch spring 204, conductor 221 and conductor 721 of Fig. 7. This ground characterizes the test selector switch as busy so that it will not be seized for service connections. Upon the movement of connector 200 from position 2 to position 3, the busy ground traced through the contact and armature of relay 432 is replaced by a ground that may be traced through the contact and armature of relay 202, right upper contact of sequence switch spring 203, conductor 221 and conductor 721 of Fig. 7. The purpose of connecting the busy ground from relay 202 of connector 200 is to maintain the test selector Fig. 7 busy to service switches during the period of time it is associated with the testing control circuit. The sequence switch, Fig. 4, will make a plurality of revolutions during this time.

It will be remembered that relay 426 is held in an operated position from ground through the contact of relay 428. The operation of relay 426 establishes a circuit to operate relay 427. This circuit may be traced from grounded battery, through the winding of relay 427, left contact and armature of relay 426, brush 456 and its associated contact in position 1, to ground through the right armature and contact of relay 434. Relay 427 in operating, establishes a locking circuit for itself which is effective in positions 6 and 7 of the sequence switch. It will be noted that the actuating circuit for relay 427 is opened when the sequence switch rotates out of position 6. This locking circuit may be traced from grounded battery, through its winding, right armature and contact, left outer normal contact and armature of relay 436, to ground through the right upper contact of sequence switch spring 408.

It will be remembered that the sequence switch, Fig. 4, is now in position 4. In this position, circuit paths are established to directively control the test selector for brush selection in accordance with the position of register 50. A circuit is accordingly established to energize the updrive magnet 702. This circuit may be traced from grounded battery, through the winding of magnet 702, conductor 725, conductor 225, lower contact of sequence switch spring 208, conductor 364, upper contact of sequence switch spring 412, right outer armature and contact of relay 428, left upper contact of sequence switch spring 404 to ground through the contact and armature of the 0' counting relay 461. Simultaneous with the establishment of the above traced circuit, a fundamental circuit is established to operate counting relays for the brush selection of the test selector. This circuit is effective upon the upward movement of the test selector switch elevator causing the engagement of brush 710 with the commutator segment 706. Upon this engagement, a circuit may be traced from ground through the lower contact of sequence switch spring 740, brush 710, commutator segment 706, conductor 722, conductor 222, lower contact of sequence switch spring 205, conductor 367, upper contacts of sequence switch spring 418, register brush 53, and its associated contact in position 1, terminal strip 58, terminal strip 59, conductor 30, conductor 466, winding of 0 counting relay 460, left lower contact of sequence switch spring 411 to grounded battery. The 0 counting relay 460 operates in the fundamental circuit traced to establish a locking circuit for itself and an operating circuit for the 0' counting relay. This operating circuit is effective upon the upward movement of the test selector switch elevator when brush 710 is engaged with a non-conducting portion of commutator segment 706, thus removing the shunt ground from the 0' counting relay 461. This operating circuit and locking circuit may be traced from ground through the armature and contact of the 0 counting relay 460, winding of 0' counting relay 461, winding of 0 counting relay 460 to grounded battery through the left lower contact of sequence switch spring 411.

The operation of the 0' counting relay 461 opens the energizing circuit for updrive magnet 702, thus arresting the upward movement of the test selector switch elevator. It will be noted that the zero bank in the panel has been selected for test. The operation of the 0' counting relay 461 further establishes a circuit to rotate the sequence switch Fig. 4 from position 4 to position 5. This circuit may be traced from ground through the armature and contact of 0' counting relay 461, left lower contact of sequence switch spring 401, winding of sequence switch magnet 400, to grounded battery. Upon the rotation of the sequence switch from position 4 to position 5, the locking circuit for 0 and 0' counting relays 460 and 461 is opened to cause their release. The release of the counting relays establishes a circuit to rotate the sequence switch, Fig. 5 to position 6. This circuit may be traced from ground, through the normal armature and contact of 0' counting relay 461, left upper contact of sequence switch spring 404, right outer contact and armature of relay 428, lower contact of sequence switch spring 412, winding of sequence switch magnet 400 to grounded battery.

In position 6 of the sequence switch, Fig. 4, circuits are established to directively control the test selector for group selection and to actuate trip magnet 703. The circuit for actuating trip magnet 703 may be traced from grounded battery, through the winding of magnet 703, conductor 726, conductor 226, lower contact of sequence switch spring 209, conductor 363 to ground through the left upper contact of sequence switch spring 409. The actuation of trip magnet 703 positions the trip rod in a manner to trip the brushes of the zero bank upon further upward movement of the test selector switch elevator. The actuating circuit for updrive magnet 702 may be traced from grounded battery, through the winding of magnet 702, conductor 725, conductor 225, lower contact of sequence switch spring 208, conductor 364, upper contact of sequence switch spring 412, right outer armature and contact of relay 428, left upper contact of sequence switch spring 404 to ground through the normal contact and armature of the 0' counting relay 461. The test selector switch elevator is now driven in an upward movement to associate brush 709 with the segments of commutator 704. Upon the engagement of brush 709 with the conducting portion of commutator segment 704, the fundamental circuit is established to operate the counting relays. This circuit may be traced from ground through the lower contact of sequence switch spring 740, brush 709, commutator segment 704, conductor 723, conductor 223, lower contact of sequence switch spring 206, conductor 366, lower contacts of sequence switch spring 408, right inner contacts of key 14, register brush 54 and its associated contact, terminal strip 60, terminal strip 61, conductor 30, conductor 466, winding of 0 counting relay 460, to grounded battery through the left lower contact of sequence switch spring 411. The 0 counting relay is operated in the circuit traced to establish a locking circuit for itself and an operating circuit for the 0' counting relay 461 which is effective upon further upward movement of the test selector switch elevator, as previously described. The operating circuit for the 0' counting relay is the same as previously described.

The 0' counting relay in attracting its armature opens the energizing circuit for up-drive magnet 702 arresting the upward movement of the test selector switch elevator. Brushes 732, 733 and 734 of the test selector switch are now engaged with the first set of terminals in the zero group of the zero bank to which the final selector switch, Fig. 8 is associated.

The 0' counting relay in attracting its armature, further establishes a circuit to rotate the sequence switch, Fig. 4, from position 6 to position 7. This circuit may be traced from ground, through the armature and contact of the 0' counting relay, left outer contacts of key 14, upper contact of sequence switch spring 402, winding of sequence switch magnet 400 to grounded battery.

In position 7, the final selector switch Fig. 8, is tested to ascertain whether it is busy or idle. A busy final selector is characterized by ground connected to terminal 735. Assuming that a busy final selector is encountered, a circuit is established through the left winding of relay 426. This circuit may be traced from grounded battery, through the left winding of relay 426, contacts of key 441, left inner contacts of key 440, right contact and armature of relay 426, left outer contacts of key 630, left normal contact and armature of relay 523, left normal contact and armature of relay 524, conductor 370, lower contact of sequence switch spring 217, conductor 231, conductor 731, brush 732, terminal 735, to ground through the right upper contact of sequence switch spring 801. It will be noted that the actuating circuit for relay 428 is opened upon the rotation of the sequence switch, Fig. 4, from position 6 to position 7, and upon the release of relay 428, the energizing circuit through the right winding of relay 426 is opened, but the circuit established to a busy terminal selector, through the left winding of relay 426 maintains this relay in an operated position. During the period of time that relay 426 is maintained operated from a circuit through its left winding to a busy final selector, lamp 444 is lighted. The circuit for lighting lamp 444 may be traced from grounded battery, through resistance 445, lamp 444, right contact and armature of relay 426, to the ground characterizing the final selector as busy as previously traced. When an idle final selector is encountered by the test selector and the sequence switch, Fig. 4, rotates to position 7, a circuit is not established through the left winding of relay 426, and therefore it releases.

The release of relay 426 establishes a circuit to characterize the idle final selector circuit busy to other selector switches attempting to seize it for service connection. This circuit may be traced from ground, through the right upper contact of sequence switch spring 410, right normal contact and armature of relay 426, and thence over the path previously traced to terminal 735. It will be remembered that relay 427 is maintained in an operated position. The release of relay 426 further establishes a circuit through the contact and armature of relay 427, to operate relay 431. This circuit may be traced from grounded battery, through the winding of relay 431, right outer contacts of key 440, left contact and armature of relay 427, left normal contact and armature of relay 426, brush 456, and its associated contact, to ground through the right normal armature and contact of relay 434.

The operation of relay 431 establishes circuit paths from the tip and ring conductor of the final selector circuit switch, Fig. 8, to the test and control circuit, Figs. 5 and 6. The tip and ring circuits will be traced upon the establishment of the fundamental circuit to directively control the final selector switch. Relay 431 in attracting its right outer armature, transfers the alarm circuit leads. This will be described in detail in connection with the compound alarm circuit shown in Fig. 9. The operation of relay 431 further establishes a circuit to rotate the sequence switch shown in Fig. 6 from its normal position 1 to position 2. This circuit may be traced from grounded battery, through the winding of sequence switch magnet 600, right upper contact of sequence switch spring 608, lower contacts of sequence switch spring 504, to ground through the left inner contact and armature of relay 431.

A multi-test is now made of the operating functions of the final selector switch and its auxiliary circuits as outlined in the general description. To make this multi-test key 631 is actuated. With key 631 in its normal position only one of the plurality of tests is made. The test made depends upon the position of the sequence switch Fig. 5.

In position 2 of the sequence switch Fig. 6, a circuit is established to operate relay 518, Fig. 5, for a continuity test of the ring conductor of the final selector circuit Fig. 8. This circuit may be traced from grounded battery, through the winding of relay 518, upper contact of sequence switch spring 505, left upper contact of sequence switch spring 616, right inner contact and armature of relay 431, conductor 369, lower contact of sequence switch spring 218, conductor 230, conductor 730, brush 733, terminal 736, conductor 851, resistance 826 to ground through the right upper contact of sequence switch spring 816.

In position 2 of the sequence switch Fig. 6, the fundamental circuit is established to directively control the positioning of the final selector switch Fig. 8. This circuit may be traced from grounded battery, through the left lower and upper contact of sequence switch spring 815 shown in Fig. 8, right winding of relay 821, right lower contact of sequence switch spring 810, left lower contact of sequence switch spring 808, conductor 850, terminal 737, brush 734, conductor 729, conductor 229, lower contact of sequence switch spring 222, conductor 360, left upper contact and armature of relay 431, contact and armature of relay 518, lower contact of sequence switch spring 615, resistance 629, resistance 628, normal contact and armature of counting relay FO, winding of stepping relay 632 to ground. The stepping relay 623 and relay 821 operate in the circuit traced.

The operation of relay 821 establishes a circuit to operate relay 822. This circuit may be traced from grounded battery, through the left winding of relay 822, right lower contact of sequence switch spring 804, left contact and armature of relay 821, to ground through the right lower contact of sequence switch spring 811. The operation of relay 822 establishes a circuit to rotate the sequence switch Fig. 8 from position 1 to position 2. This circuit may be traced from grounded battery, through the winding of sequence switch magnet 800, right lower and upper contacts of sequence switch spring 803 to ground through the right contact and armature of relay 822. Upon the rotation of sequence switch Fig. 8 from position 1 to position 2, a circuit is established for relay 821. This circuit may be traced from grounded battery, through the left lower and upper contacts of sequence switch spring 815, right winding of relay 821, right upper and lower contacts of sequence switch spring 813, right contact and armature of relay 821, right upper contact of sequence switch spring 810, left lower contact of sequence switch spring 808 and thence over the fundamental circuit to ground through the winding of the stepping relay 623 as previously traced.

In position 2 of the sequence switch Fig. 8, a further circuit is established to actuate the high speed updrive magnet 831. This circuit may be traced from grounded battery, through the winding of magnet 831, right upper and left lower contacts of sequence switch spring 808, left contact and armature of relay 821 to ground through the right lower contact of sequence switch spring 811. The final selector switch elevator is now driven upward to make final brush selection. Upon the upward movement of the selector switch elevator, brush 844 is intermittently brought into engagement with the conducting and non-conducting portions of commutator segment 841 to establish a shunt to intermittently operate and release stepping relay 623. The initial engagement of brush 844, with the first conducting portion of commutator segment 841, establishes a shunt to release stepping relay 823. This shunt circuit may be traced from ground through the left upper contact of sequence switch spring 816, brush 844, conducting portion of commutator segment 841, left upper contact of sequence switch spring 808, to a junction point in the fundamental circuit to release stepping relay 623 and to maintain relay 821 in an operated position.

The initial operation of stepping relay 623 shown in Fig. 6 establishes a circuit to operate counting relay 9. This circuit may be traced from ground through the armature and contact of relay 623, lower contact of sequence switch spring 605, upper contact of sequence switch spring 621, normal armature and contact of counting relay 9', winding of counting relay 9, lower contact of sequence switch spring 610, to grounded battery. The operation of counting relay 9 establishes a locking circuit for itself and an operating circuit for relay 9' which is effective upon the removal of the shunt by the release of the stepping relay 623. This circuit may be traced from grounded battery, through the lower contact of sequence switch spring 610, winding of counting relay No. 9, winding of counting relay No. 9', contact and armature of counting relay No. 9' to ground. As hereinbefore stated, the stepping relay 623 is intermittently operated and released upon the upward movement of the final selector switch elevator.

Upon the engagement of brush 844, with the non-conducting portion of commutator segment 841, next above the first conducting portion of said commutator, the stepping relay 623 is again energized to establish a circuit for counting relay No. 8. This circuit may be traced from ground through the armature and contact of stepping relay 623, lower contact of sequence switch spring 605, upper contact of sequence switch spring 621, armature and contact of counting relay No. 9', normal armature and contact of counting relay No. 8', winding of counting relay No. 8, lower contact of sequence switch spring 601, upper contact of sequence switch spring 610 to grounded battery. The operation of counting relay No. 8 establishes a locking circuit for itself and an operating circuit for counting relay No. 8' which is effective upon the release of stepping relay 623. The release of relay 623 occurs upon the engagement of brush 844 with the conducting portion of commutator segment 841 next above the non-conducting portion of said segment. As the final selector switch elevator moves upward, the counting relays are operated in sequence as described for counting relays 9, 9', 8 and 8' until a circuit is established to operate counting relays SO, FO and BO. The operation of counting relay FO opens the fundamental circuit to release relay 821 shown in Fig. 8. The release of relay 821 opens the energizing circuit for the high speed updrive magnet 831, arresting the upward movement of the selector switch elevator. The release of relay 821 further establishes a circuit to rotate the sequence switch Fig. 8 from position 2 to position 3. This circuit may be traced from grounded battery, through the winding of sequence switch magnet 800, right lower contact of sequence switch spring 807, left normal contact and armature of relay 821 to ground through the right lower contact of sequence switch spring 811. The sequence switch is arrested in this position until the fundamental circuit is again established.

The operation of counting relay BO establishes a circuit to rotate the sequence switch shown in Fig. 6 from position 2 to position 3. This circuit may be traced from grounded battery, through the winding of sequence switch magnet 600, right lower contact of sequence switch spring 608, to ground through the contact and armature of the BO counting relay. The rotation of the sequence switch, Fig. 6, from position 2 to position 3, opens the locking circuit for the counting relays to cause their release. The release of counting relay BO establishes a circuit to rotate the sequence switch, Fig. 6, from position 3 to position 4. This circuit may be traced from grounded battery, through the winding of sequence switch magnet 600, left lower contact of sequence switch spring 6608 to ground through the normal contact and armature of the BO counting relay.

In position 4 of the sequence switch, Fig. 6, the fundamental circuit is again established for final tens selection as previously traced to operate the stepping relay 623 and relay 821 of Fig. 8. The operation of stepping relay 623 establishes a circuit to operate the No. 9 counting relay. This circuit may be traced from ground through the armature and contact of stepping relay 623, lower contact of sequence switch spring 625, right lower contact of sequence switch spring 621, normal contact and armature of the No. 9′ counting relay, winding of the No. 9 counting relay to grounded battery, through the lower contact of sequence switch spring 610. This actuating circuit remains established until a shunt circuit is established for stepping relay 623 by the upward movement of the final selector switch elevator.

In positions 3 to 5 of the sequence switch shown in Fig. 8, an obvious energizing circuit is established for trip magnet 833 to rotate the tripping spindle to trip brushes 853, 854 and 855 upon further upward movement of the final selector switch elevator.

The operation of relay 821 establishes a circuit to rotate the sequence switch, Fig. 8, from position 3 to position 4. This circuit may be traced from grounded battery, through the winding of sequence switch magnet 800, right lower contact of sequence switch spring 817, left lower contact of sequence switch spring 808, left contact and armature of relay 821 to ground through the right lower contact of sequence switch spring 811. The sequence switch Fig. 8 in rotating from position 3 to position 4 establishes a locking circuit for relay 821 as previously traced. In position 4, a circuit is again established to energize the high speed updrive magnet 831. This circuit may be traced from grounded battery, through the winding of magnet 831, right upper and left lower contacts of sequence switch spring 808, left contact and armature of relay 821, to ground through the right lower contact of sequence switch spring 811. Upon the upward movement of the selector switch elevator, brush 843 is engaged with the conducting portion of commutator segment 840 to establish a shunt to release stepping relay 623. This shunt circuit may be traced from ground through the left upper contact of switch spring 816, brush 843, commutator 840, left upper contact of sequence switch spring 810, left lower contact of sequence switch spring 808 where a junction is established with the fundamental circuit.

Upon the initial release of stepping relay 623 an operating circuit is effective for the No. 9′ counting relay. This circuit may be traced from ground through the armature and contact of the No. 9 counting relay, windings of No. 9 and No. 9′ relays to grounded battery, through the lower contact of sequence switch spring 610 and upon the further upward movement of the final selector switch elevator, brush 843 is disengaged from the conducting portion of the commutator segment 840 and engaged with a non-conducting portion, causing the stepping relay 623 to again operate. The operation of relay 623 establishes a circuit to operate the No. 8 counting relay as previously traced. Upon the release of stepping relay 623, the 8′ counting relay is operated and upon further upward movement of the final selector switch elevator, the intermittent operation and release of stepping relay 623 establishes circuits to operate all of the counting relays including SO, FO and BO counting relays.

Upon the operation of the FO counting relay, the fundamental circuit is opened to release relay 821. The release of relay 821 opens the energizing circuit for high speed updrive magnet 831 arresting the upward movement of the selector switch elevator. The release of relay 821 further establishes a circuit to rotate the sequence switch Fig. 8 from position 4 to position 5. This circuit may be traced from grounded battery, through the winding of magnet 800, right lower contact of sequence switch spring 807, left normal contact and armature of relay 821 to ground through the right lower contact of sequence switch spring 811. The sequence switch, Fig. 8, will remain in this position until the fundamental circuit is again established. The operation of the BO counting relay establishes a circuit to rotate the sequence switch, Fig. 6, from position 4 to position 5. This circuit may be traced from ground through the armature and contact of the BO counting relay, right lower contact of sequence switch spring 608, winding of sequence switch magnet 600 to grounded battery. Upon the rotation of the sequence switch, Fig. 6, from position 4 to position 5, the holding circuit for the counting relays is opened to cause their release. The release of the BO counting relay establishes a circuit to rotate the sequence switch, Fig. 6, from position 5 to position 6. This circuit may be traced from ground through the normal armature and contact of the BO counting relay, left lower contact of sequence switch spring 608, winding of sequence switch magnet 600 to grounded battery.

In position 6 of the sequence switch, Fig. 6, the fundamental circuit is again established for final units selection. This fundamental circuit is the same as previously traced for final brush selection. Relays 623 and 821 are operated upon the establishment of the fundamental circuit.

The operation of stepping relay 623 establishes a circuit to operate the No. 9 counting relay. This circuit may be traced from ground through the armature and contact of stepping relay 623, lower contact of sequence switch spring 605, left lower contact of sequence switch spring 621, upper contact of sequence switch spring 508, normal contact and armature of the No. 9' counting relay, winding of the No. 9 counting relay, to grounded battery through the lower contact of sequence switch spring 610. This circuit will remain established until the shunt circuit is established to release stepping relay 623 upon the upward movement of the final selector switch elevator for units selection.

The operation of relay 821 establishes a circuit to rotate the sequence switch, Fig. 8, from position 5 to position 6. This circuit may be traced from grounded battery, through the winding of magnet 800, right lower contact of sequence switch spring 817, left lower contact of sequence switch spring 818, left contact and armature of relay 821 to ground through sequence switch spring 811. Upon the rotation of the sequence switch from position 5 to position 6, a locking circuit is established for relay 821 over the fundamental circuit as previously traced. In sequence switch position 6, the low speed updrive magnet 832 is energized over a circuit from grounded battery, through the winding of magnet 832, right upper contact of sequence switch spring 817, left lower contact of sequence switch spring 818, left contact and armature of relay 821, to ground through sequence switch spring 811.

The final selector switch elevator is now driven upward and brush 844 is intermittently engaged with conducting and non-conducting portions of commutator segment 841 to intermittently establish a shunt to release stepping relay 623. This shunt circuit may be traced from ground, through the left upper contact of sequence switch spring 816, brush 844, commutator segment 841, right upper and lower contacts of sequence switch spring 808, where a junction point is established with the fundamental circuit. The intermittent operation and release of stepping relay 623 establishes circuits as previously traced to operate all of the counting relays including the SO, FO and BO counting relays. The operation of the FO counting relay opens the fundamental circuit to release relay 821. The release of relay 821 opens the energizing circuit for low speed updrive magnet to arrest the upward movement of the final selector switch elevator. The release of relay 821 further establishes a circuit to rotate the sequence switch, Fig. 8, from position 6 to position 7. This circuit may be traced from grounded battery, through the winding of magnet 800, right upper contact of sequence switch spring 807, left inner contact and armature of relay 821, to ground through the right lower contact of sequence switch spring 811. The sequence switch, Fig. 8, is rotated from position 7 to position 8 under the control of the sequence switch magnet contact.

In sequence switch position 8, relay 821 is operated over a circuit from grounded battery, through its left winding, right lower contact of sequence switch spring 806, to ground through the contact and armature of relay 822. The operation of relay 821 establishes a circuit to rotate sequence switch from position 8 to position 9. This circuit may be traced from grounded battery, through the winding of magnet 800, right lower contact of sequence switch spring 817, left contact and armature of relay 821, to ground through the right lower contact of sequence switch spring 811.

Brushes 853, 854 and 855 are now connected to the third test line to which a condition is associated representing a direct line idle. In position 9 of the sequence switch, Fig. 8, the apparatus of the final selector switch functions to test the line to ascertain whether it is in a busy or idle condition. Since the test line represents a direct line idle, the line terminals will be characterized as such.

It will be remembered that relay 821 was operated in sequence switch position 8. This relay would remain operated in position 9 if a busy line is encountered. Since the line encountered is idle, relay 821 releases. The release of relay 821 establishes a circuit to actuate sequence switch magnet 800 from grounded battery through the winding of magnet 800, right lower contact of sequence switch spring 807, left normal contact and armature of relay 821, left lower contact of sequence switch spring 811 to ground through the right contact and armature of relay 822. The sequence switch now rotates from position 9 to position 10 under the control of the circuit traced and from position 10 to position 12 under the control of the sequence switch magnet contact. In sequence switch position 12, a circuit is established to actuate sequence switch magnet 800 from grounded battery through the winding of magnet 800, right lower and upper contacts of sequence switch spring 805 to ground through the right contact and armature of relay 822.

The sequence switch is thus rotated from position 12 to position 13. In sequence switch position 13 a circuit is established to rotate the sequence switch to position 14. This circuit may be traced from grounded battery through the winding of sequence switch magnet 800, right lower contact of sequence switch spring 807, left normal contact and armature of relay 821 to ground through the right lower contact of sequence switch spring 811. The sequence switch is now rotated to position 14 which under service conditions is the position in which it remains during a conversation between subscribers.

It will be remembered that the sequence switch shown in Fig. 6 is resting in position 9. The sequence switch of Fig. 5 is in position 1. Upon the association of the final selector switch with test line No. 3, a circuit is established to operate relay 526 shown in Fig. 5. This circuit may be traced from ground through the right and left windings of relay 526, left lower contact of sequence switch spring 521, conductor 848, terminal 856, brush 853, left upper contact of sequence switch spring 814, resistance 824, right upper and left lower contacts of sequence switch spring 815 to grounded battery. A circuit is also established to operate relays 523 and 520 from grounded battery through the winding of relay 523, right upper and lower contacts of sequence switch spring 617, lower contact of sequence switch spring 507, right upper contact of sequence switch spring 616 right inner contact and armature of relay 431, conductor 369, lower contact of sequence switch spring 218, conductor 230, conductor 730, brush 733, terminal 736, conductor 851, upper contacts of sequence switch spring 809, brush 854, terminal 857, conductor 847, lower contact of sequence switch spring 511, upper contacts of sequence switch spring 611, winding of relay 520, right lower contact of sequence switch spring 510, conductor 846, terminal 858, brush 855, lower contacts of sequence switch spring 808, conductor 850, terminal 737, brush 734, conductor 729, conductor 229, lower contact of sequence switch spring 212, conductor 360, left outer contact and armature of relay 431, contact and armature of relay 518 to ground through the left upper contact of sequence switch spring 619. The operation of relay 523 opens the holding circuit for relay 822, Fig. 8 to cause its release. The release of relay 822 establishes a circuit to rotate the sequence switch, Fig. 8, from position 14 to position 15. This circuit may be traced from grounded battery through winding of magnet 800, right lower and left upper contacts of sequence switch spring 803 to ground through the right normal contact and armature of relay 822. During the rotation of the sequence switch through position 14½ a circuit is established to operate relay 821. This circuit may be traced from grounded battery through the left winding of relay 821, left upper contacts of sequence switch springs 818 and 817, normal contact and armature of relay 820, to ground through the lower contact of sequence switch spring 802. Upon the rotation from position 14¾ to position 15, a holding circuit for relay 821 is established to simulate a holding circuit through a subscriber's station apparatus with the receiver off the switchhook. This circuit may be traced from grounded battery through the left lower and upper contacts of sequence switch spring 815, right winding of relay 821, right upper and lower contacts of sequence switch spring 813, right contact and armature of relay 821, right lower and upper contacts of sequence switch spring 809, brush 854, conductor 847, lower contact of sequence switch spring 511, upper contacts of sequence switch spring 611, winding of relay 520, right lower contact of sequence switch spring 510, conductor 846, terminal 858, brush 855, right lower contact of sequence switch spring 808 to ground through the left lower contact of sequence switch spring 810. Relay 821 remaining in an operated position prevents the final selector switch, Fig. 8, from restoring to normal.

Returning to the operation of relays 520 and 523, a circuit is established to operate relay 519. This circuit may be traced from grounded battery through the right upper contact of sequence switch spring 610, winding of relay 519 left outer contact and armature of relay 520, right inner contact and armature of relay 523 to ground through the left contact and armature of relay 526. The operation of relay 519 establishes a circuit to rotate the sequence switch, Fig. 6, from position 9 to position 10. This circuit may be traced from ground through the contact and armature of relay 519, left upper contact of sequence switch spring 616, winding of magnet 600 to grounded battery. During the rotation of the sequence switch, Fig. 6, from position 9 to position 10, a locking circuit is established for relay 523 which is a check circuit to ascertain whether relay 526 is maintained in an operated position from the sleeve circuit of the final selector switch. This locking circuit may be traced from ground through left contact and armature of relay 526, right outer contact and armature of relay 523, upper contacts of sequence switch spring 617, winding of relay 523 to grounded battery.

Upon further rotation of the sequence switch, Fig. 6, into position 10, this locking path is changed to the outgoing sleeve circuit of the final selector switch, in order to test the ground contact of relay 822 used to characterize terminal 735 as busy until the final selector switch, Fig. 8, has restored to normal. This second locking circuit may be traced from grounded battery through the winding of relay 523, right upper and left lower contacts of sequence switch spring 617, left contact and armature of relay 523, left normal contact and armature of relay 524, conductor 370, lower contact of sequence switch spring 217, conductor 231, conductor 731, brush 732, terminal 735, conductor 852, left normal armature and contact of relay 822 to ground through the right upper contact of sequence switch spring 801.

It will be noted that resistance 632 is connected in multiple with the winding of relay 821 during the period of test. This resistance represents the line leak to properly test the release of relay 821. This circuit may be traced from ground through the right lower contact of sequence switch spring 619, resistance 632, lower contact of sequence switch spring 511, conductor 847, terminal 857, brush 854, right upper and lower contacts of sequence switch spring 809, right contact and armature of relay 821, right lower and upper contacts of sequence switch spring 813, right winding of relay 821, left upper and lower contacts of sequence switch spring 815 to grounded battery. Resistance 632 remains thus connected until the sequence switch, Fig. 6, rotates out of position 15.

The rotation of the sequence switch, Fig. 6, from position 9 to position 10 opens the actuating circuit for relay 519. The release of relay 519 establishes a circuit to energize sequence switch magnet 600 which may be traced from ground through the left upper contact of sequence switch spring 506, normal armature and contact of relay 519, right upper contact of sequence switch spring 607, right upper contact of sequence switch spring 606, winding of magnet 600 to grounded battery. The sequence switch, Fig. 6, is thus rotated to position 11 where a circuit is again established to operate relay 519. This circuit is the same as previously traced. The operation of relay 519 establishes an energizing circuit for sequence switch magnet 600 from ground through the left upper contact of sequence switch spring 506, armature and contact of relay 519, left upper contact of sequence switch spring 606, winding of magnet 600 to grounded battery. The sequence switch now rotates from position 11 to position 12. The rotation of the sequence switch, Fig. 6 from position 11 to position 12 opens the energizing circuit for relay 519 to cause its release. The release of relay 519 establishes a circuit to rotate the sequence switch, Fig. 6, from position 12 to position 13. This circuit is the same as previously traced. During the rotation of the sequence switch, Fig. 6, from position 10 to position 13 a time period has elapsed of such duration as to reduce the magnetism of relay 821 so that the test of its release value is properly made when associated with a line leak.

Upon the rotation of the sequence switch, Fig. 6 from position 12 to position 13, the energizing circuit for relay 520 is opened at the left upper contacts of sequence switch spring 611. This represents the receiver placed on the switchhook by the subscriber. Relay 821 now releases. In position 13 of sequence switch, Fig. 6, a circuit is again established to operate relay 519. This circuit is the same as previously traced. A circuit is now established to rotate the sequence switch, Fig. 6, from position 13 to position 14 from ground through the upper contact of sequence switch spring 506, armature and contact of relay 519, left upper contact of sequence switch spring 606, winding of magnet 600 to grounded battery. During the rotation of the sequence switch, Fig. 6, from position 13 to position 14, a circuit is again established through the winding of relay 520. If relay 821 shown in Fig. 8 has released there will not be any actuating circuit through the winding of relay 520. If it has not released an actuating circuit is established from grounded battery through the left lower and upper contacts of sequence switch spring 815, right winding of relay 821, right upper and lower contacts of sequence switch spring 813, right contact and armature of relay 821, right lower and upper contacts of sequence switch spring 809, brush 854, terminal 857, conductor 847, lower contact of sequence switch spring 511, upper contacts of sequence switch spring 611, winding of relay 520, right lower contact of sequence switch spring 510, contact 846, terminal 858, brush 855, right lower contact of sequence switch spring 808 to ground through the left lower contact of sequence switch spring 810. If relay 520 is now operated the automatic progression of the testing apparatus shown in Figs. 5 and 6 is arrested and the time limit alarm switch shown in Fig. 9 will rotate to a point where an alarm signal is actuated to attract the attention of the maintenance man.

Assuming that the actuating circuit is not established for relay 520, it remains in a released position and a circuit is established to rotate the sequence switch, Fig. 6, from position 14 to position 15. This circuit may be traced from grounded battery through the winding of magnet 600, right upper contact of sequence switch spring 606, left upper contact of sequence switch spring 607, left inner normal contact and armature of relay 520, normal contact and armature of relay 519 to ground through the left upper contact of sequence switch spring 506.

In position 15 of the sequence switch, Fig. 6, a circuit is again established to operate relay 519, the same as previously traced. The operation of relay 519 establishes a circuit to energize sequence switch magnet 600 to rotate the sequence switch, Fig. 6, from position 15 to position 16. This circuit may be traced from grounded battery through the winding of magnet 600, left upper contact of sequence switch spring 606, contact and armature of relay 519 to ground through the left upper contact of sequence switch spring 506.

Assuming that relay 821 in Fig. 8 released upon the opening of its holding circuit when the sequence switch, Fig. 6, rotated from position 12 to position 13. A circuit is established by the release of relay 821 to energize sequence switch magnet 800 to rotate the sequence switch out of position 15. This circuit may be traced from grounded battery through the winding of magnet 800, right lower contact of sequence switch spring 807, left normal contact and armature of relay 821 to ground through the right lower contact of sequence switch spring 811. This circuit remains established to rotate the sequence switch from position 16 to position 17. In position 17 a circuit is again established to energize magnet 800 from grounded battery through the winding of magnet 800, right lower and left upper contacts of sequence switch spring 803 to ground through the right normal contact and armature of relay 822. The sequence switch is thus rotated into position 18. The sequence switch, Fig. 8, now in position 18 establishes a circuit for energizing downdrive magnet 830 from grounded battery through the winding of magnet 830, right lower contact of sequence switch spring 818, left lower contact of sequence switch spring 817 to ground through the left upper contact of sequence switch spring 816. The final selector switch elevator is now driven downward to its normal position where a circuit is established to rotate the sequence switch, Fig. 8, from position 18 to position 1. This circuit may be traced from grounded battery through the winding of magnet 800, left upper contact of sequence switch spring 807, commutator segment 842, brush 843 to ground through the left upper contact of sequence switch spring 816.

It will be noted that the final selector switch maintained itself in a busy condition by characterizing terminal 735 busy from ground through the right upper contact of sequence switch spring 801, left normal contact and armature of relay 822, conductor 852 to terminal 735. This ground is removed upon the rotation of the sequence switch, Fig. 8, from position 18 to position 1. Since it is desirable to make a plurality of tests on the final selector switch, Fig. 8, terminal 735 is now characterized as busy by the testing circuit. This may be traced from terminal 735, through brush 732, conductor 731, conductor 231, lower contact of sequence switch spring 217, conductor 370, left normal contacts of relays 524 and 523, upper contacts of sequence switch spring 612, right normal contact and armature of relay 426 to ground through the right upper contact of sequence switch spring 410.

It will be remembered that the sequence switch, Fig. 6, is now in position 16. A circuit is established to rotate the sequence switch, Fig. 5, from position 1 to position 2. This circuit may be traced from grounded battery through the winding of magnet 500, left upper contact of sequence switch spring 503, contact 644 of key 631, left inner contacts of key 630 to ground through the left lower contact of sequence switch spring 619. The sequence switch, Fig. 5, in position 2, establishes a circuit to rotate the sequence switch, Fig. 6 from position 16 to position 17. This circuit may be traced from grounded battery through the winding of magnet 600, left upper contact of sequence switch spring 608 to ground through the upper contact of sequence switch spring 501. The sequence switch, Fig. 6, is now rotated through positions 17 and 18 to position 1 by a circuit established from grounded battery through the winding of magnet 600, right lower contact of sequence switch spring 606 to ground through the right outer contacts of key 17. The sequence switch, Fig. 6 now in position 1 establishes a circuit to rotate the sequence switch, Fig. 5 to position 3. This circuit may be traced from grounded battery through the winding of magnet 500, lower contact of sequence switch spring 503 to ground through the upper contact of sequence switch spring 620. The sequence switch, Fig. 5, now in position 3 establishes a circuit to rotate the sequence switch, Fig. 6, from position 1 to position 2. This circuit may be traced from grounded battery through the winding of magnet 600, right upper contact of sequence switch spring 608, lower contacts of sequence switch spring 504 to ground through the left inner armature and contact of relay 431.

Test No. 2.

The fundamental circuit is now established in position 2 of the sequence switch, Fig. 6 and the sender portion of Fig. 6 directively controls the final selector Fig. 8 to again associate brushes 853, 854 and 855 with the terminals 856, 857 and 858 of the third test line. The directive control of the final selector circuit, Fig. 8 is the same in this test as previously described up to and including position 9 of the sequence switch, Fig. 8. The sequence switch, Fig. 5 now in position 3, is prepared to make test No. 2 upon the final selector switch, Fig. 8. The condition now imposed upon the test terminals is the same as a direct line busy. This may be traced from terminal 856, over conductor 848, left lower contact of sequence switch spring 512, over a divided path through the right and left windings of relay 526 to ground and through the upper contacts of sequence switch spring 513, resistance 514 to grounded battery.

It will be remembered that in position 9 of the sequence switch, Fig. 8, relay 821 is in an operated position. Upon the association of brush 853 with terminal 856, to which the busy line condition is connected, a circuit is established to maintain relay 821 in an operated position and operate relays 820 and 823. This circuit may be traced from ground through the left upper contact of sequence switch spring 801, winding of relay 820, winding of relay 823, right upper and lower contacts of sequence switch spring 812, right contact and armature of relay 821, left upper and lower contacts of sequence switch spring 813, brush 853, terminal 856, left lower contact of sequence switch spring 512, contact of sequence switch spring 513, resistance 514 to grounded battery. The operation of relay 823 establishes a circuit to maintain relay 821 in an operated position. This circuit may be traced from ground through the armature and contact of relay 823, right upper contact of sequence switch spring 808, right lower contact of sequence switch spring 810, right winding of relay 821, left upper and lower contacts of sequence switch spring 815 to grounded battery. The operation of relay 820 opens the holding circuit for relay 822 causing its release. The release of relay 822 establishes a circuit to rotate the sequence switch, Fig. 8, from position 9 to position 10. This circuit may be traced from grounded battery through magnet 800, right lower and left upper contacts of sequence switch spring 803 to ground through the normal contact and armature of relay 822. The sequence switch, Fig. 8 now rotates through positions 10 and 11 and into position 12 under the control of the magnet contact. In sequence switch position 12, a circuit is established to again operate relay 822. This circuit may be traced from grounded battery through the left winding of relay 822, left lower contact of sequence switch spring 804 to ground through the left upper and right lower contacts of sequence switch spring 802. The operation of relay 822 establishes a circuit to rotate the sequence switch, Fig. 8, from position 12 to position 13. This circuit may be traced from grounded battery through the winding of magnet 800, right lower and upper contacts of sequence switch spring 803 to ground through the right contact and armature of relay 822.

In position 13 of the sequence switch, Fig. 8, a circuit is established to lower the final selector switch elevator to normal. This circuit may be traced from grounded battery through the downdrive magnet 830, lower contacts of sequence switch spring 818, left inner contact and armature of relay 821 to ground through the right lower contact of sequence switch spring 811. It will be noted that relay 821 is now maintained in an operated position over a locking path from grounded battery through its left winding, left upper and lower contacts of sequence switch spring 818, left contact and armature of relay 821 to ground through the lower contact of sequence switch spring 811. The final selector switch elevator in its normal position establishes a circuit to rotate the sequence switch to position 17 where a busy tone and flash are connected to conductor 851. The sequence switch magnet 800 is energized from grounded battery through its winding, left upper contact of sequence switch spring 807, commutator segment 842, brush 843 to ground through the left upper contact of sequence switch spring 816. It will be noted that in passing out of sequence switch position 15 the holding circuit for relay 821 is opened, causing its release. In sequence switch position 17, relay 821 is intermittently actuated and released by the rotation of interrupter 860. The operating circuit may be traced from ground through interrupter 860, upper contact of sequence switch spring 806, left winding of relay 821 to grounded battery. Upon each actuation of relay 821 a ground and tone is connected to the ring conductor 851 which may be traced from ground through coil 861, right upper contact of sequence switch spring 814, resistance 824, right upper and lower contacts of sequence switch spring 815, resistance 825, right upper and lower contacts of sequence switch spring 813, right contact and armature of relay 821, right lower and left upper contacts of sequence switch spring 809, conductor 851, terminal 736, brush 733, conductor 730, conductor 230, lower contact of sequence switch spring 218, conductor 369, right inner contact and armature of relay 431, right upper contact of sequence switch spring 616, upper contact of sequence switch spring 507, winding of relay 522 to grounded battery.

The sequence switch, Fig. 6, in its directive control of the final selector switch, Fig. 8, to associate it with the third test line for test No. 2 rotated to position 9, the same as described for test No. 1. The interrupted ground and tone just described will, in ordinary service, flash a supervisory lamp if connected to an operator's position or furnish interrupted tone over the line to a subscriber. In the test of this operation, relay 522 is intermittently operated from the intermittent ground connected to conductor 851. The initial operation of relay 522 establishes a circuit for actuating stepping relay 623. This circuit may be traced from grounded battery through the armature and contact of relay 522, resistance 629, resistance 628, armature and contact of the FO counting relay, winding of stepping relay 623 to ground. The operation of relay 623 establishes a circuit to operate the No. 1 counting relay from ground through its armature and contact, upper contact of sequence switch spring 605, normal contact and armature of the No. 1' counting relay, winding of the No. 1 counting relay to grounded battery through the lower contact of sequence switch spring 610. The operation of the No. 1 counting relay establishes a locking circuit for itself and an operating circuit for the No. 1' counting relay which is effective upon the release of relay 623. Relay 623 releases upon the first release of relay 522 and relay 522 releases upon the release of relay 821. The actuating circuit for the No. 1' counting relay may be traced from grounded battery through the lower contact of sequence switch spring 610, winding of the Nos. 1 and 1' counting relays, contact and armature of the No. 1 counting relay to ground. Upon the second operation of relay 821 a circuit is again established to operate relay 522 and thereupon a circuit is established to operate stepping relay 623. A circuit is now established to actuate the SO counting relay from ground through the armature and contact of stepping relay 623, upper contact of sequence switch spring 605, armature and contact of the No. 1' counting relay, lower contact of sequence switch spring 602, winding of the SO counting relay to grounded battery through the left upper contact of sequence switch spring 610. The operation of the SO counting relay establishes a locking circuit for itself and an operating circuit for the BO and FO counting relays upon the subsequent release of stepping relay 623, relay 522 and relay 821. The operation of the BO counting relay establishes a circuit to rotate the sequence switch, Fig. 6, from position 9 to position 10. This circuit may be traced from grounded battery through the armature and contact of the BO counting relay, right lower contact of sequence switch spring 608, sequence switch magnet winding 600 to grounded battery. In sequence switch position 10 a circuit is established to operate relay 624 from grounded battery through its winding, lower and upper contacts of sequence switch spring 618 to ground through the left lower contact of sequence switch spring 501. The operation of relay 624 establishes a locking circuit for itself from grounded battery through its winding, left inner contact and armature to ground through the left lower contact of sequence switch spring 614. Relay 624 in attracting its left outer contact and armature establishes an operating circuit for relay 523 from grounded battery through the winding of relay 523, left outer contact and armature of relay 624 to ground through the right lower contact of sequence switch spring 614. The operation of relay 523 opens the holding circuit for relay 822 to cause the final selector switch to restore to its normal position No. 1 as described for test No. 1. The operation of relay 624 further establishes a circuit to rotate the sequence switch Fig. 6, from position 10 to position 16. This circuit may be traced from ground through the right contact and armature of relay 624, left lower contact of sequence switch spring 606, winding of magnet 600 to grounded battery. In position 16 of the sequence switch, Fig. 6, a circuit is established to rotate the sequence switch, Fig. 5, from position 3 to position 4. This circuit may be traced from grounded battery through the magnet winding 500, left upper contact of sequence switch spring 503, contacts 644 of key 631, inner contact of key 630, left lower contact of sequence switch spring 619 to ground. The sequence switch, Fig. 5, now establishes a circuit to rotate the sequence switch, Fig. 6, from position 16 to position 17. This circuit may be traced from grounded battery through the winding of magnet 600, left upper contact of sequence switch spring 608, upper contact of sequence switch spring 501 to ground. The sequence switch, Fig. 5, now rotates to position 15 where a circuit is established to rotate it to position 1. This circuit is the same as previously traced through the contact of key 17. A circuit is now established in position 1 of sequence switch, Fig. 6, to rotate the sequence switch, Fig. 5, into position 5. This circuit may be traced from grounded battery through the winding of magnet 500, lower contact of sequence switch spring 503 to ground through the upper contact of sequence switch spring 620.

Since relay 431 has remained in a locked position a circuit is again established as previously traced to rotate the sequence switch, Fig. 6, from position 1 to position 2 to again establish a fundamental circuit to directively control the final selector switch for test No. 3.

Test No. 3.

As will be remembered from the general description, of test No. 3, the condition of an idle P. B. X. line (first of group) is associated with the third or top test line. The final selector switch is associated with the third test line, the same as previously described, and the sequence switch of the final selector is rotated to position 9. This position of the final selector switch is used to associate the switch with the first P. B. X. line that is idle or actuate apparatus to cause the selector switch to hunt for an idle P. B. X. line.

The condition of a first idle P. B. X. line is associated with the third test line, terminal 856, and may be traced from ground through the right winding of relay 526, right lower contact of sequence switch spring 512, conductor 848 to terminal 856. Upon association of the final selector switch with the third test line, relay 821 would remain operated if a busy line had been encountered. Therefore, since an idle P. B. X. line is represented by the apparatus of Fig. 5, relay 821 releases. The release of relay 821 in position 9 establishes a circuit to rotate the sequence switch to position 10 from grounded battery through the winding of magnet 800, right lower contact of sequence switch spring 807, left normal contact and armature of relay 821, left lower contact of sequence switch spring 811 to ground through the right contact and armature of relay 822. The sequence switch now rotates into position 12 under the control of the sequence switch magnet contact. In position 12, a circuit is established to rotate the sequence switch to position 13 from grounded battery through the winding of magnet 800, right lower and upper contacts of sequence switch spring 803 to ground through the contact and armature of relay 822. In position 13 a circuit is again established to rotate the sequence switch to position 14 from grounded battery through the winding of magnet 800, right lower contact of sequence switch spring 807, left normal contact and armature of relay 821 to ground through the right lower contact of sequence switch spring 811. Position 14 is known as talking position for service connections and conductors 850 and 851 are carried through sequence switch springs 808 and 809 to brushes 854 and 855.

It will be remembered in the previous description of the control of the selections for final selector switch, Fig. 8, the sequence switch, Fig. 6, rotates to position 9 and remains in that position to start the test of the final selector switch, auxiliary apparatus and circuits. Therefore, if the sequence switch, Fig. 6, is in position 9 and the sequence switch, Fig. 5, is in position 5, the test of the final selector is the same as described under test No. 1 with the exception that relay 526 operates through its right winding which is of low resistance instead of operating through its left and right windings. Upon completion of test No. 3, the sequence switch, Fig. 6 is rotated to position 16. A circuit is now established to rotate the sequence switch, Fig. 5, from position 5 to position 6, from grounded battery through the winding of magnet 500, left upper contact of sequence switch spring 503, contact 644 of key 631, left inner contacts of key 630, left lower contact of sequence switch spring 619 to ground. The sequence switch, Fig. 5 in position 6 establishes a circuit to rotate the sequence switch, Fig. 6, from position 16 to position 17. This circuit may be traced from grounded battery through the winding of magnet 600, left upper contact of sequence switch spring 608, upper contact of sequence switch spring 501 to ground. In position 17 and 18, a circuit is established to further rotate the sequence switch from ground through the contacts of key 17 as previously traced. Upon the rotation of the sequence switch, Fig. 6, to position 1, a circuit is established to rotate the sequence switch, Fig. 5, from position 6 to position 7. This circuit may be traced from grounded battery through the winding of magnet 500, lower contact of sequence switch spring 503, to ground through the upper contact of sequence switch spring 620. A circuit is now established to rotate the sequence switch, Fig. 6, from position 1 to position 2 to again establish the fundamental circuit to directively control the final selector switch for test No. 4. The circuit to rotate the sequence switch from position 1 to position 2 is established from ground through the contacts of key 431 as previously traced.

Test No. 4.

For test No. 4 a condition is connected to test line No. 3 to simulate an idle last P. B. X. line of a P. B. X. line group. In this test the final selector switch is directed to test line No. 1 and caused to hunt from test line No. 1 to test line No. 3 where it finds the above mentioned condition simulating the last P. B. X. line idle.

The directive control of the final selector switch, Fig. 8, is the same as previously described with the exception that for final units selection seven counting relays are used instead of nine. As will be remembered, final units selection is made with the sequence switch, Fig. 6, resting in position 6. The circuit controlling the number of counting relays operated during the upward movement of the final selector switch elevator for units selection may be traced from grounded battery through the lower contact of sequence switch spring 610, winding of the No. 7 counting relay, normal contact and armature of the 7' counting relay, lower contact of sequence switch spring 508, lower contact of sequence switch spring 621, lower contact of sequence switch spring 605 to ground through the contact and armature of stepping relay 623. Upon the upward movement of the final selector switch elevator, it will be remembered that brush 844 is intermittently engaged with the conducting and non-conducting portion of commutator segment 841 to intermittently establish a shunt to release stepping relay 623. Upon a series of intermittent energizations and deenergizations of stepping relay 623, counting relays SO, BO and FO are operated. The operation of the FO counting relay opens the fundamental circuit to release relay 201 and arrest the upward movement of the final selector switch elevator as previously described to associate the final selector switch with test line No. 1. The energization of the BO counting relay rotates the sequence switch, Fig. 6, from position 6 to position 7 over the circuit previously described and the release of the BO counting relay rotates the sequence switch from position 7 to position 8. In position 8 a circuit is established through the sequence switch magnet contact to rotate it to position 9.

During units selection the final selector sequence switch is in position 6. The release of relay 821 establishes a circuit to rotate the sequence switch from position 6 to position 7. This circuit may be traced from grounded battery through the winding of magnet 800, right upper contact of sequence switch spring 807, left normal contact and armature of relay 821 to ground through the right lower contact of sequence switch spring 811. The sequence switch now rotates from position 7 to position 8 under the control of sequence switch magnet contact. In position 8, a circuit is established to operate relay 821 from grounded battery through the left winding of relay 821, right lower contact of sequence switch spring 806 to ground through the right contact and armature of relay 822. The operation of relay 821 establishes a circuit to rotate the sequence switch from position 8 to position 9. This circuit may be traced from grounded battery through the winding of magnet 800, right lower contact of sequence switch spring 817, left lower contact of sequence switch spring 818, left contact and armature of relay 821 to ground through the right lower contact of sequence switch spring 811. In sequence switch position 9 an operating circuit is established for relay 823 and a holding circuit established for relay 821. The operating circuit may be traced from grounded battery through the resistance 862, terminal 863, brush 853, left lower and upper contacts of sequence switch spring 813, right armature and contact of relay 821, right lower and upper contacts of sequence switch spring 812, winding of relay 823, winding of relay 820 to ground through the left upper contact of sequence switch spring 801. Relay 823 is operated in the circuit traced but since coil 862 is of high ohmic resistance, relay 820 is not operated. The operation of relay 823 establishes a holding circuit for relay 821, from ground through the armature and contact of relay 823, right upper contact of sequence switch spring 808, right lower contact of sequence switch spring 810, right winding of relay 821 to grounded battery through the left upper and lower contacts of sequence switch spring 815. Relay 821 in attracting its left armature establishes a circuit to energize the low speed updrive magnet 832 from grounded battery through the winding of magnet 832, right upper contact of sequence switch spring 817, left lower contact of sequence switch spring 818, left contact and armature of relay 821, left lower contact of sequence switch spring 811 to ground through the right contact and armature of relay 822. Upon the upward movement of the final selector switch elevator, brushes 853, 854 and 855 are elevated to test line No. 2 where a busy P. B. X. line is again simulated as shown connected to terminal 864. Therefore, relays 823 and 821 are maintained in an operated position and the updrive magnet 832 continues to be actuated. The final selector switch elevator is thus driven upward until brushes 853, 854 and 855 are associated with test line No. 3 to which apparatus is associated representing a last P. B. X. line idle. This circuit may be traced from terminal 856, over conductor 848, left lower contact of sequence switch spring 512, right and left windings of relay 526 to ground. The actuating circuit for relay 823 is now opened to cause its release. The release of relay 823 opens the holding circuit for relay 821 to cause its release. The release of relay 821 opens the energizing circuit for the slow speed updrive magnet 832 to arrest the upward movement of the selector switch elevator. The final selector switch now remains connected to the third test line and the final selector sequence switch rotates to talking position 14 as previously described.

It will be remembered that the sequence switch, Fig. 6, is resting in position 9 and the sequence switch, Fig. 5 in position 7. Upon the association of the final selector switch and brushes 853, 854 and 855 with the third test line, the apparatus of the testing circuit, Figs. 5 and 6, operates in an automatically progressive manner, the same as described for test No. 1, and the sequence switch, Fig. 6 is rotated to position 16. Upon its rotation to position 16, the final selector is released in the same manner as described for test No. 1. In position 16, the sequence switch, Fig. 6, establishes a circuit to rotate the sequence switch, Fig. 5, from position 7 to position 8 over a circuit the same as previously traced. The sequence switch, Fig. 5 in position 8 establishes a circuit to rotate the sequence switch, Fig. 6 from position 16 to position 17 and the sequence switch, Fig. 6, is rotated from positions 17 and 18 from ground through the contacts of key 17 as previously traced. In position 1 of the sequence switch, Fig. 6, a circuit is established to rotate the sequence switch, Fig. 5, from position 8 to position 9.

A circuit is now established from ground through the contact and armature of relay 431 to energize magnet 600 to rotate the sequence switch, Fig. 6 from position 1 to position 2. This circuit is the same as previously traced.

Test No. 5.

In sequence switch position 2 the fundamental circuit is again established to directively control the final selector switch for test No. 5. The apparatus of Fig. 5 is now positioned to simulate a busy P. B. X. line (last line in group). This condition is connected to the third test line and the final selector switch in this test is directed to test line No. 1, the same as for test No. 4. Upon its association with the first test line, the hunting feature of the final selector switch apparatus is actuated to cause the final selector to hunt for an idle line. Since the third test line represents a busy private branch exchange line, the last of a group, the final selector switch will be driven upward to the third test line and thereupon returns the busy flash over conductor 851 to the testing circuit.

Let it be assumed that the sender portion of the testing circuit, Fig. 6, has directively positioned the final selector switch and that the sequence switch, Fig. 6, has rotated to position 9. Again let it be assumed that the final selector switch has been associated with test line No. 1 and that the sequence switch upon being thus associated has rotated from position 6 to position 9 and that the final selector switch elevator has been driven upward to associate brushes 853, 854 and 855 with terminals 856, 857 and 858 of the third test line. The private branch exchange hunting operation is the same as previously described for test No. 4 with the exception that upon the association of the final selector switch with the third test line, a low resistance circuit is established over the sleeve conductor to operate relay 820. It will be remembered that relay 820 is not operated during the hunting for an idle private branch exchange line. The circuit established to operate relay 820 may be traced from ground through the left upper contact of sequence switch spring 801, winding of relay 820, winding of relay 823, right upper and lower contacts of sequence switch spring 812, right contact and armature of relay 821, left upper and lower contacts of sequence switch spring 813, brush 853, terminal 856, conductor 848, left lower contact of sequence switch spring 512, over a divided path through the left and right windings of relay 526 to ground in multiple with a path through the outer contact of sequence switch spring 513, resistance 514 to grounded battery. Sufficient current is now carried through the winding of relay 820 to cause its operation. The operation of relay 820 opens the holding circuit for relay 822 causing its release. The release of relay 822 establishes a circuit to rotate the sequence switch from position 9 to position 10. This circuit may be traced from grounded battery through the winding of magnet 800, right lower and left upper contacts of sequence switch spring 803 to ground through the right normal contact and armature of relay 822. The sequence switch now rotates from position 10 to position 12 under the control of the sequence switch magnet contact. In position 12 a circuit is established to reoperate relay 822. This circuit may be traced from grounded battery through the left winding of relay 822, left lower contact of sequence switch spring 804 to ground through the left upper and right lower contacts of sequence switch spring 802. The operation of relay 822 establishes a circuit to rotate the sequence switch from position 12 to position 13. This circuit may be traced from grounded battery through the winding of magnet 800, right lower and upper contacts of sequence switch spring 803 to ground through the right contact and armature of relay 822. A circuit is now established to energize the downdrive magnet from grounded battery through the winding of downdrive magnet 830, lower contacts of sequence switch spring 818, left contact and armature of relay 821 to ground through the right lower contact of sequence switch spring 818. The final selector switch elevator is now driven downward to its normal resting position. When thus positioned, brush 843 is engaged with commutator segment 842 to establish an energizing circuit for sequence switch magnet 800 to rotate the sequence switch into position 17. This circuit may be traced from grounded battery through the winding of magnet 800, right upper contact of sequence switch spring 807, commutator segment 842, brush 843 to ground through the left upper contact of sequence switch spring 816.

It will be noted that during the rotation of the sequence switch, Fig. 8, from position 13 to position 17, the holding circuit for relay 821 is opened at the left lower contact of sequence switch spring 818, causing relay 821 to release. In position 17, a circuit is established to intermittently operate and release relay 821 from ground through interrupter 860, upper contact of sequence switch spring 806, left winding of relay 821 to grounded battery. Upon each operation of relay 821, a low resistance ground and tone is associated with the ring conductor 851. This ground flash and tone are used in a regular service connection to notify an operator or a subscriber that the wanted line is in a busy condition. In its association with this testing circuit, the flash is used to signal the testing apparatus that the apparatus of the final selector switch has responded successfully to the control apparatus of the testing circuit. Upon each operation of relay 821, this circuit may be traced from ground through coil 861 through the right upper contact of sequence switch spring 814, resistance 824, right upper and lower contacts of sequence switch spring 815, resistance 825, right upper and lower contacts of sequence switch spring 813, right contact and armature of relay 821, right lower and left upper contacts of sequence switch spring 809, conductor 851, terminal 736, brush 833, conductor 830, conductor 230, lower contact of sequence switch spring 218, conductor 369, right inner contact and armature of relay 431, right upper contact of sequence switch spring 616, outer contact of sequence switch spring 507, winding of relay 522 to grounded battery, operating relay 522. Each operation of relay 522 establishes a circuit to operate the stepping relay 623 from grounded battery through the armature and contact of relay 522, resistance 629, resistance 628, armature and contact of FO counting relay, winding of stepping relay 623 to ground. The initial operation of stepping relay 623 establishes a circuit to operate the No. 1 counting relay from ground through the armature and contact of relay 623, upper contact of sequence switch spring 605, normal armature and contact of the No. 1' counting relay, winding of the No. 1 counting relay to grounded battery through the lower contact of sequence switch spring 610. The operation of the No. 1 counting relay establishes a locking circuit and operating circuit for the No. 1' counting relay which is effective upon the initial release of stepping relay 623. The second operation of relay 623 establishes an energizing circuit for the SO counting relay from ground through the armature and contact of relay 623, upper contact of sequence switch spring 605, armature and contact of the No. 1' counting relay, lower contact of sequence switch spring 602, winding of the SO counting relay to grounded battery through the left upper contact of sequence switch spring 610. The operation of the SO counting relay establishes a locking circuit for itself and an operating circuit for the BO and FO effective upon the subsequent release of stepping relay 623.

The operation of the BO counting relay establishes a circuit to rotate the sequence switch, Fig. 6, from position 9 to position 10. This circuit may be traced from ground through the armature and contact of the BO counting relay, right lower contact of sequence switch spring 608, winding of magnet 600 to grounded battery. The rotation of the sequence switch from position 9 to position 10 opens the holding circuit for the counting relays to cause their release. In sequence switch position 10 a circuit is established to operate relay 624 from grounded battery through the winding of relay 624, lower and upper contacts of sequence switch spring 618 to ground through the left lower contact of sequence switch spring 501. Relay 624 in operating establishes a locking circuit for itself from grounded battery through its winding, left inner contact and armature to ground through the left lower contact of sequence switch spring 614. Relay 624 in attracting its left outer armature further establishes a circuit to operate relay 523 from grounded battery through the winding of relay 523, left outer armature and contact of relay 624 to ground through the right lower contact of sequence switch spring 614. The operation of relay 523 opens the holding circuit for relay 822 of the final selector circuit, Fig. 8. The release of relay 822 establishes a circuit to rotate the final selector sequence switch from position 17 to position 18, from grounded battery through the winding of magnet 800, right lower and left upper contacts of sequence switch spring 806 to ground through the right normal contact and armature of relay 822. An energizing circuit for magnet 800 is again established in position 18 from grounded battery through its winding, left upper contact of sequence switch spring 807, commutator segment 842, brush 843, to ground through the left upper contact of sequence switch spring 816. The final selector switch now rotates to normal where it remains characterized as busy by the testing circuit, awaiting further tests.

The operation of relay 624, Fig. 6, further establishes a circuit to rotate the sequence switch, Fig. 6, to position 16. This circuit may be traced from ground through the left contact and armature of relay 624, left lower contact of sequence switch spring 606, winding of magnet 600 to grounded battery. In position 16 a circuit is established as previously traced to rotate the sequence switch, Fig. 5, from position 9 to position 10. In position 10 of the sequence switch, Fig. 5, a circuit is established to rotate the sequence switch, Fig. 6, from position 16 to position 17. In position 17 and position 18, a circuit is established as previously traced to rotate the sequence switch, Fig. 6, to normal position 1. In position 1 of the sequence switch, Fig. 6, a circuit is established as previously traced to rotate the sequence switch, Fig. 5 from position 10 to position 11.

Test No. 6.

The sequence switch, Fig. 6, is again rotated out of position 1 and into position 2 through the circuit, as previously traced, to ground through the left inner armature and contact of relay 431. The fundamental circuit is again established in position 2 of the sequence switch, Fig. 6, to directively control the final selector switch, Fig. 8, to again associate it with the first test line. As outlined in the general description, test No. 6 will now be made. The final selector switch, when associated with the first test line, operates the private branch exchange hunting apparatus to cause the final selector circuit to hunt over the first and second test line to test line No. 3. The apparatus of the testing circuit, Fig. 5, now associates the condition representing an idle private branch exchange line intermediate in a group of such lines with the terminals of test line No. 3. A circuit is associated with terminal 856 which may be traced from ground through the right winding of relay 526, right lower contact of sequence switch spring 512, conductor 848, terminal 856. It will be remembered that the sequence switch of the final selector switch is in position 9 during the period of time that the selector is hunting for an idle private branch exchange line. It will also be remembered that relays 823, 821 and 822 are in an operated position. When the final selector switch is associated with the third test line, the holding circuit for relay 823 is opened to cause its release. The release of relay 823 opens the holding circuit for relay 821 to cause its release. The release of relay 821 arrests the upward movement of the final selector switch elevator to cause the final selector switch to remain positioned upon test line No. 3.

Upon the release of relay 821, circuits are established to rotate the sequence switch, Fig. 8 to talking position 14 as previously described. The sequence switch, Fig. 6, during the directive control of the final selector has rotated to position 9, as previously described.

The apparatus of the testing circuit, Fig. 5 and Fig. 6, now operate the same as described for test No. 1 and the final selector switch is tested and released in the same manner as described for test No. 1. The sequence switch, Fig. 6, is rotated to position 1, as previously described, and the sequence switch, Fig. 5, is rotated from position 11 to position 13, in a manner described for rotating it from position 9 to position 11.

Test No. 7.

The sequence switch, Fig. 6, is now rotated from position 1 to position 2 from the circuit, previously described, established through the left inner contact and armature of relay 431. Test No. 7 is now made to test the directive control of the final selector switch under a condition where a final selector switch is already connected to the line to which the final selector switch, under test, is directed. In regular service, the final selector is directed to a busy line to which another final selector is already connected to verify an uncertain condition regarding said connection.

The final selector switch is directively positioned upon the terminals of test line No. 3 in the same manner as previously described, up to and including units selection. During units selection, the sequence switch of the final selector switch is resting in position 6 and the sequence switch of the sender testing circuit, Fig. 6, is also in position 6. It will be remembered that upon the completion of units selection the FO counting relay is operated to open the fundamental circuit to cause the release of relay 821 which in turn arrests the upward movement of the final selector switch elevator. The release of relay 821 establishes a circuit to rotate the sequence switch, Fig. 8, from position 6 to position 7. This circuit may be traced from grounded battery through the winding of magnet 800, right upper contact of sequence switch spring 807, left normal contact and armature of relay 821 to ground through the right lower contact of sequence switch spring 811. In position 7, the sequence switch, Fig. 8, is rotated to position 8 under the control of the magnet contact. During the rotation of the sequence switch, Fig. 8, through position 6¾ to 7 a circuit is established to operate relay 820. This circuit may be traced from ground through the left upper contact of sequence switch spring 801, winding of relay 820, left lower and upper contacts of sequence switch spring 809, conductor 851, terminal 836, conductor 730, conductor 230, lower contact of sequence switch spring 218, right inner contact and armature of relay 431, left upper contact of sequence switch spring 616, lower contact of sequence switch spring 505, resistance 515 to grounded battery. The operation of relay 820 releases relay 822 which has been held in an operated position over a locking circuit to the sleeve conductor 852 as previously described. The release of relay 822 rotates the sequence switch, Fig. 8, from position 8 to position 10. This circuit may be traced from ground through the right normal armature and contact of relay 822, left upper and right lower contacts of sequence switch spring 803, winding of sequence switch magnet 800 to grounded battery. The sequence switch now rotates to position 12 under the control of the magnet contact. In position 12, a circuit is again established to operate relay 822 from grounded battery through its left winding, left lower contact of sequence switch spring 804 to ground through the left upper and right lower contacts of sequence switch spring 802. The operation of relay 822 establishes a circuit to rotate the sequence switch to position 13. This circuit may be traced from grounded battery, right armature and contact of sequence switch spring 803, winding of magnet 800 to grounded battery. Since relay 821 is in a released position, a circuit is now established to rotate the sequence switch from position 13 to position 14. This circuit may be traced from grounded battery through the winding of magnet 800, right lower contact of sequence switch spring 807, left normal contact and armature of relay 821 to ground through the right lower contact of sequence switch spring 811.

The final selector switch, Fig. 8, has been rotated to its talking position when connected to a test line that is arranged to represent a line to which a final selector is already associated. The condition representing the line connected to a final selector is shown in Fig. 5 and may be traced from grounded battery through resistance 514, upper contact of sequence switch spring 513 in multiple with ground through the right and left windings of relay 526 to a junction point with the circuit previously traced and thence through the left lower contact of sequence switch spring 512, conductor 848 to terminal 856. If the final selector switch had not properly responded to the control of the no test feature it would return the busy tone and flash, the same as described under test No. 5. The final selector switch would further remain in position 13 and to properly function in this test, it must rotate to talking position 14 to further control the apparatus of Figs. 5 and 6. This apparatus when not controlled arrests the progressive movement of the testing circuit and attracts the attention of a maintenance man.

It will be remembered that during units selection of this test, the sequence switch Fig. 6 is in position 6 and upon the completion of units selection, the BO counting relay is operated. A circuit is established from ground through the armature and contact of the BO counting relay to rotate the sequence switch from position 6 to position 7. Upon said rotation, the holding circuit for the counting relays is opened to cause their release. The release of the BO counting relay establishes a circuit from ground through its armature and contact to rotate the sequence switch to position 8. The sequence switch now rotates from position 8 to position 9 under the control of its magnet contact. In position 9 the testing circuit, Fig. 6, awaits the action of the final selector switch and its auxiliary circuits.

Assuming that the final selector switch responded successfully to the control of the no test test and rotated to its talking position 14, a circuit is established to operate relay 524 shown in Fig. 5. This circuit may be traced from grounded battery through the winding of relay 524, left lower contact of sequence switch spring 510, conductor 846, to terminal 858, brush 855, lower contacts of sequence switch spring 808, conductor 850, terminal 737, brush 834, conductor 729, conductor 229, lower contact of sequence switch spring 212, conductor 360, left outer contact and armature of relay 431, contact and armature of relay 518 to ground through the left upper contact of sequence switch spring 619. Relay 524 in attracting its left armature, opens the holding circuit for relay 822 which has been established over the sleeve circuit. The release of relay 822 establishes a circuit to rotate the sequence switch, Fig. 8, from position 14 to position 15. This circuit may be traced from grounded battery through the winding of magnet 800, right lower and left upper contacts of sequence switch spring 803 to ground through the contact and armature of relay 822. Since, in this test, a subscriber's line with the receiver removed from the hook is not represented, a holding circuit for relay 821 is not established. Therefore, the final selector sequence switch returns to its normal position as previously described.

The operation of relay 524 further establishes a locking circuit for itself from grounded battery through its winding, left inner contact and armature, contacts 643 of key 631 to ground through the right lower contact of sequence switch spring 501. Relay 524 further establishes a circuit to rotate the sequence switch, Fig. 6 from position 9 to position 16. This circuit may be traced from ground through the right outer contact and armature of relay 524, right upper contact of sequence switch spring 609, winding of magnet 600 to grounded battery. The sequence switch, Fig. 6, now in position 16, establishes a circuit to rotate the sequence switch, Fig. 5, from position 13 to position 14, the same as previously described for rotating the sequence switch from position 11 to position 13. Key No. 516 is actuated to provide paths for test No. 8. The sequence switch, Fig. 5, now in position 14, establishes a circuit to rotate the sequence switch, Fig. 6, to position 17. This path may be traced from grounded battery through the winding of magnet 600, left upper contact of sequence switch spring 608, right contacts of key 516 to ground through the left lower contact of sequence switch spring 506. The sequence switch now rotates to position 17. In position 17 a circuit is established to rotate the sequence switch through position 17 and 18 to position 1 from ground connected to the right outer contacts of key 17, as previously traced. In position 1 of the sequence switch, Fig. 6, a circuit is established to rotate the sequence switch, Fig. 5, from position 14 to position 15. This circuit is the same as previously traced for such operation.

Test No. 8.

The sequence switch, Fig. 5, is now rotated from position 1 to position 2 from a circuit previously traced through the left inner contacts of relay 431. The sequence switch, Fig. 6, is now positioned to again establish the fundamental circuit to directively control the final selector switch for the time measure release test No. 8.

The final selector switch is associated with test line No. 3, representing in this test, a direct line free. The final selector sequence switch therefore rotates to talking position 14 as described under test No. 1. The sequence switch, Fig. 6, also rotates to position 9 as described under test No. 1. The circuit is now established to operate relays 520 and 523 which may be traced from grounded battery through the winding of relay 523, right upper and lower contacts of sequence switch spring 617, lower contacts of sequence switch spring 507, right upper contact of sequence switch spring 616, right inner contact and armature of relay 431, conductor 369, lower contact of sequence switch spring 218, conductor 230, conductor 730, brush 733, terminal 736, conductor 851, upper contacts of sequence switch spring 809, brush 854, terminal 857, lower contact of sequence switch spring 511, upper contact of sequence switch spring 611, winding of relay 520, right lower contact of sequence switch spring 510, conductor 846, terminal 858, brush 855, lower contact of sequence switch spring 808, conductor 850, terminal 737, brush 734, conductor 729, conductor 229, lower contact of sequence switch spring 212, conductor 360, left outer contact and armature of relay 431, contact and armature of relay 518, left upper contact of sequence switch spring 619 to ground. The operation of relay 523 opens the sleeve holding circuit for relay 822 to cause its release. The release of relay 822 establishes a circuit to rotate the sequence switch, Fig. 8, from position 14 to position 15. This circuit may be traced from grounded battery through the winding of magnet 800, right lower and left upper contacts of sequence switch spring 803, to ground through the contact and armature of relay 822.

In position 14½ of sequence switch, Fig. 8, an operating circuit is established for relay 821. This circuit may be traced from grounded battery through the left winding of relay 821, left outer contact of sequence switch spring 818, upper contact of sequence switch spring 817, normal contact and armature of relay 820 to ground through the right lower contact of sequence switch spring 802. Upon further rotation of the sequence switch, Fig. 8, a holding circuit is established for relay 821 and the operating circuit is opened. The holding circuit may be traced, in position 15, from grounded battery through the left lower and upper contacts of sequence switch spring 815, right winding of relay 821, right upper and lower contacts of sequence switch spring 813, right contact and armature of relay 821, right lower and upper contacts of sequence switch spring 809, brush 854, terminal 857, conductor 847, lower contact of sequence switch spring 511, upper contacts of sequence switch spring 611, winding of relay 520, right lower contact of sequence switch spring 510, conductor 846, terminal 858, brush 855, right lower contact of sequence switch spring 808 to ground through the left lower contact of sequence switch spring 810. Relays 821 and 520 are new held in an operated position to simulate the subscriber's line with the receiver removed from the hook, under the condition where the calling subscriber has abandoned the call.

In a service connection relay 821 must release to further rotate the sequence switch of Fig. 8 to restore the circuit to normal. A time measure releasing device is incorporated in the final selector switch circuit to restore such circuits to normal, when the call has been abandoned and the receiver of the called party has not been returned to the switch hook. For the purpose of releasing relay 821 a circuit is established in position 15 to advance the sequence switch by the operation of relay 822. This circuit may be traced from grounded battery through the lower contact of the interrupter driven spring combination 827, left lower contact of sequence switch spring 805, right winding of relay 822 to ground through the lower contacts of sequence switch spring 802. The operation of relay 822 establishes an obvious circuit to rotate the sequence switch from position 15 to position 16 and upon the rotation of the sequence switch, relay 822 releases. Upon the further rotation of the interrupter a circuit is established through the upper contact of spring combination 827 to again operate relay 822. The circuit to operate relay 822 is similar to the circuit previously traced and the sequence switch is now rotated from position 16 to position 17. The rotation of the sequence switch opens the holding circuit for relays 821 and 520 causing their release. The release of relay 821 establishes circuits to restore the final selector switch to normal as previously described.

The initial operation of relay 520 as previously described, establishes a circuit to rotate the sequence switch, Fig. 6, from position 9 to position 10. This circuit may be traced from grounded battery through the winding of magnet 600, left upper contact of sequence switch spring 606, right outer contact and armature of relay 520 to ground through the right upper contact of sequence switch spring 506. Upon the release of relay 520, which occurred when the sequence switch, Fig. 8, rotated from position 16, a circuit is established to further rotate the sequence switch, Fig. 6 from position 10 to position 16. This circuit may be traced from ground through the right upper contact of sequence switch spring 506, right outer normal contact of relay 520, right outer normal contact of relay 525, right normal contact of relay 526, right lower contact of sequence switch spring 609, to grounded battery through the winding of magnet 600. It will be remembered that relay 526 is held in an operated position during the time that the final selector switch is in talking position and until said switch rotates out of position 16.

If relay 821 releases prematurely, the holding circuit for relay 520 is opened to cause its release. The release of relay 520 establishes a circuit to operate relay 525 from grounded battery through the winding of relay 525, right inner normal contact of relay 520, upper and lower contacts of sequence switch spring 509, upper contacts of sequence switch spring 622, right lower contact of sequence switch spring 510, conductor 846, terminal 858, brush 855, right lower contact of sequence switch spring 808 to ground through the lower contact of sequence switch spring 810. The operation of relay 525 establishes a locking circuit for itself from grounded battery through its winding, right inner contact and armature to ground through the right upper contact of sequence switch spring 619. The operation of relay 525 arrests the progressive movement of the testing circuit to attract the attention of the maintenance man to a faulty selector switch.

Assuming that the time measuring release test is successful, the sequence switch, Fig. 6, is rotated to position 16 as previously described and a circuit is established to rotate the sequence switch, Fig. 5 from position 15 to position 16. This circuit may be traced from grounded battery through the winding of magnet 500, left upper contact of sequence switch spring 503, contact 644 of key 631, left inner contact of key 630 to ground through the left lower contact of sequence switch spring 619. The sequence switch Fig. 5, now rotates to position 18 under the control of the magnet contact.

The various tests of one final selector switch have now been completed and the testing control circuit is actuated to direct the test selector to select another final selector switch to be tested. This circuit is established with the sequence switch, Fig. 5, in position 18 and the sequence switch, Fig. 6, in position 16 and may be traced from grounded battery through the winding of relay 436, right normal contacts of relay 430, left normal contacts of relay 627, contacts 645 of key 631 to ground through the right lower contact of sequence switch spring 502, operating relay 436. The operation of relay 436 opens the holding circuit for relay 427 through its left outer contact and armature, causing the release of relay 427. The release of relay 427 opens the actuating circuit for relay 431 causing its release. The operation of relay 436 further establishes a locking circuit for itself from grounded battery through its winding, left inner contact and armature, left continuity contact of relay 435 to ground through the right outer contact and armature of relay 436. The operation of relay 436 further establishes a circuit to rotate the sequence switch, Fig. 6, from position 16 to position 17. This circuit may be traced from grounded battery through the winding of magnet 600 left upper contact of sequence switch spring 608, upper contact of sequence switch spring 603 to ground through the right outer contact and armature of relay 436. The sequence switch Fig. 6, is rotated through positions 17 and 18 to position 1 under the control of ground from the right outer contact of key 17, as previously described. A circuit is established in sequence switch position 1 to rotate the sequence switch, Fig. 5, from position 18 to position 1. This circuit may be traced from grounded battery through the winding of magnet 500, lower contact of sequence switch spring 503 to ground through the upper contact of sequence switch spring 620. The sequence switches of Figs. 5 and 6 remain in position 1 awaiting the association of the testing circuit with another final selector switch to be tested.

The operation of relay 436 further establishes a circuit to operate relay 428. This circuit may be traced from grounded battery through the winding of relay 428, left outer contact and armature of relay 436 to ground through the right upper contact of sequence switch spring 408. The operation of relay 428 establishes an obvious circuit to operate relay 426 through its left contact and armature. The operation of relay 426 establishes a circuit for operating relay 427. This circuit may be traced from grounded battery through the winding of relay 427, left contact and armature of relay 426, brush 456 and its associated contact to ground through the right contact and armature of relay 434. Relay 427, in operating, establishes a locking circuit for itself which is effective upon the release of relay 436.

A circuit is further established through the contacts of relay 436 and sequence switch springs, Figs. 5 and 6, to operate relay 423 to control the upward movement of the test selector switch, Fig. 7. This circuit may be traced from grounded battery through the right winding of relay 424, left winding of relay 423, right normal contact and armature of relay 424, lower contact of sequence switch spring 603 to ground through the right outer contact and armature of relay 436. The right winding of relay 424 is marginal and relay 424 does not operate in the circuit traced. The operating circuit for relay 423 is carried through the right winding of relay 424 to magnetize it a limited amount so that it will be very quick to operate when a circuit is established through its left winding as hereinafter described. The operation of relay 423 establishes a circuit to actuate the updrive magnet 702 of the test selector. This circuit may be traced from ground through the left armature and contact of relay 423, right upper contact of sequence switch spring 404, right outer contact and armature of relay 428, upper contact of sequence switch spring 412, conductor 364, lower contact of sequence switch spring 208, conductor 225, conductor 725, winding of the updrive magnet to grounded battery. The test selector switch elevator is now driven upward and in its upward movement, brush 711 is associated with a conducting portion of commutator segment 707. A circuit is thus established to actuate relay 424 and to hold relay 423 in an operated position until the brush 711 has been elevated to a non-conducting portion of commutator 707. The operating circuit and holding circuit may be traced from grounded battery through the left winding of relay 424 and from grounded battery through the right winding of relay 423 in multiple, to a junction point at the right contact of relay 423, thence through the right armature of relay 423, upper contact of sequence switch spring 403, conductor 365, lower contact of sequence switch spring 207, conductor 224, conductor 724, conducting portion of commutator segment 707, brush 711 to ground through the lower contact of the sequence switch spring 740. The operation of relay 424 opens the original energizing circuit for relay 423 and establishes a holding circuit for itself from grounded battery through its right winding, contact and armature, lower contact of sequence switch spring 603 to ground through the right outer contact and armature of relay 436. When brush 711 has been elevated from the conducting portion of commutator segment 707 to the non-conducting portion of the commutator, the holding circuit established through the right winding of relay 423 is opened to cause its release. The release of relay 423 opens the actuating circuit for updrive magnet 702 to arrest the upward movement of the test selector switch elevator. The brushes 732, 733 and 734 are now brought to rest upon terminals next above the terminals connected to the final selector switch that has been tested. The terminals now associated with the brushes of the test selector are connected to a final selector switch, the same as that shown in Fig. 8. The release of relay 423 further establishes a circuit to actuate relay 435. This circuit may be traced from ground through the left normal contact and armature of relay 423, left contact and armature of relay 424, right inner contact and armature of relay 436, winding of relay 435 to grounded battery. The operation of relay 435 establishes a locking circuit for itself from grounded battery through its winding, left armature and contact to ground through the right outer contact and armature of relay 436. The operation of relay 435 further opens the holding circuit for relay 436 at its left contact. The release of relay 436 opens the holding circuit for relay 435 causing its release. The release of relay 436 further establishes a locking circuit for relay 427 which may be traced from grounded battery through its winding, right armature and contact, left outer normal contact and armature of relay 436, to ground through the right upper contact of sequence switch spring 408. The release of relay 436 further opens the actuating circuit for relay 428 to cause its release. The release of relay 428 opens the original actuating circuit for relay 426.

Relay 426 is used to test the condition of the final selector switch to ascertain whether it is in an idle or busy condition. The final selector switch is characterized as busy by connection from ground through terminal 735. When the testing circuit is associated with a busy final selector switch, relay 426 is maintained in an operated position, the same as previously described during the association of the testing circuit with the previous final selector switch tested. Assuming that the final selector switch now associated with the testing circuit is in an idle condition, a holding circuit is not established for relay 426 and it therefore releases. The release of relay 426 establishes an operating circuit for relay 431. This circuit may be traced from grounded battery through the winding of relay 431, right outer contacts of key 440, left contact and armature of relay 427, left normal contact and armature of relay 426, brush 456 and its associated contact to ground through the right normal contact and armature of relay 434.

The test of one final selector switch and its auxiliary circuits is now completed and upon said completion of tests, apparatus is automatically operated to control the advance of the test selector switch, Fig. 7, to the final selector switch next above the final selector switch tested. Upon the completion of the test of a second final selector switch, the test selector is again automatically advanced to a third final selector switch to be tested. Thus, the testing control circuit, Figs. 1 to 4, and the testing circuit, Figs. 5 and 6, cooperate in their action to automatically test the final selector switches connected to the terminals in a sub-group of a bank of terminals.

As brought out in the general description, a panel of terminals connected to final selector switches is divided into groups and above each group is a set of terminals known as an overflow. The commutator segment 706 is correspondingly equipped with a conducting segment known as an overflow. In service, the selector switch when hunting for an idle final selector switch, stops upon reaching the overflow terminal. In automatic testing, it is desirable to advance the switch such as shown in Fig. 7, from one sub-group of terminals to the next above without restoring the test selector switch elevator to normal.

When the final selector switches connected to the terminals of a group have been tested, the test selector switch is advanced to the overflow terminals in the manner described for advancing the test selector switch from the first to the second final selector switch tested. A circuit is thus established to energize relay 434, shown in Fig. 4. This circuit may be traced from grounded battery through the winding of relay 434, right lower and upper contacts of sequence switch spring 416, brush 454 and its associated contact, conductor 367, lower contact of sequence switch spring 205, conductor 222, conductor 722, conducting portion of commutator segment 706, brush 710 to ground through the lower contact of sequence switch spring 740. The operation of relay 434 establishes a circuit to energize selector control switch magnet 450. This circuit may be traced from grounded battery through resistance 457, winding and contacts of magnet 450, left upper and right lower contacts of sequence switch spring 413, brush 452 and its associated contact to ground through the left outer contact and armature of relay 434. The selector control switch 449 now rotates to the next position where the energizing circuit for its magnet is opened to arrest its forward movement. The energizing circuit for relay 434 is also opened by the forward movement of switch 449 to cause its release. The release of relay 434 establishes a circuit for operating relay 436. This circuit may be traced from grounded battery through the winding of relay 436, right normal armature and contact of relay 430, left outer contacts of key 440, brush 453 and its associated contact, upper and lower contacts of sequence switch spring 414 to ground through the left outer normal contact and armature of relay 434. Relay 436 in attracting its right inner contact establishes a locking circuit for itself which may be traced from grounded battery through its winding, left inner contact and armature, left continuity contacts of relay 435 to ground through the right outer contact and armature of relay 436. The operation of relay 436 further establishes an energizing circuit for relay 428. This circuit may be traced from grounded battery through the winding of relay 428, left outer contact and armature of relay 436 to ground through the right upper contact of sequence switch spring 408. The operation of relay 428 establishes an obvious energizing circuit for relay 426. The purpose in operating relay 426 is to test the first final selector switch of the group when the test selector control switch 449 is rotated to its next position. The operation of relay 436 further establishes a circuit to energize relay 423. This circuit may be traced from grounded battery through the right winding of relay 424, left winding of relay 423, right normal contact and armature of relay 424, lower contact of sequence switch spring 603 to ground through the right outer contact and armature of relay 436. Relay 424 does not operate in the circuit traced. The operation of relay 423 establishes an energizing circuit for updrive magnet 702. This circuit may be traced from ground through the left armature and contact of relay 423, right upper contact of sequence switch spring 404, right outer contact and armature of relay 428, upper contact of sequence switch spring 412, conductor 364, contact of sequence switch spring 208, conductor 225, conductor 725, winding of updrive magnet 702 to grounded battery. The test selector switch elevator is thus driven upward to bring brush 711 into engagement with the conducting portion of commutator segment 707. An energizing circuit is thus established for relay 424 and a holding circuit established for relay 423. This circuit may be traced from grounded battery through the left winding of relay 424 and from grounded battery through the right winding of relay 423 in multiple, to a junction point at the right contact of relay 423 through the right armature of relay 423, upper contact of sequence switch spring 403, conductor 365, lower contact of sequence switch spring 207, conductor 224, conductor 724, conducting portion of commutator segment 707, brush 711 to ground through the lower contact of sequence switch spring 740. The operation of relay 424 establishes a locking circuit for itself from grounded battery through its left winding, contact and armature, lower contact of sequence switch spring 603 to ground through the left outer contact and armature of relay 436. Upon further upward movement of the test selector switch elevator, brush 711 is disengaged from the conducting portion of commutator segment 707. The holding circuit for relay 423 is thus opened to cause its release. The release of relay 423 establishes an energizing circuit for relay 435. This circuit may be traced from ground through the left armature and contact of relay 423, left contact and armature of relay 424, right inner contact and armature of relay 436, winding of relay 435 to grounded battery. Relay 435 in operating, establishes a holding circuit for itself from grounded battery through its winding, left armature and contact to ground through the right outer contact and armature of relay 436. The operation of relay 435 also opens the holding circuit for relay 436 to cause its release. The release of relay 436 opens the holding circuit for relay 424 and the energizing circuit for relay 428 to cause their release. The operation of relay 435 further establishes a circuit to energize selector control switch magnet 450. This circuit may be traced from ground through the right armature and contact of relay 435, left inner normal contact and armature of relay 434, brush 452 and its associated contact, right lower and left upper contacts of sequence switch spring 413, contacts and armature of switch magnet 450, resistance 457 to grounded battery. The selector control switch is thus rotated one position where it remains until the final selector switches connected to the second group of terminals are tested. It will be noted that relay 435 remains in a locked position until switch 449 steps from terminals 2 to terminal 3. This circuit may be traced from grounded battery through the winding and left armature and contact of relay 435, brush 456 and its associated contact to ground through the right armature and contact of relay 434. When brush 456 steps from terminal 2 to terminal 3, the holding circuit for relay 435 is opened to cause its release.

The upward movement of the test selector switch elevator described in the previous paragraph positions brushes 732, 733 and 734 upon the terminals connected to the first final selector switch of the second group. It will be remembered that the operation of relay 428 establishes an energizing circuit for relay 426. During the association of brush 455 with terminal No. 2, a circuit is established to operate relay 427 from grounded battery through the winding of relay 427, brush 455 and its associated contact to ground. The operation of relay 427 establishes a locking circuit for itself traced from grounded battery through its winding, right armature and contact, left normal contact and armature of relay 436 to ground through the right upper contact of sequence switch spring 408.

It will be noted that upon the release of relay 428, the energizing circuit for relay 426 is opened. It will also be noted that the release of relay 428 occurred subsequent to the positioning of the test selector switch brushes upon the terminals of the first final selector switch of the second group. Therefore, when the energizing circuit for relay 426 is disestablished, it will release unless the holding circuit has been established through its right winding to the sleeve terminals 735 of the final selector switch to be tested. If said final selector switch is busy, this holding circuit is the same as previously traced. Assuming that the first final selector switch of the second group is in a non-busy condition, relay 426 releases to establish a circuit for relay 431, the same as previously traced. The control and test of the first final selector switch and its auxiliary circuits associated therewith, now proceeds the same as previously described and upon the completion of said tests, the test selector switch, Fig. 7, is advanced to the overflow terminals above said second group.

It will be remembered that the selector control switch 449 is initially positioned to engage brush 451 with conductor 462 in position 1 of said switch and when thus positioned, four groups of final selector switches are tested without returning the test selector switch elevator Fig. 7, to its normal position. The test selector switch elevator is directed to the first final selector switch of the first group and advanced in single steps including intermediate overflow terminals as previously described until the final selector switches connected to the four groups of terminals have been tested and the test selector switch, Fig. 7, is resting upon the overflow terminal above the fourth group of terminals.

As the automatic test and advance of the test selector switch progresses, the selector control switch 449 is advanced two positions each time the overflow terminal is encountered. This is done in the manner described in connection with advancing the test selector switch from the overflow terminal above the first group tested to the first terminal of the group above. From this, it will be noted that when the test selector switch is brought to rest upon the overflow terminals above the fourth group of terminals the selector control switch 449 is resting in position 7.

Circuits are now established to return the selector switch elevator, Fig. 7, to its normal position and to advance the register switch 50 to its second position to automatically direct the control of a second series of tests including the resetting of the selector control switch 449 to control the number of groups tested in said second series of tests.

A circuit is first established to operate relay 434 from grounded battery through its winding, right lower and upper contact of sequence switch spring 416, brush 454 and its associated contact, conductor 367, lower contact of sequence switch spring 205, conductor 222, conductor 722, conducting portion of commutator segment 706, brush 710 to ground through the lower contact of sequence switch spring 740. The operation of relay 434 establishes an energizing circuit for switch magnet 450. This may be traced from grounded battery through resistance 457, winding and contacts of switch magnet 450, left upper and right lower contacts of sequence switch spring 413, brush 452 and its associated contact, left outer contact and armature of relay 434 to ground. Switch 449 now rotates from position 7 to position 8 and in thus rotating opens the actuating circuit for relay 434 to cause its release. The release of relay 434 establishes a circuit to energize sequence switch magnet 400. This circuit may be traced from grounded battery through the winding of magnet 400, brush 453 and its associated contact, upper and lower contact of sequence switch spring 414 to ground through the left outer normal contact and armature of relay 434. The sequence switch, Fig. 4, is thus rotated from position 7 to position 8. A circuit is now established to energize the down-drive magnet 701 from grounded battery through the winding of magnet 701, conductor 727, conductor 227, lower contact of sequence switch spring 210, conductor 362 to ground through the right upper contact of sequence switch spring 409. The test selector switch elevator, Fig. 7, is now returned to its normal position and brush 709 is brought into engagement with commutator segment 708 to establish an energizing circuit for sequence switch magnet 400. This circuit may be traced from grounded battery through the winding of magnet 400, right lower contact of sequence switch spring 403, conductor 361, lower contact of sequence switch spring 211, conductor 228, conductor 728, commutator segment 708, brush 709 to ground through the lower contact of sequence switch spring 740.

The sequence switch, Fig. 4, is now rotated from position 8 to position 9. In sequence switch position 9 a circuit is established to energize the register switch magnet 51 of Fig. 2. This circuit may be traced from grounded battery through the winding of magnet 51, left inner normal continuity contacts of relay 41, upper contacts of sequence switch spring 433 to ground through the right outer contacts of key 16. Register switch 50 is thus advanced one terminal where it will remain to control the second series of tests of final selector switches. A circuit in sequence switch position 9 is established to energize the selector control switch magnet 450. This circuit may be traced from grounded battery through resistance 457, winding and contacts of magnet 450, left upper and right lower contacts of sequence switch spring 413, brush 452 and its associated contact in position 8, left inner contact and armature of relay 434 to ground through the right contact and armature of relay 435. It will be remembered that relay 435 is held in an operated position during the time that the test selector control switch 449 is held operated and brush 456 is thus positioned. Switch 449 is now rotated from position 8 to position 9. Circuits are now established from ground through a plurality of terminals to brush 452, right lower and left upper contacts of sequence switch spring 413, contacts and winding of magnet 450, resistance 457 to grounded battery. Switch 449 is thus rotated from position 9 to its normal resting position. In the normal position of switch 449, a circuit is established to rotate the sequence switch, Fig. 4. This circuit may be traced from grounded battery through the winding of magnet 400, brush 453 and its associated contact, upper and lower contact of sequence switch spring 414 to ground through right outer normal contact and armature of relay 434. The sequence switch is thus rotated from position 9 to position 10 and from position 10 to position 1 under the control of the sequence switch magnet contact.

The apparatus of the testing device is now prepared for a new setting to test the final selector switches connected to a second series of groups of terminals. This setting is controlled by the position of register switch 50 in the same manner as described in position 1 of the register.

One test selector switch, such as that shown in Fig. 7, is used to associate the testing control device with all of the final selector switches to be tested in one panel. As previously described, a panel constitutes a plurality of banks and a bank constitutes a plurality of groups. Therefore, the test selector switch elevator will be directed upward and returned to normal a number of times during the test of the final selector switches connected to the terminals of a panel. Each time it is driven upward a number of groups of final selector switches are tested. This is known as a test group. It will be noted that a plurality of individual terminals on terminal strip 66 are connected to one conductor such as those connected to conductor 86. As previously described, register brush 57 and its associated contacts controls the positioning of connector 200 and connector 300 so that during the time register switch 50 is rotating through a series of positions associated with terminals connected to a single conductor, connector switch 200 or 300 remains positioned in accordance with such control and the same test selector switch is directed upward from its normal position the number of times equal to the number of positions traversed by the register switch 50.

The cross-connecting diagram shown in Fig. 11 indicates that one test selector switch is used during the rotation of register switch 50 from position 1 to position 5, inclusive, and when the register switch has rotated to position 6, connector 200 is rotated to a position where a second test selector switch is associated with the testing control device. The circuit controlling connector 200 may be traced from grounded battery through the winding of sequence switch magnet 201, left upper contact of sequence switch spring 215, conductor 87, terminal strip 66, brush 57 and its associated contact in position 6, left outer contacts of key 17, right contacts of key 29, left inner contact and armature of relay 39 to ground through the right inner contacts of relay 40. The sequence switch of connector 200 is thus rotated from position 3 to position 4. A circuit is also established to energize relay 202 in multiple with sequence switch magnet 201. The circuit may be traced from grounded battery through the upper contacts of sequence switch spring 214, winding of relay 202 and thence to ground over the actuating circuit for magnet 201. The purpose in operating this relay is to remove the permanent busy ground from the test selector sleeve circuit during the rotation of the switch.

In position 4 of connector 200, the testing control device is associated with a test selector, the same as shown in Fig. 7, having access to the final selector switches of a different panel from which the first test selector, Fig. 7, had access.

A circuit is established to operate relay 42, as previously traced upon the arrival of the sequence switch, Fig. 4, in position 1.

The test relay 432 is now operated to ascertain whether the test selector is in an idle or busy condition. The operating circuit for relay 432 may be traced from grounded battery through the right inner armature and contact of relay 42, brush 56 and its associated contact in position 6, terminal strip 64, and 65, conductor 95, left upper contact of sequence switch spring 213, right upper contact of sequence switch spring 407, left winding of relay 432 to ground.

The operation of relay 432 establishes a circuit to rotate the sequence switch, Fig. 4, from position 1 to position 2. This circuit may be traced from grounded battery through the winding of magnet 400, right upper contact of sequence switch spring 401, left contact and armature of relay 432 to ground through the left inner contacts of key 16. Assuming that the test selector, Fig. 7, is in its normal resting position, a circuit is established to operate relay 433. This circuit may be traced from grounded battery through the right inner contact and armature of relay 42, brush 56, and its associated contact, terminal strip 64 and 65, conductor 95, left upper contact of sequence switch spring 213, winding of relay 433, conductor 361, lower contact of sequence switch spring 211, conductor 239, conductor 728, commutator segment 708, brush 709 to ground through the lower contact of sequence switch spring 740. The operation of relay 433 during the time that the sequence switch, Fig. 4, is in position 2, opens the actuating circuit through the left winding of relay 432. Assuming that the test selector switch is not characterized as busy, a circuit is not established through the right winding of relay 432 and it therefore, releases. The release of relay 432 establishes a circuit to rotate the sequence switch Fig. 4, from position 2 to position 3. This circuit may be traced from grounded battery through the winding of magnet 400, left upper contact of sequence switch spring 401, left normal contact and armature of relay 432 to ground through the left inner contact of key 16.

The test selector that has now been seized has access to final selector switches of a particular panel and is automatically and successively associated with said final selector switches to test said switches and their auxiliary circuits in the manner described for testing the final selector switches of the preceding panel. During the test of the final selector switches associated with this panel, register switch 50 progresses from position 6 to position 9 and upon completion of said test rotates to position 10. In each position of the register switch 50 the number of groups of final selector switches tested is controlled by the position given the test selector control switch 449.

In position 10 of the register switch 50, a circuit is established to energize sequence switch magnet 201 of connector 200. This circuit may be traced from grounded battery through the winding of magnet 201, right upper contact of sequence switch spring 215, terminal strip 67, conductor 88, terminal strip 66, brush 57 and its associated contact in position 10, left contacts of key 17, right contacts of key 29, left inner contact and armature of relay 39 to ground through the right inner contacts of key 40. The connector switch 200 is now rotated from position 5 to position 6. In position 6 of connector 200, a test selector switch is associated with the testing control circuit. This test selector switch is the same as shown in Fig. 7 except that it has access to final selector switches in a different panel. This test selector switch is seized and controlled in the manner previously described. Upon the completion of the testing of the final selector switches in each test group the register switch 50 is rotated one position and upon the completion of the test of the final selector switches in that panel, the register switch is rotated from position 14 to position 15 accordingly to the cross-connecting diagram. In register position 15, a fourth test selector is required in the automatically progressive testing of the final selector switch of the office.

It is now necessary to use the first test selector associated with connector 300. To do this, connector 200 is restored to normal preceding the rotation of connector 300 from its normal position. A single circuit is established to restore connector 200 to normal and rotate connector 300 out of position 1 and into position 2. This circuit may be traced from ground through the right inner normal contacts of relay 40, left inner contact and armature of relay 39, right contacts of key 29, left contacts of key 17, brush 57 and its associated contact, conductor 89, upper and left lower contacts of sequence switch spring 219, winding of sequence switch magnet 201 to grounded battery. Connector 200 now rotates from position 7 to position 8 under control of the circuit traced from position 8 to position 1 under the control of the magnet contact. When the sequence switch of connector 200 has rotated to position 1, a circuit is established from the ground traced for actuating magnet 201, through the right upper and lower contacts of sequence switch spring 219, right upper contact of sequence switch spring 315, winding of sequence switch magnet 301 to grounded battery. The sequence switch of connector 300 is now rotated from position 1 to position 2. In this position of connector 300, a test selector switch is associated with the testing control circuit in the same manner as previously described for such operation. The test selector is now tested to ascertain whether it is in an idle or busy condition. When found in an idle condition, the testing control circuit automatically proceeds as previously described to position the apparatus to test the final selector switches to which said test selector has access. The sequence switch of connector 300 is rotated to position 3 to further control the test selector.

During the time that connector 300 is thus associated, register switch 50 rotates from position 15 to position 20 and upon the completion of the test of all final selector switches in the panel to which said selector has access, the register switch is rotated from position 20 to position 21.

In position 21 of register switch 50, a circuit is established to operate relay 41. This circuit may be traced from grounded battery through the winding of relay 41, brush 57 and its associated contact, left outer contacts of key 17, right normal contacts of key 29, left armature and contact of relay 39 to ground through the right inner normal contacts of relay 40. The operation of relay 41 establishes a locking circuit for itself which may be traced from grounded battery through its right winding, right outer contact and armature, right outer contact and armature of relay 39, right normal contacts of key 29, left inner contact and armature of relay 39 to ground through the contacts of relay 40. The purpose of relay 41 is to transfer the control leads from register 50 to register 70 so that the automatic test may proceed by rotating register 70 from test to test as described for register 50. Relay 41 in addition to transferring the control leads, establishes a start circuit for register switch 70. This may be traced from grounded battery through the winding and contacts of register magnet 71, left outer contact and armature of relay 41, register brush 52 and its associated contact in position 21, brush 72 and its associated contact in normal position to ground through the right inner contact and armature of relay 41. Register switch 70 is thus rotated from its normal position to position 1. In position 1 of register 70, connector 300 is rotated from position 3 to position 4 in the same manner as described for previous rotary movements of the connectors. A different test selector switch is now tested and seized for use in a series of tests of final selector switch in a different panel than those previously described.

As the test of the final selector switches progresses in this panel, register switch 70 is advanced in the same manner as that described for register switch 50 and register switch 70 is advanced to position 6 where a circuit is established to test and seize another test selector. This is done in the same manner as previously described, by rotating connector 300 into position 6 upon the completion of tests in that panel. Register switch 70 is rotated to position 10. In position 10 of register switch 70 a circuit is established to return the register switch to normal. This circuit may be traced from grounded battery through the winding and contacts of register magnet 71, left outer contact and armature of relay 41, brush 52 and its associated contact, brush 72 and its associated contacts to ground. Register switch 70 is thus rotated from position 10 to position 21. It will be noted that whenever a cross-connection is omitted from the contacts associated with register brush 72 a ground is connected to the contacts to rotate the register switch to normal under the control of a self interrupting contact.

When register 70 has arrived in position 21, all the final selector switches of the office have been tested by this automatically operated progressive testing device. Therefore, a signal is lighted to so advise the maintenance man attending to this duty. A circuit is established to light lamp 35, shown in Fig. 1, which may be traced from grounded battery through lamp 35, register brush 77 and its associated contact, left outer contacts of key 17, right normal contacts of key 29, left inner contact and armature of relay 39 to ground through the right inner normal contacts of relay 40. Upon reaching this point of operation, the switches shown in Figs. 4, 5 and 6 are returned to normal and the relays shown in these figures are released. The final selector switch under test has been released and the test selector switch returned to normal. Connector 300 remains in position 7 and register switches 59 and 70 remain in position 21. Upon noting the lighting of lamp 35, the maintenance man may do one of two things—operate key 29 or restore keys 16 and 17.

The operation of key 29 starts the testing control circuit on a new cycle of tests to retest all of the final selector switches of the office. The holding circuit for relay 41 is opened to cause its release. The release of relay 41 establishes a circuit to rotate register switch 70 to normal. This may be traced from grounded battery through the winding and contacts of register magnet 71, left middle normal contact and armature of relay 41, brush 75 and its associated contact to ground through the left inner contact of key 14. Register switch 70 is thus rotated from position 21 to its normal position. A circuit is also established to restore register 50 to its normal position. This circuit may be traced from grounded battery through the winding and contacts of register magnet 51, left outer normal contact and armature of relay 41, brush 52 and its associated contact in position 21, right contacts of key 29, left inner armature and contact of relay 39 to ground through the right inner contacts of relay 40. Key 29 is now released by the maintenance man and register switch 50 is started on a new cycle of tests, the same as previously described.

Upon the completion of one cycle of tests, it may be desirable to terminate the testing of the final selector switches and therefore, with register switches 50 and 70 resting in position 21 and connector 300 resting in position 7, keys 16 and 17 are restored to normal and key 15 is operated. The operation of key 15 establishes an obvious circuit to energize the winding of relay 40. The circuit established by the operation of relay 40 will be described later. The restoration of key 17 establishes a circuit to energize the winding of sequence switch magnet 301. This circuit may be traced from grounded battery through the winding of magnet 301, left upper contact of sequence switch spring 315, upper contact of sequence switch spring 415 to ground through the right outer normal contacts of key 17. Connector 300 is now rotated from position 7 to position 8 under the control of the circuit traced and from position 8 to position 1 under the control of the sequence switch magnet contact. The rotation of connector 300 out of position 7 opens the holding circuit for start relay 425 to cause its release. The release of start relay 425 now opens the holding circuit for relay 43 causing its release. The release of relay 43 opens the holding circuit for relay 39 to cause its release.

The release of relay 39 now opens the holding circuit for relay 41 to cause its release. The release of relay 41 establishes a circuit to restore register 70 to normal. This circuit may be traced from grounded battery through the winding and contacts of register magnet 71, left middle normal contact and armature of relay 41, brush 75 and its associated contact in position 21 to ground through the left inner normal contacts of key 14. Key 15 is now restored to normal to establish a circuit to restore register switch 50 to normal. It will be noted that a locking circuit for relay 40 is established through the contacts of register 50 in position 21 so that relay 40 does not release upon the restoration of key 15. This locking circuit may be traced from grounded battery through the winding and left inner contact and armature of relay 40, brush 55 and its associated contact in position 21 to ground through the left inner normal contact of key 14. The circuit established for restoring register switch 50 to normal may be traced from grounded battery through the winding and contact of register magnet 51, left outer normal contact and armature of relay 41, brush 52 and its associated contact in position 21, right outer contact and armature of relay 40 to ground through the right inner normal contact of key 15. Register switch 50 in restoring to its normal position opens the holding circuit for relay 40, thus causing its release. The testing control device is now completely restored to normal.

Automatic timing circuit.

An auxiliary circuit for timing the operation of the testing control device and timing the test of the final selector switch is shown in Fig. 9. The timing circuit shown in Fig. 9 is continuously in operation at all times after the start keys 16 and 17 are actuated. The initial circuit established for actuating the timing device, Fig. 9 energizes relay 905. This circuit may be traced from grounded battery through the winding of relay 905, brush 904 and its associated contact in its normal position, left contacts of key 909, right outer normal contact and armature of relay 431 to ground through the right inner contact of key 17. Relay 905 in operating establishes a locking circuit for itself which may be traced from grounded battery through its winding, right contact and armature, left contacts of key 909 and thence to ground at key 17 over a circuit traced for the operation of relay 905. The operation of relay 905 further establishes a circuit to energize the winding of switch magnet 900 from grounded battery through the winding of magnet 900, brush 902 and its associated contact, left inner contact and armature of relay 905, conducting portion of interrupter 906 to ground. Interrupter 906 is constantly rotating and therefore the circuit traced is intermittently established and disestablished to energize and deenergize magnet 900. Each energization and deenergization of magnet 900 rotates switch 970 one step in the well known manner of operating step-by-step switches. A predetermined time interval is allowed for switch 970 to rotate one cycle. This time interval is dependent upon the speed of interrupter 906. It is, however, regulated to allow sufficient time for the testing control circuit to advance to the point of testing the test selector such as shown in Fig. 7 and seizing the final selector switch to be tested.

It will be remembered that upon the seizure of a final selector switch and the release of test relay 426, a circuit is established to actuate relay 431. The operation of relay 431 is the start relay for actuating apparatus to control the test of the final selector switch, Fig. 8. If timing switch 970 rotates to position 21, previous to the operation of relay 431, a circuit is established to actuate bell 918 to notify the maintenance man that an unstandard condition exists in the testing control device or that the test selector or final selector are maintained in a busy condition an undue length of time. The bell actuating circuit may be traced from grounded battery through the left outer armature and contact of relay 905, brush 903 and its associated contact in position 21, lamp 917, alarm bell 918 to grounded battery. It will be noted that in position 21 of switch 970 the control circuit for actuating switch magnet 900 is opened. The switch stands in position 21 to retain the alarm circuit established until the attention of a maintenance man is attracted. The operation of key 909 by such attendant opens the holding circuit for relay 905 thus causing its release. The release of relay 905 establishes an energizing circuit for switch magnet 900 which may be traced from grounded battery through the winding and contacts of magnet 900, brush 901 and its associated contact in position 21 to ground through the left outer normal contact of relay 905. The operation of key 909 also establishes an operating circuit for relay 907. The operation of this relay is not effective in the circuit traced. It will be noted that upon the release of key 909 and the restoration of switch 970, a circuit is again established to operate relay 905 unless the start key 17 is restored to normal. The operation of relay 905 controls a second rotation of timing switch 970 and the alarm is again sounded unless the unstandard condition is properly cared for.

Assuming that relay 431 is operated, previous to the rotation of timing switch 970 to the position of the alarm circuit, the holding circuit for relay 905 is opened to cause its release. The release of relay 905 establishes a circuit to rotate switch 970 to normal. This circuit may be traced from grounded battery through the winding and contacts of switch magnet 900, brush 901 and its associated contacts to ground through the left outer normal contact and armature of relay 905. Switch 970 is thus returned to its normal position.

The operation of relay 431 further establishes a circuit to energize relay 973. This circuit may be traced from grounded battery through the winding of relay 973, brush 914 and its associated contact, right normal contact and armature of relay 907, right normal contacts of key 909, lower contact of sequence switch spring 613, right outer contact and armature of relay 431 to ground at key 17. The operation of relay 973 establishes a locking circuit for itself from grounded battery through its winding, right inner contact and armature to ground over its energizing circuit previously traced. The operation of relay 973 further establishes an energizing circuit for switch magnet 910. This circuit may be traced from grounded battery through the winding of magnet 910, brush 912 and its associated contact, right outer contact and armature of relay 973, conducting segment of interrupter 906 to ground. The timing switch 980 is now rotated to count a time interval sufficient to test the final selector switch and its auxiliary circuits. Interrupter 906 is constantly rotating to intermittently establish and disestablish the circuit traced. Upon each energization and deenergization of switch magnet 910, switch 980 steps one position. The time period for rotating switch 980 from its normal position to the position connected to the alarm is of shorter duration than that allotted to timing switch 970. It is, however, of sufficient duration to allow ample time for testing the final selector switch, Fig. 8. It will be noted that this time allotment is made for each test of a final selector switch as covered by the rotation of the sequence switch, Fig. 6. Should one of the multi-tests of the final selector switch not be completed during the time interval occupied by the switch 980 from its normal position to the point connected to the alarm bell, a circuit is established from ground through the left armature and contact of relay 973, brush 913 and its associated contact, lamp 916, alarm bell 918 to grounded battery. It will be noted that the circuit for operating switch magnet 910 is opened at the alarm position on the switch. Therefore, the switch will remain positioned to ring the alarm until key 909 is operated by the maintenance man. The operation of key 909 establishes an obvious circuit to operate relay 907. Relay 907 in operating establishes a locking circuit for itself from grounded battery through its winding, left contact and armature, upper contact of sequence switch spring 613 to ground. The operation of relay 907 opens the locking circuit for relay 973 to cause its release. The release of relay 973 establishes an energizing circuit for switch magnet 910 which may be traced from grounded battery through the winding and contacts of magnet 910, brush 911 and its associated contact to ground through the left contact and armature of relay 973. Switch 980 is now arrested in its rotary movement in a second normal position. Relay 907 is maintained in an operated position through its locking circuit until the sequence switch, Fig. 6, is rotated to its normal position.

*Control of test circuit when unstandard condition is encountered.*

It will be recognized that an unstandard condition in the final selector switch under test will arrest the progressive movement of the sequence switch, shown in Fig. 6, since the movement of this sequence switch is dependent upon the progressive movement of the final selector switch, Fig. 8. It is also dependent upon the success of the tests made upon said auxiliary apparatus and circuits of the final selector switch.

When the alarm has been sounded by the rotation of switch 980 to indicate an unstandard condition in the final selector switch under test, the maintenance man makes such notes as are necessary and operates key 630. The purpose of key 630 is to advance the sequence switch, Fig. 6, to position 16. This sequence switch in position 16 controls advance of the sequence switch, Fig. 5. If the sequence switch, Fig. 5, is in one of test positions preceding position 18, the following one, of the multi-tests, will be made of the final selector switch. If the sequence switch, Fig. 5, is in position 18 the testing control device will advance the test selector to the final selector switch next above the final selector switch in which an unstandard condition has been found. The operation of key 630 establishes an obvious circuit to advance the sequence switch, Fig. 6, from position preceding position 16 to position 16. The operation of key 630 further opens the sleeve holding circuit to release relay 822 of final selector switch under test. Upon the release of relay 822, circuits are established in final selector switch and its auxiliary circuits to restore it to its normal position, as previously described under the test of a final selector switch. Key 630 further opens the circuit to advance the sequence switch, Fig. 5, so that this sequence switch will not be rotated until the restoration of key 630. The maintenance man upon observing that the sequence switch, Fig. 6, has rotated to position 16, restores key 630. A circuit is now established to rotate the sequence switch, Fig. 5, from any one of its test positions to a subsequent test position. This circuit may be traced from ground through the left lower contact of sequence switch spring 619, left inner contacts of key 630, contacts 644 of key 631, left upper contact of sequence switch spring 503, winding of magnet 500 to grounded battery.

If the sequence switch, Fig. 5, is resting in position 15 when an unstandard condition is encountered, the restoration of key 630 rotates it from position 15 to position 16 where a circuit is established under the control of the sequence switch magnet contact to rotate it to position 18. Under this condition, the testing control device is operated to advance the test selector, Fig. 7, to the final selector switch next above the final selector switch in which an unstandard condition has been found and the sequence switch, Fig. 5, and its circuits are restored to normal preparatory for the new test. This control is the same as previously described upon the completion of a multi-test.

Returning to the timing switch 980, if the final selector switch under test is in a standard condition the test will be completed previous to the time allowed for rotating the switch to the position where the alarm is connected in the circuit. Under this condition, the sequence switch, Fig. 6, rotates to its normal position 1 previous to the time that the timing switch 980 rotates to the alarm position. It will be noted that sequence switch spring 613 in rotating from position 18 to position 1 opens the locking circuit for relay 937 to cause its release. The circuit is thus established to rotate switch 980 to its normal position. This circuit may be traced from grounded battery through the winding and contacts of magnet 910, brush 911 and its associated contacts to ground through the left normal contact and armature of relay 973.

It will be noted that upon the completion of the test and release of one final selector switch, relay 431 is released, thus establishing a circuit to start timing switch 970 in operation. Upon the seizure of the next final selector switch to be tested, relay 431 is again operated and the energizing circuit for relay 905 is opened to cause its release and return the switch 970 to normal. The timing switch 980 is thus started in operation to cover the time interval for testing the final selector switch. In this manner all operations of the testing device are covered by the time alarm circuit so that in case of an unstandard condition in any part of the operation the alarm is sounded.

Single test.

A plurality of tests of each final selector switch has been described with key 631 in an actuated position. It is desirable at times to make a particular test of each final selector switch in the office. To do this, key 631 remains in its normal position and the sequence switch, Fig. 5, is turned by hand to one of test positions that will associate a particular test feature with test line No. 3. Any particular test is made in the same manner as described in the multi-test and upon each rotation of the sequence switch, Fig. 6, the testing control device is actuated to advance the test selector to a different final selector switch. The automatic features of the circuit including registers 50 and 70, connectors 200 and 300 and test selector control switch 449 function the same as for a multi-test. One difference in the automatically progressive test is that one particular test is made on the auxiliary apparatus and circuits of each final selector switch.

The sequence switch, Fig. 5, remains stationed in one position. Upon each rotation of the sequence switch, Fig. 6, a circuit is established in position 16 to actuate relay 436. This circuit may be traced from grounded battery through the winding of relay 436, right normal contact and armature of relay 430, left normal contact and armature of relay 627, normal contacts 644 of key 631, left inner normal contacts of key 630 to ground through the left lower contact of sequence switch spring 619.

The operation of relay 436 actuates the apparatus of the testing control device, as previously described, to advance the test selector to the final selector switch next above the final selector switch previously tested and advances the sequence switch, Fig. 6 to position 1 preparatory to making the test of the next final selector switch selected.

Repeat operation.

When a final selector switch under test is arrested in its progressive movement on account of an unstandard condition it may be desirable to continue the testing of the same final selector switch. This is known as a repeat test and is accomplished by the operation of repeat key 634. The actuation of key 634 establishes an obvious circuit to energize relay 627. Relay 627 in attracting its right inner armature establishes a locking circuit for itself which may be traced from grounded battery through its winding, right inner contact and armature to ground through the left lower contact of sequence switch spring 620. This locking path is effective for a single test when multi-test key 631 is in its normal position and the sequence switch, Fig. 5, in one of its particular positions. If the sequence switch, Fig. 6, is in a position preceding position 16, key 630 is operated to rotate said sequence switch into position 16 as previously described and to restore the final selector switch to normal. The operation of relay 627 prevents the advance of the test selector switch to a new final selector switch by opening the circuit ordinarily established in position 16 to operate relay 436. This circuit is opened at the left contact and armature of relay 627. A circuit is established through the left contact and armature of relay 627 to energize sequence switch magnet 600 in position 16. This circuit may be traced from grounded battery through the winding of magnet 600, left upper contact of sequence switch spring 608, left contact and armature of relay 627, normal contact 644 of key 631, left inner normal contacts of key 630 to ground through the left lower contact of sequence switch spring 619. The sequence switch is now rotated from position 16 to position 17. In position 17 and 18 a circuit is established to rotate the sequence switch to normal. This circuit is the same as previously traced to ground through the contacts of key 17.

Since relay 431 is maintained in an operated position, a circuit is established to actuate sequence switch magnet 600 to rotate the sequence switch, Fig. 6, from position 1 to position 2. A test is now made of the final selector switch in which the faulty condition was encountered, by the previous test. The test of the final selector switch is the same as previously described for any one of the multi-tests of the final selector switch. A plurality of repeat tests of a final selector switch can be made by maintaining key 634 in an operated position. Upon the release of key 634, apparatus of the testing control circuit is actuated to advance the test selector switch to the next succeeding final selector switch to be tested in the same manner as previously described for such operation.

It may be desirable to repeat all of the tests of a final selector switch. This may be accomplishd by the operation of keys 631 and 634. The actuation of key 631 places the sequence switch, Fig. 5, under the control of the sequence switch, Fig. 6, and causes the sequence switch, Fig. 6, to make a plurality of rotations to carry the sequence switch, Fig. 5, from its normal position 1 through position 15. The operation of key 634 establishes an obvious circuit to operate relay 627. Relay 627 in attracting its right inner armature establishes duplicate locking circuits for itself. One locking circuit may be traced from grounded battery through the winding, right inner contact and armature of relay 627 to ground through the lower contact of sequence switch spring 620. The second locking circuit may be traced from grounded battery through the winding, right inner contact and armature of relay 627, contacts 641 of key 630 to ground through the left lower contact of sequence switch spring 502. Relay 627 now remains locked until the sequence switch, Fig. 5, has rotated from position 1 through its progressive test positions and returned to its normal position 1.

The repeated multi-test on a final selector switch is the same as previously described and the means of starting the repeat test is the same as described for a repeated single test. A plurality of repeated multi-tests may be made by maintaining key 634 in an operated position. Upon the release of key 634, relay 627 is maintained in an operated position until sequence switches, Figs. 5 and 6, have rotated to a position where the holding circuit for relay 627 is opened. In this manner, the completion of a repeat test is accomplished after the release of key 634. Assuming that key 634 is released and that the sequence switch, Fig. 5, has rotated to position 18 and that the sequence switch, Fig. 6, has rotated to position 16, a circuit is established to rotate the sequence switch Fig. 6, from position 16 to position 17. This circuit may be traced from grounded battery through the winding of magnet 600, left upper contact of sequence switch spring 608, left contact and armature of relay 627, contact 645 of key 631 to ground through the right lower contact of sequence switch spring 502. The sequence switch, Fig. 6, is now rotated through positions 17 and 18 to position 1 over the circuit previously described to ground through the contacts of key 17. In position 1 of the sequence switch, Fig. 6, a circuit is established to rotate the sequence switch, Fig. 5, from position 18 to position 1. This circuit may be traced from grounded battery through the winding of magnet 500, lower contact of sequence switch spring 503 to ground through the upper contact of sequence switch spring 620. The rotation of the sequence switch, Fig. 5, to position 1 opens the holding circuit for relay 627 to cause its release. Upon the release of relay 627 the apparatus of the testing control circuit is actuated to automatically advance the test selector to the next succeeding final selector switch to be tested.

*Automatically passing busy final selector switches.*

During the course of routine tests of final selector switches in an office, a number of final selector switches are encountered by the testing control device that are busy. With key 441 shown in Fig. 4, in its normal position the testing device upon encountering a busy final selector switch remains connected thereto until said final selector switch becomes idle. It will be remembered that when a busy final selector switch is encountered, the test relay 426 is maintained in an operated position from ground over the sleeve conductor to the right armature and contact of relay 426, left inner contacts of key 440, contacts of key 441 to battery through the left winding of relay 426. A circuit is also established from the sleeve ground to maintain lamp 444 lighted during the period of time that the testing circuit is connected to the busy final selector switch. The circuit for lighting lamp 444 is obvious and need not be traced. Key 441 when operated, removes a short circuit across the winding of relay 429 and thus when a busy final selector switch is encountered, a circuit is established to operate relay 429 to cause the testing control device to advance the test selector switch to a final selector switch next above the one found busy. The circuit for actuating relay 429 may be traced from the ground characterizing the final selector as busy at terminal 735 to brush 732, conductor 731, conductor 231, lower contact of sequence switch spring 217, conductor 370, left normal contact and armatures of relays 524 and 523, left outer normal contacts of key 630, right armature and contact of relay 426, winding of relay 429, left winding of relay 426 to grounded battery. Relays 429 and 426 are now held in an operated position. The operation of relay 429 establishes a circuit to operate relay 436. This circuit may be traced from grounded battery through the winding of relay 436, right normal contact and armature of relay 430, right contact and armature of relay 429 to ground through the right normal contact and armature of relay 435. The operation of relay 436 establishes a circuit to operate relay 421 and register 422 from ground through the right middle contact and armature of relay 436, left contact and armature of relay 429, winding of relay 421, winding of register 422 to grounded battery. Relay 421 and register 422 are operated to count the number of busy circuits encountered during a routine test.

The operation of relay 436 further establishes an operating circuit for relay 428 from grounded battery through the winding of relay 428, left outer contact and armature of relay 436 to ground through the right upper contact of sequence switch spring 408. Relay 436 further establishes a circuit to operate relay 423 from grounded battery through the right winding of relay 424, left winding of relay 423, right normal contact and armature of relay 424, lower contact of sequence switch spring 603 to ground through the right outer contact and armature of relay 436. The operation of relay 423 establishes a circuit for updrive magnet 702 of the test selector, Fig. 7 the same as previously traced. Upon the upward movement of the test selector switch elevator, a circuit through brush 711 and the conducting portion of commutator 707 is established to operate relay 424. This circuit is the same as previously traced for such operation. The operation of relay 424 opens the operating circuit for relay 423 which is effective upon the association of brush 711 with non-conducting portion of commutator 707. The release of relay 423 opens the circuit established to energize updrive magnet 702, thus arresting the upward movement of the test selector switch elevator. Brushes 732 and 733 of the test selector are now associated with the final selector switch next above the busy final selector switch. The release of relay 423 further establishes a circuit to operate relay 435. This circuit may be traced from ground through the left normal armature and contact of relay 423, left contact and armature of relay 424, right inner contact and armature of relay 436, winding of relay 435 to grounded battery. The operation of relay 435 opens the holding circuit for relay 436 to cause its release. The release of relay 436 opens the actuating circuit for relay 428 to cause its release. The release of relay 428 opens the actuating circuit through the right winding of test relay 426. Therefore, if an idle final selector switch is now encountered there will not be a holding circuit for relays 426 and 429 and therefore, they are released to start a test of the final selector switch.

*Manually passing busy final selector switches.*

During the routine tests of final selector switches of an office, busy final selector switches are encountered by the testing control device. If key 441 is normal, the testing control device will remain connected to the busy final selector switch until it becomes idle. Key 440 is however, provided to advance the test selector from busy final selector switch to the next final selector switch above the busy selector switch. Lamp 444 is lighted to indicate that the testing device is associated with a busy final selector switch. The circuit for lighting lamp 444 is the same as previously traced. The operation of key 440 removes the short circuit across the winding of relay 429, the same as described for automatically passing busy switches, thus establishing a circuit through its winding, the same as previously described. The operation of relay 429 establishes a circuit to operate relay 436. The operation of relay 436 establishes circuits as previously traced to operate relays 428 and 423. The test selector switch elevator is now driven upward, the same as described under the automatic pass busy control and upon the operation of relay 424, the test selector switch elevator is arrested in its upward movement and terminals 732, 733 and 734 of the test selector are associated with the final selector switch next above the busy final selector switch. The release of relay 423 establishes a circuit to operate relay 435, the same as previously traced to release relay 436. The release of relay 436 opens the holding circuit for relay 428, causing its release. The release of relay 428 opens the holding circuit through the right winding of relay 426 and the release of relays 426 and 429 is now dependent upon whether a busy or idle final selector switch has been encountered. The operation of key 440 and relay 428 establishes a circuit to operate relay 430 from grounded battery through its winding, right inner contact of key 440 to ground through the right inner contact and armature of relay 428. Relay 430 in operating establishes a locking circuit for itself from grounded battery through its winding, left contact and armature to ground through the right middle contacts of key 440. The purpose of relay 430 is to open an actuating circuit for relay 436 so that when a busy final selector switch is encountered apparatus of the testing control circuit is not again actuated until key 440 is restored to normal. It will be noted that the operating circuit for relay 431 is held open during the time that key 440 is operated to prevent the test of the final selector switch selected until key 440 is restored to normal.

*Manual operation of the testing control device.*

The testing control device may be operated by the actuation of certain of keys shown in Fig. 1. The purpose of these keys is to enable manual direction of the testing control device to test a particular group of final selector switches. Keys 1 to 13 control the positioning of register switch 50 or 70, keys 18 to 21 control the group of final selector switches in a certain bank to which the test selector is directed, keys 25 to 28 control the number of overflow terminals that shall be over-ridden by the test selector, thus determining the number of groups of final selector switches that shall be tested.

The actuation of any one of keys 1 to 10 along with the actuation of key 12 controls register switch 50 in such manner that it will stop in one of positions 1 to 10, depending on which of keys 1 to 10 is actuated. To control register switch 50 in such manner that it will stop in one of positions 11 to 20, key 11 must be actuated in addition to key 12 and one of keys 1 to 10. The same operation controls register switch 70 with the exception that key 13 is operated instead of key 12. This method of control makes it possible to rotate either register switch 50 or register switch 70, selectively.

Assuming that the testing control device is to be directed to make a test of final selector switches in a particular group and assuming the group to be group 3 of bank 4 of panel E, indicated in Fig. 11, the following keys are actuated 5, 13, 21, 25, 14, 16 and 17. The actuation of key 14 connects ground through the contacts of keys 1 to 10 to the terminals associated with register brush 52 and 72. The actuation of key 5 removes the ground from the terminals in position 5 with relation to register brushes 72 and 87. Therefore, a ground is connected to the terminals associated with register brushes 52 and 72 in all positions except position 5. The actuation of keys 16 and 17 establish start circuits for the entire system including an energizing circuit for start relay 425. This energizing circuit may be traced from grounded battery through the winding of relay 425, lower left upper contacts of sequence switch spring 320, upper contacts of sequence switch spring 220 to ground through the right outer contacts of key 17. The operation of start relay 425 establishes a circuit for relay 41 to control register 70 for this particular test. This circuit may be traced from grounded battery through the winding of relay 61, right inner contacts of key 13, left inner contacts of key 29, left contact and armature of start relay 425 to ground. As will be remembered, the operation of relay 41 transfers the control leads from the register switch magnet 51 to register switch magnet 71. Therefore, it will be noted that the operation of key 13 establishes a circuit that will control register 70. Register 50 remains in its normal position.

Upon the operation of relay 41, the start circuit is established to rotate register switch 70. This circuit may be traced from grounded battery through the winding and contacts of register magnet 71, left outer contact and armature of relay 41, brush 52 and its associated normal contact, left contacts of key 13, brush 72 and associated contact to ground through the right inner contact and armature of relay 41. The register switch 70 is thus rotated from its normal position to position 1. In positions 1 to 4, circuits are established to rotate register 70 which may be traced from grounded battery through the winding, contacts of register magnet 71, left outer contact and armature of relay 41, register brush 52 and its associated contact, right contacts of key 13, register brush 72 and its associated contact, right contacts of key 13, register brush 72 and its associated contact, contacts 1 to 4, right inner contacts of keys 1 to 4 to ground through the left inner contacts of key 14. Register switch 70 is thus rotated into position 5 where the absence of ground at the contact associated with brush 72 arrests its forward movement. The absence of ground at this register position also removes the shunt ground from the winding of relay 42 as previously described in positioning the register. Relay 42 is now operated and establishes a battery circuit for the apparatus to test the test selector upon the positioning of connector 300. The operation of relay 42 further establishes an obvious circuit to operate relay 43 and the operation of relay 43 establishes a locking circuit for itself and an operating circuit for relays as previously described.

In position 5 of register 70, a circuit is established to rotate connector 300 to the second test selector associated with said connector. This circuit may be traced from grounded battery through the winding of sequence switch magnet 301, right lower contact of sequence switch spring 315, conductor 90, terminal strip 45, brush 77 and its associated contact, left outer contacts of key 17, right contacts of key 29, left inner armature and contact of relay 39 to ground through the right inner normal contacts of relay 40. It will be noted that the energizing circuit of magnet 301 is established until the sequence switch of connector 300 is rotated out of position 3. The connector is thus arrested in its rotary movement in position 4 which is the position wherein the second test selector of connector 300 is associated with the test control device. Relay 302 is operated in multiple with sequence switch magnet 301 during the rotation of the sequence switch so that ground through its contact and armature is not connected to test selectors that are passed during the rotation of the sequence switch.

It will be noted from the above description that one of register switches may be rotated independent of another register switch. Also, that one connector switch may be rotated independent of other connector switches. Only two register switches have been shown. There may be, however, any number of register switches connected in the same manner as register switch 70. A relay the same as relay 41 is used with each additional register switch, the same as 70 to transfer the control from the preceding to the succeeding register switch magnet. Each register switch is arrested in position 21 after completing a cycle of tests during automatic control. Only two connector switches are shown. There may be, however, any number of connector switches, the same as connector 300 and the multiple control for automatic routine testing and individual control for particular tests of the additional connectors is the same as that shown and described for connector 300.

Register brush 77 in position 5 has selected the test selector to be used in this particular test and thus the panel in which the test will be made has been selected. Register brush 73 in position 5 is connected to counting relay 4 and since this register brush controls brush selection this particular test is made in the fifth panel. The circuits established for making brush selection have been previously described and it is thought unnecessary to redescribe them.

Brush 74 which is described in the automatic routine test for controlling group selection is not used when a particular test is controlled through the key sets as previously described, key 21 being actuated for group selection. It will be remembered that the sequence switch in Fig. 4 is resting in position 6 when test selector group selector is made. Thus a circuit for making group selector may be traced from the test selector conductor 723, conductor 323, lower contact of sequence switch spring 306, conductor 366, lower contacts of sequence switch spring 418, outer contacts of key 21, conductor 36, Fig. 1, conductor 636, Fig. 6, winding of counting relay No. 3 to grounded battery through the right lower contact of sequence switch spring 411. The counting relays are operated as previously described as the test selector is driven in an upward movement. The operation of the counting relay 0' opens the fundamental circuit and arrests the upward movement of the test selector switch elevator. The operation of the counting relay 0' also establishes a circuit to energize the sequence switch magnet 400 to rotate the sequence switch from position 6 to position 7. This energizing circuit for magnet 400 is not effective until key 14 is restored to normal. The purpose in arresting the progressive movement of the testing control device at this point is to facilitate the movement of the test selector switch elevator by hand to a particular final selector switch in the group so that the testing device may be quickly associated with a questionable final selector switch.

Upon the release of key 14, the energizing circuit for sequence switch magnet 400 may be traced from grounded battery through the winding of magnet 400, upper contact of sequence switch spring 402, left outer contacts of key 14 to ground through the contact and armature of the 0' counting relay. The sequence switch, Fig. 4, now rotates from position 6 to position 7 where it remains during the test of all the final selector switches of a particular group.

As described in the automatic routine test, the position of register brush 55 or 75 controls the number of groups of final selector switches that are tested, each time the test selector selects a new series of tests. The manner in which register brush 55 or 75 controls this is through the control of the selector control switch 449 shown in Fig. 4. In a particular test, register brushes 55 or 75 are not used. The switch brush, however, is supplemented by the operation of one of keys 25 to 28. In this particular test, key 25 is actuated to arrest the movement of selector control switch 449 in position 7.

Thus, there is one group of final selector switches to be tested. As will be remembered, the actuating circuit for magnet 450 is established in position 3 of the sequence switch, Fig. 4. This may be traced from grounded battery through resistance 457, winding of magnet 450, left outer contacts of key 16 to ground through the left upper contact of sequence switch spring 410. The circuit through key 25 to arrest the rotation of selector control switch 449 may be traced from ground through the inner contacts of keys 28, 27 and 26, outer contacts of key 25, conductor 465, brush 451 and its associated contact in position 7, right upper and left lower contacts of sequence switch spring 413 to a junction point between resistance 457 and the winding of magnet 450. An effective shunt is then placed around the winding of switch magnet 450 to prevent its further operation. Register brush 76, as positioned, controls the synchronizing of the positioning of connector 300 with the positioning of register switch 70 preceding the establishment of the circuit for testing the busy or idle condition of the test selector.

Keys 1 to 10, 11 to 13, 18 to 21 and 25 to 28 are mechanically locked and electrically released. Upon the operation of any one key in each strip of keys, the contacts, Fig. 4, 35, 36 and 37 are closed. When the sequence switch, Fig. 4, rotates to position 7, a circuit is established to energiez key release magnet 30, 32 and 33. This circuit may be traced from grounded battery through the upper contacts of sequence switch spring 411, constantly rotating interrupter 44, windings of relay magnet 30, 32 and 33, in multiple to ground associated with the contact of each magnet. Keys 5, 21 and 25 are now released. Key release magnet 31 is now energized at this time since key 13 must remain in an actuated position to maintain the actuating circuit for relay 41.

Upon the completion of the test, key 15 is operated and keys 16 and 17 are released to restore the testing control device to normal as previously described. The operation of key 15 establishes an obvious circuit to operate relay 40. The apparatus of the testing control circuit and the test selector now return to normal, the same as previously described. Upon the release of key 15, a circuit is established to actuate key release magnet 43. This may be traced from grounded battery through the left outer contacts of key 15, left outer contact and armature of relay 40, winding of release magnet 31 to ground through key release magnet contacts 35. It will be noted that the locking circuit for relay 40 is maintained until key 13 is released. This locking circuit may be traced from grounded battery through the winding, left inner contact of relay 40 to ground through the right outer contacts of key 13. The release of key 13 opens the holding circuit for relay 41. Relay 40 is now released and the testing control device may be used for other tests.

*Restore to normal during automatic test.*

Let it be assumed that an automatic test is partly completed with register switch 50 in position 14, connector 200 in position 6, the sequence switch of Fig. 4 in position 7, the selector control switch 449 in position 5, the sequence switch Fig. 6, in position 9, the sequence switch, Fig. 5, in position 11 and the test selector, Fig. 7, connected to a final selector switch.

It is desirable at times to stop the automatic test in order to use the testing control device and test device before a particular test. To do this, the maintenance man restores keys 16 and 17 and operates key 15. The testing control and testing device does not immediately restore to normal but will continue to test the final selector switch to which it is connected until said test is completed. When the sequence switch, Fig. 5, has rotated to position 18, and the sequence switch, Fig. 6, rotated to position 16, the test of the final selector switch is completed and the testing circuit and test control circuit is restored to normal in a progressive manner.

The sequence switch, Fig. 5, in position 18 establishes a circuit to energize relay 436. This circuit may be traced from ground through the right lower contact of sequence switch spring 502, contacts 145 of key 631, normal contact and armature of relay 430, winding of relay 436 to grounded battery. The operation of relay 436 establishes a circuit to rotate the sequence switch, Fig. 6, from position 16 to 17. This circuit may be traced from grounded battery through the winding of magnet 600, left upper contact of sequence switch spring 608, upper contact of sequence switch spring 603 to ground through the right outer contact and armature of relay 436. In position 17 a circuit is established to again energize sequence switch magnet 600. This may be traced from grounded battery through the winding of magnet 600, left upper contact of sequence switch spring 609 to ground through the right inner normal contact of key 17. The sequence switch is thus rotated from position 17 to position 18. In position 18 of sequence switch, Fig. 6, a circuit is established to rotate the sequence switch, Fig. 4, from its testing position 7 to position 8. This circuit may be traced from grounded battery through the winding of magnet 400, right lower contact of sequence switch spring 402, lower contacts of sequence switch spring 611 to ground through the right inner normal contacts of key 17. In position 8 of the sequence switch, Fig. 4, a circuit is established to energize the down-drive magnet of the test selector, Fig. 7. This circuit may be traced from grounded battery through the winding of down-drive magnet 701, conductor 727, conductor 249, right upper contact of sequence switch spring 210, conductor 362 to ground through the right inner contact of sequence switch spring 409. The test selector switch elevator is now driven downward to its normal resting position where a circuit is established to rotate the sequence switch, Fig. 4, from position 8 to position 9. This circuit may be traced from ground through the lower contact of sequence switch spring 740, brush 709, commutator segment 708, conductor 728, conductor 250, right upper contact of sequence switch spring 211, conductor 361, right lower contact of sequence switch spring 401, winding of magnet 400 to grounded battery. In position 9 the test selector control switch is restored to normal from any position. To accomplish this, all contacts associated with switch brush 452 are connected to ground. This may be traced from ground through the right lower contact of sequence switch spring 409 to contacts 1, 3, 5 and 7 and from ground through the left upper contact of sequence switch spring 409 to contacts 2, 4, 6 and 8. Other contacts associated with brush 452 are already connected to ground. The circuit for actuating the switch magnet may be traced from ground connected to the contacts associated with brush 452, right lower and left upper contacts of sequence switch spring 413, contacts and winding of magnet 450, resistance 457 to grounded battery. When switch 449 is restored to normal, a circuit is established to rotate the sequence switch, Fig. 4, from position 9 to position 10. This circuit may be traced from ground through the left outer normal contact and armature of relay 434, lower and upper contacts of sequence switch spring 414, brush 455 and its associated contact, winding of magnet 400 to grounded battery. The sequence switch Fig. 4, is now rotated from position 10 to position 1 under the control of the sequence switch magnet contact. In position 1, a circuit is established to rotate the sequence switch, Fig. 6, from position 18 to position 1.

This circuit may be traced from grounded battery through the winding of magnet 600, left lower contact of sequence switch spring 609 to ground through the right lower contact of sequence switch spring 408. In position 1 of the sequence switch, Fig. 6, a circuit is established to rotate the sequence switch, Fig. 5, from position 18 to position 1. This circuit may be traced from grounded battery through the winding of magnet 500, lower contact of sequence switch spring 503 to ground through the upper contact of sequence switch spring 620. In position 1 of the sequence switch, Fig. 4, a further circuit is established to rotate the sequence switch of connector 200 to its normal position 1. This circuit may be traced from grounded battery through the winding of magnet 201, left lower contact of sequence switch spring 215, upper contact of sequence switch spring 415 to ground through the right outer normal contacts of key 17. The sequence switches shown in Figs. 3, 4, 5 and 6 are now restored to normal, the test selector control switch 449 is resting in its normal position and the test selector has been restored to its normal position to be again used for service connections. A circuit is now established to restore the register switch 50 to its normal position. This circuit may be traced from grounded battery through the windings and contacts of register magnet 51, left outer normal contacts and armature of relay 41, brush 52 and its associated contact, normal contacts of keys 1 to 10, left inner contacts of key 15, left inner normal contacts of key 17 to ground through the lower contact of sequence switch spring 406. Register switch 50 is now resting in position 21, key 15 is now restored to normal. A locking circuit is maintained for relay 40 traced from grounded battery through the winding, left inner contact and armature of relay 40, brush 55 and its associated contact in position 21 to ground through the left inner contacts of key 14. A circuit is thus established to restore register switch 50 to normal from grounded battery through the winding and contacts of magnet 51, left outer normal contact and armature of relay 41, brush 52 and its associated contact, right outer contact and armature of relay 40 to ground through the right inner contacts of key 15. Upon the rotation of register switch 50 from position 21 to its normal position, the holding circuit for relay 40 is opened to cause its release. The circuits for various relays throughout the test circuit and testing control circuit are opened upon the progressive restoration of the circuit.

The circuit is now completely restored to normal and may be used for a particular test either followed by a progressive automatic test or restoration to normal.

What is claimed is:

1. In a system for controlling a plurality of switches, a switch controlling register having a plurality of positions, means to selectively position a switch in accordance with the registrations set up in the positions of said register, means to set said register in a particular position, and means to automatically advance said register from position to position.

2. In a system for controlling a plurality of switches, a plurality of switch controlling registers arranged to operate in sequence, each having a plurality of positions, means to set the first register of said sequence in a particular position, means to set succeeding registers in a particular position by the positioning of a preceding register, means to automatically advance each of said registers from position to position, and means to selectively position a switch in accordance with the registrations set up in the positions of each of said registers.

3. In a system for controlling a plurality of switches, a switch controlling register having a plurality of positions, means automatically operable to successively select said switches in accordance with registrations set up in successive positions of said register, means to selectively position said switches in accordance with the registrations set up in each position of said register, and means to advance said register from position to position.

4. In a system for controlling a plurality of switches, a switch controlling register having a plurality of positions, means to select switches in accordance with the settings of said register, means to position said register for selecting a particular switch, means to automatically advance said register from position to position to successively select other switches, and means to selectively position said switches in accordance with the registrations set up in each position of said register.

5. In a system for testing automatic switches, a plurality of register switches, each switch having a plurality of positions, means operative when one of said register switches is in any one position to select particular groups of automatic switches to be tested, means to selectively position any one of said register switches, and means to successively test the automatic switches of the group selected.

6. In a system for controlling a selector switch, a switch controlling register having a plurality of positions, means to selectively position said switch in accordance with the registrations set up in any one of a plurality of positions of said register, means to automatically position said register for directive control of said switch, and keys to position said register for the directive control of said switch.

7. In a system for controlling a plurality of switches, a plurality of switch controlling registers each having a plurality of positions, automatic means to progressively operate said registers from position to position and in sequence to select said switches in sequence and to directively control said switches and keys to position one of said registers to directively control a particular switch.

8. In a system for controlling a selector switch, a switch controlling register having a plurality of positions, means to selectively position said switch in accordance with the registrations set up in each position of said register, means to set said register in a particular position, means to automatically advance said register from position to position, means to restore said register to normal from any of its positions, and means included in said restoring means to restore to normal the switch being selectively positioned.

9. In a system for testing automatic switches, an automatically progressive selecting device to select the switches to be tested, a testing device for testing said switches, means to directively control the selected switch to associate it with said testing device, and means operative at any point of progression to restore said selecting device to normal said latter means being ineffective until after the test of a selected switch is completed.

10. In a system for testing automatic switches, means to automatically and progressively select said switches, means to test said switches, automatic selector switches to be tested characterized as busy, means to automatically pass such switches characterized as busy, and means to select the next switch characterized as idle.

11. In a system for testing automatic switches, means to automatically and progressively select said switches, means to test said switches, automatic selector switches characterized as busy, means to arrest said automatic progression when a busy switch is selected, and means to test said switch upon its release from said busy condition.

12. In a system for testing automatic switches, means to automatically and progressively select said switches, means to test said switches, automatic selector switches characterized as busy, means to arrest said automatic progression when a busy switch is selected, means to actuate a signal upon the selection of a busy switch, and manually operable means for causing said selecting means to pass said busy switch.

13. In a system for testing automatic switches of one type, a progressively operable register, means to progressively select a plurality of said automatic switches in each position of said register, a common sender to control the selected switches, means to perform a test of the selected switches, and means to repeat said test of any of the selected switches.

14. A testing arrangement for testing the operation of automatic selector switches comprising automatically progressive means to select a switch and successively test the operation of said switch for unstandard conditions, a compound timing device controlled by said testing arrangement, means to operate a first part of said timing device during the selection of said switch, and means to operate a second part of said timing device during the test of said switch.

15. A testing arrangement for testing the operation of automatic selector switches comprising automatic progressive means to select a switch and successively test the operation of said switch for unstandard conditions, a compound timing device controlled by said testing arrangement, means to operate a first part of said timing device during the selection of said switch, means to operate a second part of said timing device during the test of said switch, a signal, and means to actuate said signal when either selection or test is not completed during a predetermined time period.

16. A testing arrangement for testing the operation of automatic selector switches comprising automatic progressive means to select a switch and successively test the operation of said switch for unstandard conditions, a compound timing device controlled by said testing arrangement, means to operate a first part of said timing device during the selection of said switch, means to operate a second part of said timing device during the test of said switch, and means to successively release the parts of said timing device upon completion of selection or test within a predetermined time period.

17. A testing device for testing the operation of automatic selector switches comprising means to automatically and successively select said switches and test the operation of said switches and their auxiliary circuits, a compound timing device controlled by said testing device, means to operate a first part of said timing device during the automatic progression of said testing device when selecting a switch, means to operate a second part of said timing device during the test of said switch, means to actuate a signal when either selection or test is not completed during a predetermined time period, and means to release one part of said timing device when the other part is in operation.

18. In a system for testing automatic switches, means comprising a switching device to select one of said automatic switches, automatically progressive means to make a plurality of tests of said automatic switch, means to variably control said automatic switch with relation to the positioning of its parts, and means to synchronize the positioning of said parts with the progressive means for said plurality of tests.

19. In a system for testing automatic switches, means comprising a switching device to select one of said automatic switches, automatically progressive means to make a plurality of tests of said automatic switch, means to variably control said automatic switch with relation to the positioning of its parts, means to synchronize the positioning of said parts with the progressive means for said plurality of tests, and automatically progressive means to successively make like tests of each of said plurality of automatic switches.

20. In a system for testing automatic switches, means comprising a switching device to select one of said automatic switches, a test line, means to progressively impose a plurality of different testing conditions upon said test line, means to directively position said automatic switch upon the terminals of said test line, automatic means to restore said automatic switch to its normal position and again associate it with the terminals of said test line upon each change of testing condition, and means to maintain said switch under the control of said switching device.

21. In a system for testing automatic switches, means comprising a switching device to select one of said automatic switches, a test line, means to progressively impose a plurality of different testing conditions upon said test line, means to directively position said automatic switch upon the terminals of said test line, automatic means to restore said automatic switch to its normal position and again associate it with the terminals of said test line upon each change of testing condition, means to maintain said switch under the control of said switching device, and automatically progressive means to successively make like tests of each of said plurality of automatic switches.

22. In a system for testing automatic switches used for service connections, means comprising a switching device to select one of said automatic switches and remove it from service, a test line, means to progressively associate a plurality of different testing conditions with said test line, means to directively position said automatic switch upon the terminals of said test line, automatic means to restore said automatic switch to its normal position and again associate it with the terminals of said test line upon each change of testing condition, and means to maintain said automatic switch out of service during said progressive test.

23. In a system for testing automatic switches, means comprising a switching device to select one of said automatic switches, a plurality of test lines, automatically progressive means to repeatedly control said automatic switch to variably associate it with said test lines, and means to test the parts of said automatic switch as positioned by said control means.

24. In a system for testing automatic switches, means comprising a switching device to select one of said automatic switches, a plurality of test lines, automatically progressive means to repeatedly control said automatic switch to variably associate it with said test lines, means to test the parts of said automatic switch as positioned by said control means, and automatically progressive means to successively make like tests of each of said plurality of automatic switches.

25. In a system for testing automatic switches, means comprising a switching device to select one of said automatic switches, a plurality of test lines, means to control said automatic switch to variably associate it with said test lines, automatically progressive means to variably control said automatic switch with relation to the positioning of its parts upon each association with a test line, means to test the parts of said automatic switch as positioned by said control means, automatically progressive means to successively make like tests of each of said plurality of automatic switches, and means to arrest automatic progression when an unstandard condition is encountered during any test.

26. In a system for testing groups of apparatus, a selector means for controlling said selector to select one of said groups, automatic means for controlling the selection of each apparatus in said group, means to variably control each apparatus with relation to the positioning of its parts, and means to variably test the parts of each apparatus as positioned by said control means.

27. In a system for testing groups of apparatus, a selector, means for controlling said selector to select one of said groups, automatic means to successively test each apparatus in the selected group, and means to successively apply a plurality of different conditions of test to each apparatus.

28. In a system for testing groups of automatic switches, a selector, means for controlling said selector to select one of said groups, automatic means to successively test each automatic switch in the selected group, and means to successively apply a plurality of different conditions of test to each automatic switch.

29. In a system for testing groups of automatic switches, a selector, means for controlling said selector to select one of said groups, a test line, means to connect a plurality of different testing conditions to said test line, means to directively control an automatic switch to associate it with said test line upon each change of testing condition, and automatic means for controlling the successive selection and test each automatic switch in the selected group.

30. In a system for testing groups of apparatus, said groups being divided into subgroups, means to select one of said groups, automatic means to successively test each apparatus in all subgroups of the selected group, automatically progressive means to make a plurality of tests of each apparatus, means to variably control said apparatus with relation to the positioning of its parts, and means to synchronize the positioning of said parts with the progressive means for said plurality of tests.

31. In a system for testing groups of apparatus, means to automatically and progressively select particular combinations of said groups, means to successively test the apparatus included in the selected combination, automatically progressive means to make a plurality of tests of said apparatus, means to variably control said apparatus with relation to the positioning of its parts, and means to synchronize the positioning of said parts with the progressive means of said plurality of tests.

32. In a system for testing groups of apparatus, said groups each comprising a combination of subgroups within a group, a plurality of test groups in various ones of said groups, means to automatically and successively select said test groups, means to automatically predetermine the number of subgroups of apparatus constituting a test group, means to successively test the apparatus of each test group, means to make a plurality of tests of each apparatus, means to variably control said apparatus with relation to the positioning of its parts, and means to synchronize the positioning of said parts with the progressive means for said plurality of tests.

33. In a system for testing groups of apparatus, a progressively operable register, means to position said register, means to select a group of apparatus in accordance with the setting of said register, means to successively test each apparatus in the selected group, automatically progressive means to apply a plurality of different tests to each apparatus, means to variably control said apparatus with relation to the positioning of its parts, and means to synchronize the positioning of said parts with the progressive means for said plurality of tests.

34. In a system for testing automatic switches, a progressively operable register, means to position said register, means to select an automatic switch in accordance with the setting of said register, a plurality of test lines, means to control said automatic switch to variably associate it with said plurality of test lines, and means to test an operating function of said automatic switch upon each association with a test line.

35. In a system for testing automatic switches, an auxiliary switch, a controlling register including a plurality of positions, means to selectively position said auxiliary switch in accordance with the registrations set up in each position of said register, means to successively associate said auxiliary switch with the automatic switches to be tested, automatically progressive means to make a plurality of tests of each automatic switch, means to variably control each automatic switch with relation to the positioning of its parts, means to synchronize the positioning of said parts with the progressive means for said plurality of tests, and means to automatically advance said register from position to position.

36. In a system for testing automatic switches, a plurality of register switches, each switch having a plurality of positions, means operative when one of said register switches is in any one position to select particular groups of automatic switches to be tested, means to selectively position any one of said register switches, means to selectively test the automatic switches of the group selected, automatically progressive means to make a plurality of different tests of each automatic switch, means to variably control each automatic switch with relation to the positioning of their parts, and means to synchronize the positioning of said parts with the progressive means for said plurality of tests.

37. A testing arrangement for testing the operation of automatic selector switches comprising means to select a switch, means to variably direct the movable contacts thereof to predetermined sets of stationary contacts connected to testing devices one of which progressively varies the condition of test, and means operative when said switch is in a standard condition to automatically select another of said switches and variably direct the movable contacts thereof to said sets of stationary contacts.

38. A testing arrangement for testing the operation of automatic selector switches comprising means to select a switch, means to variably direct the movable contacts thereof to predetermined sets of stationary contacts connected to testing devices one of which progressively varies the condition of test, means operative when said switch is in a standard condition to automatically select another of said switches and variably direct the movable contacts thereof to said sets of stationary contacts, and means to automatically continue like selection and direction of a plurality of such switches.

39. An automatically progressive testing system for testing the operation of automatic selector switches comprising means to select a switch, means to variably direct the movable contacts thereof to predetermined sets of stationary contacts connected to testing devices one of which progressively varies the condition of test, and means to denote an unstandard condition during any operation of said switch under test.

40. An automatically progressive testing system for testing the operation of automatic selector switches comprising means to select a switch, means to variably direct the movable contacts thereof to predetermined sets of stationary contacts connected to a testing device that progressively varies the condition of test, and means operative when an unstandard condition is encountered to terminate the automatic progression of said testing device at a position that will denote the part of the automatic selector switch that is in an unstandard condition.

41. In a system for testing automatic switches, a progressively operable switching device to select said automatic switches, automatically progressive means including a sender to make a plurality of tests of said automatic switch and to variably control said automatic switch with relation to the positioning of its parts, means to synchronize the positioning of said parts with the progressive means for a plurality of tests, means to arrest the progression of said sender when an unstandard condition is encountered, means to identify the unstandard switch, and means to identify the part of said switch in which said unstandard condition exists.

42. In a system for testing automatic switches, a progressively operable switching device to select said automatic switch, automatically progressive means including a sender to make a plurality of tests of said automatic switch and to variably control said automatic switch with relation to the positioning of its parts, means to synchronize the positioning of said parts with the progressive means for said plurality of tests, means to arrest the progression of said sender when an unstandard condition is encountered, and means to advance said sender from its arrested position to cause the automatic selection of the next progressive test.

43. In a system for testing automatic switches, a progressively operable switch device to select said automatic switch, automatically progressive means including a sender to make a plurality of tests of said automatic switch and to variably control said automatic switch with relation to the positioning of its parts, means to synchronize the positioning of said parts with the progressive means for said plurality of tests, means to arrest the progression of said sender when an unstandard condition is encountered, and means to advance said sender from its arrested position to cause the automatic selection of the next successive switch to be tested.

44. In a system for testing automatic switches, means to select said automatic switches, automatically progressive means to make a plurality of tests of each switch, means to variably control each switch with relation to the positioning of its parts, means to synchronize the positioning of said parts with the progressive means for said plurality of tests, and means to repeat said plurality of tests of any of the selected switches.

45. In a system for testing automatic switches, a progressively operable device to select said automatic switches, automatically progressive means including a sender to make a plurality of tests of a selected switch and to variably control said switch with relation to the positioning of its parts, means to synchronize the positioning of said parts with the progressive means for said plurality of tests, and means to advance said sender from its arrested position to make repeated tests of said switch.

46. In a system for testing automatic switches, a progressively operable selecting device to successively select said switches, automatically progressive means to make a plurality of tests of each of said switches, means to variably control each switch with relation to the positioning of its parts, and means to synchronize the positioning of said parts with the progressive means for said plurality of tests, and means to make a single repeat test or a plurality of repeat tests of any of said automatic switches.

47. In a system for testing automatic switches, said switches being of a type that associate a train of other switches with lines of various character, means including a switching device to successively select said switches for test, test lines, a testing device associated with one of said test lines arranged to progressively simulate wanted lines of said various character, means including a sender to control said testing device to progressively simulate lines of said various character and to repeatedly direct said switch to said test line, and means in said testing device to test said switch when so directed.

48. In a system for testing automatic switches, said switches being of a type that associate a train of other switches with lines of various character, means including a switching device to successively select said switches for test, test lines, a testing device associated with one of said test lines arranged to progressively simulate wanted lines of said various character, means including a sender to control said testing device to progressively simulate lines of said various character and to repeatedly direct said switch to said test lines, said testing device in one of its progressive positions simulating an idle direct subscriber's line, and means in said testing device to test said switch when so directed.

49. In a system for testing automatic switches, said switches being of a type that associate a train of other switches with lines of various character, means including a switching device to successively select said switches for test, test lines, a testing device associated with one of said test lines arranged to progressively simulate wanted lines of said various character, means including a sender to control said testing device to progressively simulate lines of said various character and to repeatedly direct said switch to said test line, said testing device in one of its progressive positions simulating a direct subscriber's line busy in service, and means in said testing device to test said switch when so directed.

50. In a system for testing automatic switches, said switches being of a type that associate a train of other switches with lines of various character, means including a switching device to successively select said switches for test, test lines, a testing device associated with one of said test lines arranged to progressively simulate wanted lines of said various character, means including a sender to control said testing device to progressively simulate lines of said various character and to repeatedly direct said switch to said test line, said testing device in one of its progressive positions simulating an idle private branch exchange trunk, and means in said testing device to test said switch when so directed.

51. In a system for testing automatic switches, said switches being of a type that associate a train of other switches with lines of various character, means including a switching device to successively select said switches for test, test lines, automatically progressive means including a sender to variably direct said switch to said test lines, testing apparatus to simulate busy and idle private branch exchange trunks for testing the ability of said switch to hunt over a group of busy trunks and to become arrested upon connection to an idle one of said trunks and for testing the operating functions of said switch when arrested upon said testing apparatus simulating an idle private branch exchange trunk, and means to connect the switch thus positioned to said testing apparatus.

52. In a system for testing automatic switches, said switches being of the type that associate a train of other switches with lines of various character, means including a switching device to successively select said switches for test, test lines, automatically progressive means including a sender to variably direct said switch to said test lines, testing apparatus to simulate a group of busy private branch exchange trunks for testing the ability of said switch to hunt over a group of busy trunks and to become arrested upon connection to the last trunk of said group and for testing the ability of said switch to automatically signal that all trunks of the group are busy, and means to connect the switch thus positioned to said testing apparatus.

53. In a system for testing automatic switches, said switches being of a type that associate a train of other switches with lines of various character, means including a switching device to successively select said switches for test, test lines, a testing device associated with one of said test lines arranged to progressively simulate wanted lines of said various character, means including a sender to control said testing device to progressively simulate lines of said various character and to repeatedly direct said switch to said test line, said test line in one of its progressive positions simulating a direct subscriber's line busy in service, means to control said switch to reposition its parts for talking as in service, and means in said testing device to test said switch when so positioned.

54. In a system for testing automatic switches, said switches being of the type that associate a train of other switches with a wanted subscriber's line, means including a switching device to successively select said switches for test, a testing line, means to direct the selected switch to said test line, testing apparatus associated with said test line to simulate subscriber's station apparatus with the receiver removed from the switchhook, auxiliary apparatus associated with said switch to release said switch after a predetermined time interval, and means to test the functioning of said time measuring release apparatus.

55. In a system for testing automatic switches, said switches being of a type that associate a train of other switches with lines of various character, means including a switching device to successively select said switches for test lines, a testing device associated with one of said test lines arranged to progressively simulate wanted lines of said various character, means including a sender to control said testing device to progressively simulate lines of said various character and to repeatedly direct said switch to said test line, means in said testing device to test said switch when so directed, and means to arrest the progressive movement of said testing device when an unstandard condition is encountered.

56. In a system for testing groups of automatic selector switches, means to automatically and progressively select said groups of switches, means to successively test the switches in each group, switches in said group characterized as busy, and means to automatically pass without testing such switches characterized as busy.

57. In a system for testing automatic switches, a progressively operable register, means to progressively select said automatic switches in accordance with the position of said register, means to test the selected switches and means to make a plurality of repeat tests of any of the selected switches.

58. In a system for testing automatic switches, a progressively operable device to select said automatic switches, means including a sender to direct a selected switch to a testing device, means to test said switch for unstandard conditions, means to arrest the progression of said sender when an unstandard condition is encountered, and means to advance said sender from said arrested position to make repeat tests of said switch.

In witness whereof, I hereunto subscribe my name this 7th day of November A. D., 1923.

HARRY W. MacDOUGALL.